US009004588B2

(12) United States Patent
Chang

(10) Patent No.: US 9,004,588 B2
(45) Date of Patent: Apr. 14, 2015

(54) HEADREST-MOUNTED ENTERTAINMENT SYSTEMS

(71) Applicant: Chung Lung Chang, Diamond Bar, CA (US)

(72) Inventor: Chung Lung Chang, Diamond Bar, CA (US)

(73) Assignee: Johnson Safety, Inc, San Bernardino, CA (US)

( * ) Notice: Subject to any disclaimer, the term of this patent is extended or adjusted under 35 U.S.C. 154(b) by 106 days.

(21) Appl. No.: 13/874,673

(22) Filed: May 1, 2013

(65) Prior Publication Data

US 2013/0307303 A1 Nov. 21, 2013

Related U.S. Application Data

(63) Continuation of application No. 12/830,223, filed on Jul. 2, 2010, now Pat. No. 8,449,031, which is a continuation of application No. 12/103,638, filed on Apr. 15, 2008, now Pat. No. 7,762,627, which is a (Continued)

(51) Int. Cl.
*A47C 31/00* (2006.01)
*B60R 11/02* (2006.01)
*B60R 11/00* (2006.01)

(52) U.S. Cl.
CPC ......... *B60R 11/0229* (2013.01); *B60R 11/0235* (2013.01); *B60R 11/0247* (2013.01); *B60R 2011/0017* (2013.01); *B60R 2011/0078* (2013.01)

(58) Field of Classification Search
USPC ................. 297/217.1, 217.3, 188.04, 188.05; 348/837, 838
See application file for complete search history.

(56) References Cited

U.S. PATENT DOCUMENTS

| | | | |
|---|---|---|---|
| 3,019,050 A | 1/1962 | Spielman |
| 3,284,041 A | 11/1966 | Tjaden |
| 3,737,184 A | 6/1973 | Swartz |
| 3,773,378 A | 11/1973 | Lewis |
| 3,944,020 A | 3/1976 | Brown |
| D246,037 S | 10/1977 | Kelly |
| D247,234 S | 2/1978 | Stewart |
| 4,079,987 A | 3/1978 | Bumgardener |
| 4,100,372 A | 7/1978 | Hypolite |
| 4,101,159 A | 7/1978 | Stewart |

(Continued)

FOREIGN PATENT DOCUMENTS

| | | |
|---|---|---|
| CN | 2506484 | 8/2002 |
| DE | 3316818 | 11/1984 |

(Continued)

OTHER PUBLICATIONS

Unsolicited letter from Trakker Technologies, Inc., dated Sep. 20, 2005.

(Continued)

*Primary Examiner* — Laurie Cranmer
(74) *Attorney, Agent, or Firm* — Jones Day

(57) ABSTRACT

In certain embodiments, a mobile entertainment system includes a screen assembly with a display and a signal generating device. A housing pivotally coupled to the screen assembly can have a lower portion, an upper portion, and a housing cavity sized and shaped to receive the screen assembly. The upper portion can receive at least a portion of the signal generating device. At least a portion of the screen assembly can rotate through an opening in the lower portion. A shell can receive the housing.

13 Claims, 44 Drawing Sheets

Related U.S. Application Data continuation-in-part of application No. 11/475,735, filed on Jun. 26, 2006, now Pat. No. 7,591,508, said application No. 12/830,223 is a continuation-in-part of application No. 12/103,618, filed on Apr. 15, 2008, now Pat. No. 7,758,117, which is a continuation-in-part of application No. 11/475,735.

(60) Provisional application No. 60/732,788, filed on Nov. 2, 2005, provisional application No. 60/811,879, filed on Jun. 7, 2006, provisional application No. 60/740,540, filed on Nov. 29, 2005, provisional application No. 60/912,156, filed on Apr. 16, 2007, provisional application No. 60/912,157, filed on Apr. 16, 2007.

(56) References Cited

U.S. PATENT DOCUMENTS

| | | |
|---|---|---|
| 4,241,870 A | 12/1980 | Marcus |
| 4,281,577 A | 8/1981 | Middleton |
| D260,507 S | 9/1981 | Kosugi et al. |
| D264,969 S | 6/1982 | McGourty |
| 4,352,200 A | 9/1982 | Oxman |
| 4,394,055 A | 7/1983 | Smith |
| 4,440,443 A | 4/1984 | Nordskog |
| 4,445,750 A | 5/1984 | Grois et al. |
| D280,312 S | 8/1985 | Simeri et al. |
| D282,251 S | 1/1986 | Isham et al. |
| D282,733 S | 2/1986 | Giavazzi et al. |
| 4,584,603 A | 4/1986 | Harrison |
| D284,280 S | 6/1986 | Mack, Jr. et al. |
| D285,684 S | 9/1986 | Akita et al. |
| 4,630,821 A | 12/1986 | Greenwald |
| 4,635,110 A | 1/1987 | Weinblatt |
| 4,643,505 A | 2/1987 | House |
| 4,647,980 A | 3/1987 | Steventon et al. |
| 4,669,694 A | 6/1987 | Malick |
| 4,681,366 A | 7/1987 | Lobanoff |
| 4,702,519 A | 10/1987 | Lobanoff |
| 4,756,528 A | 7/1988 | Umashankar |
| 4,758,047 A | 7/1988 | Hennington |
| 4,792,183 A | 12/1988 | Townsend, III |
| 4,797,934 A | 1/1989 | Hufnagel |
| 4,818,010 A | 4/1989 | Dillon |
| 4,824,159 A | 4/1989 | Fluharty et al. |
| 4,833,727 A | 5/1989 | Calvet et al. |
| 4,843,477 A | 6/1989 | Mizutani et al. |
| 4,867,498 A | 9/1989 | Delphia et al. |
| 4,870,676 A | 9/1989 | Lewo |
| 4,950,842 A | 8/1990 | Menninga |
| RE33,423 E | 11/1990 | Lobanoff |
| 4,982,996 A | 1/1991 | Vottero-Fin et al. |
| 4,983,951 A | 1/1991 | Igarashi et al. |
| 5,040,990 A | 8/1991 | Suman et al. |
| D320,587 S | 10/1991 | Kapp et al. |
| 5,061,996 A | 10/1991 | Schiffman |
| D323,929 S | 2/1992 | Hodson |
| 5,096,271 A | 3/1992 | Portman |
| 5,109,572 A | 5/1992 | Park |
| 5,145,128 A | 9/1992 | Umeda |
| 5,163,870 A | 11/1992 | Cooper |
| 5,177,616 A | 1/1993 | Riday |
| 5,188,421 A | 2/1993 | Arseneault |
| 5,192,301 A | 3/1993 | Kamiya et al. |
| 5,214,514 A | 5/1993 | Haberkern |
| D338,003 S | 8/1993 | Nakayama |
| D340,016 S | 10/1993 | Falcoff |
| 5,255,214 A | 10/1993 | Ma |
| 5,267,337 A | 11/1993 | Kirma |
| 5,267,775 A | 12/1993 | Nguyen |
| 5,303,970 A | 4/1994 | Young et al. |
| 5,311,302 A | 5/1994 | Berry et al. |
| D349,893 S | 8/1994 | Bennett |
| 5,338,081 A | 8/1994 | Young et al. |
| 5,359,349 A | 10/1994 | Jambor et al. |
| 5,396,340 A | 3/1995 | Ishii et al. |
| 5,397,160 A | 3/1995 | Landry |
| 5,410,447 A | 4/1995 | Miyagawa et al. |
| 5,467,106 A | 11/1995 | Salomon |
| 5,469,298 A | 11/1995 | Suman et al. |
| 5,507,556 A | 4/1996 | Dixon |
| 5,522,638 A | 6/1996 | Falcoff et al. |
| 5,529,265 A | 6/1996 | Sakurai |
| D371,357 S | 7/1996 | Nakamura |
| 5,547,248 A | 8/1996 | Marechal |
| 5,555,466 A | 9/1996 | Scribner et al. |
| 5,583,735 A | 12/1996 | Pease et al. |
| 5,636,891 A | 6/1997 | Van Order et al. |
| 5,696,861 A | 12/1997 | Schimmeyer et al. |
| D389,818 S | 1/1998 | Smith |
| 5,705,860 A | 1/1998 | Ninh et al. |
| 5,709,360 A | 1/1998 | Rosen |
| D390,219 S | 2/1998 | Rosen |
| 5,713,633 A | 2/1998 | Lu |
| D394,432 S | 5/1998 | Rosen |
| 5,775,762 A | 7/1998 | Vitito |
| 5,808,862 A | 9/1998 | Robbins |
| 5,811,791 A | 9/1998 | Portman |
| D399,200 S | 10/1998 | Rosen |
| 5,822,023 A | 10/1998 | Suman et al. |
| 5,823,599 A | 10/1998 | Gray |
| 5,831,811 A | 11/1998 | Van Horn |
| 5,842,715 A | 12/1998 | Jones |
| 5,847,685 A | 12/1998 | Otsuki |
| D410,458 S | 6/1999 | Rosen |
| D410,464 S | 6/1999 | Hakoda |
| 5,910,882 A | 6/1999 | Burrell |
| 5,927,784 A | 7/1999 | Vitito |
| 5,940,120 A | 8/1999 | Frankhouse et al. |
| 5,946,055 A | 8/1999 | Rosen |
| D413,856 S | 9/1999 | Scribner |
| D413,937 S | 9/1999 | Smith |
| 5,949,345 A | 9/1999 | Beckert et al. |
| 5,959,596 A | 9/1999 | McCarten et al. |
| D414,856 S | 10/1999 | Zuege |
| D416,015 S | 11/1999 | Mitchell |
| 5,982,429 A | 11/1999 | Kamamoto et al. |
| 5,984,347 A | 11/1999 | Blanc-Rosset |
| 5,996,954 A | 12/1999 | Rosen et al. |
| 5,997,091 A | 12/1999 | Rech et al. |
| 6,007,036 A | 12/1999 | Rosen |
| 6,045,181 A | 4/2000 | Ikeda et al. |
| 6,055,478 A | 4/2000 | Heron |
| 6,056,248 A | 5/2000 | Ma |
| 6,059,255 A | 5/2000 | Rosen et al. |
| 6,081,420 A | 6/2000 | Kim et al. |
| 6,092,705 A | 7/2000 | Meritt |
| 6,093,039 A | 7/2000 | Lord |
| 6,097,448 A | 8/2000 | Perkins |
| 6,102,476 A | 8/2000 | May et al. |
| 6,115,086 A | 9/2000 | Rosen |
| 6,124,902 A | 9/2000 | Rosen |
| 6,125,030 A | 9/2000 | Mola et al. |
| D432,586 S | 10/2000 | Galli-Zugaro et al. |
| 6,135,801 A | 10/2000 | Helot et al. |
| D434,400 S | 11/2000 | Rosen |
| D434,749 S | 12/2000 | Ito et al. |
| 6,157,418 A | 12/2000 | Rosen |
| 6,179,263 B1 | 1/2001 | Rosen et al. |
| 6,181,387 B1 | 1/2001 | Rosen |
| D437,837 S | 2/2001 | Harrison et al. |
| 6,186,459 B1 | 2/2001 | Ma |
| 6,195,438 B1 | 2/2001 | Yumoto et al. |
| D438,853 S | 3/2001 | Iino |
| 6,199,810 B1 | 3/2001 | Wu et al. |
| 6,216,927 B1 | 4/2001 | Meritt |
| 6,219,927 B1 | 4/2001 | Westermaier |
| 6,231,371 B1 | 5/2001 | Helot |
| 6,246,449 B1 | 6/2001 | Rosen |
| 6,250,967 B1 | 6/2001 | Chu |
| 6,256,837 B1 | 7/2001 | Lan et al. |
| 6,266,236 B1 | 7/2001 | Ku et al. |
| 6,267,428 B1 | 7/2001 | Baldas et al. |
| D446,507 S | 8/2001 | Rosen et al. |

(56) References Cited

U.S. PATENT DOCUMENTS

| | | |
|---|---|---|
| 6,275,376 B1 | 8/2001 | Moon |
| D448,009 S | 9/2001 | Lavelle et al. |
| 6,292,236 B1 | 9/2001 | Rosen |
| 6,304,173 B2 | 10/2001 | Pala et al. |
| D450,667 S | 11/2001 | Scribner |
| 6,321,416 B1 | 11/2001 | Lu |
| 6,339,455 B1 | 1/2002 | Allan et al. |
| 6,339,696 B1 | 1/2002 | Chan et al. |
| D454,121 S | 3/2002 | Lavelle et al. |
| 6,361,012 B1 | 3/2002 | Chang |
| 6,363,204 B1 | 3/2002 | Johnson et al. |
| D456,371 S | 4/2002 | Lavelle et al. |
| 6,364,390 B1 | 4/2002 | Finneman |
| 6,380,978 B1 | 4/2002 | Adams |
| 6,381,133 B1 | 4/2002 | Chen |
| D456,789 S | 5/2002 | Snyker |
| D457,506 S | 5/2002 | Scribner |
| 6,394,551 B1 | 5/2002 | Beukema |
| 6,404,622 B1 | 6/2002 | Chen |
| 6,409,242 B1 | 6/2002 | Chang |
| 6,412,848 B1 | 7/2002 | Ceccanese et al. |
| D461,850 S | 8/2002 | Hussaini et al. |
| D462,670 S | 9/2002 | Kasuga et al. |
| 6,446,925 B1 | 9/2002 | Wada |
| 6,466,278 B1 | 10/2002 | Harrison et al. |
| D465,492 S | 11/2002 | Scribner |
| D466,107 S | 11/2002 | Lum |
| 6,480,374 B1 | 11/2002 | Lee |
| D467,234 S | 12/2002 | Scribner |
| D467,562 S | 12/2002 | Chang |
| 6,493,546 B2 | 12/2002 | Patsiokas |
| 6,510,049 B2 | 1/2003 | Rosen |
| D470,828 S | 2/2003 | Solland |
| 6,522,368 B1 | 2/2003 | Tuccinardi et al. |
| 6,532,152 B1 | 3/2003 | White et al. |
| 6,532,592 B1 | 3/2003 | Shintani et al. |
| 6,549,416 B2 | 4/2003 | Sterner et al. |
| 6,557,812 B2 | 5/2003 | Kutzehr et al. |
| 6,619,605 B2 | 9/2003 | Lambert |
| 6,668,407 B1 | 12/2003 | Reitzel |
| 6,669,285 B1 | 12/2003 | Park et al. |
| D485,812 S | 1/2004 | Park |
| 6,678,892 B1 | 1/2004 | Lavelle et al. |
| 6,688,407 B2 | 2/2004 | Etter et al. |
| 6,695,376 B1 | 2/2004 | Hirano |
| 6,698,832 B2 | 3/2004 | Boudinot |
| 6,719,343 B2 | 4/2004 | Emerling et al. |
| 6,724,317 B1 | 4/2004 | Kitano et al. |
| D489,416 S | 5/2004 | Chao |
| 6,739,654 B1 | 5/2004 | Shen et al. |
| D492,944 S | 7/2004 | Drakoulis et al. |
| 6,776,455 B2 | 8/2004 | Longtin et al. |
| D502,152 S | 2/2005 | Peng |
| 6,871,356 B2 | 3/2005 | Chang |
| 6,883,870 B2 | 4/2005 | Jost |
| 6,899,365 B2 | 5/2005 | Lavelle et al. |
| D508,900 S | 8/2005 | Kawan et al. |
| 6,928,654 B2 | 8/2005 | Tranchina et al. |
| D510,329 S | 10/2005 | Vitito |
| D510,330 S | 10/2005 | Peng |
| D511,332 S | 11/2005 | Vitito |
| 6,961,239 B2 | 11/2005 | Schedivy |
| D512,973 S | 12/2005 | Schedivy |
| 6,975,806 B1 | 12/2005 | Lavelle et al. |
| D515,522 S | 2/2006 | Vitito |
| 6,994,236 B2 | 2/2006 | Hsu |
| 7,019,794 B2 | 3/2006 | Norvell et al. |
| D521,524 S | 5/2006 | Chang |
| 7,036,879 B2 | 5/2006 | Chang |
| 7,040,697 B1 | 5/2006 | Tuccinardi et al. |
| 7,040,698 B2 | 5/2006 | Park |
| 7,044,546 B2 | 5/2006 | Chang |
| 7,050,124 B2 | 5/2006 | Schedivy |
| 7,066,544 B2 | 6/2006 | Tseng |
| 7,084,932 B1 | 8/2006 | Mathias et al. |
| 7,095,608 B2 | 8/2006 | Simmons et al. |
| 7,149,078 B2 | 12/2006 | Schedivy |
| 7,184,259 B2 | 2/2007 | Marler |
| 7,201,354 B1 | 4/2007 | Lee |
| 7,201,356 B2 | 4/2007 | Huang |
| 7,218,360 B2 | 5/2007 | Schedivy |
| 7,219,942 B2 | 5/2007 | Schedivy |
| 7,245,274 B2 | 7/2007 | Schedivy |
| 7,267,402 B2 | 9/2007 | Chang |
| 7,315,729 B2 | 1/2008 | Schedevy |
| 7,327,225 B2 | 2/2008 | Nicholas et al. |
| 7,333,009 B2 | 2/2008 | Schedivy |
| 7,334,243 B2 | 2/2008 | Chengalva et al. |
| D564,974 S | 3/2008 | Berg et al. |
| 7,352,355 B2 | 4/2008 | Troxell et al. |
| 7,354,091 B2 | 4/2008 | Lavelle et al. |
| 7,360,833 B2 | 4/2008 | Vitito |
| 7,379,125 B2 | 5/2008 | Chang |
| 7,440,275 B2 | 10/2008 | Schedivy |
| 7,448,679 B2 | 11/2008 | Chang |
| 7,460,187 B2 | 12/2008 | Schedivy |
| D592,647 S | 5/2009 | L'Henaff et al. |
| D592,648 S | 5/2009 | L'Henaff et al. |
| D592,649 S | 5/2009 | L'Henaff et al. |
| 7,548,413 B2 | 6/2009 | Schedivy et al. |
| 7,591,508 B2 | 9/2009 | Chang |
| 7,636,930 B2 | 12/2009 | Chang |
| 7,653,345 B2 | 1/2010 | Schedivy |
| 7,661,759 B2 | 2/2010 | Koontz, II et al. |
| 7,667,669 B2 | 2/2010 | Lavelle et al. |
| 7,679,578 B2 | 3/2010 | Schedivy |
| 7,728,855 B2 | 6/2010 | Sakuma |
| 7,758,117 B2 | 7/2010 | Chang |
| 7,762,627 B2 | 7/2010 | Chang |
| 7,780,231 B2 | 8/2010 | Shalam et al. |
| 7,788,770 B2 | 9/2010 | Vitito et al. |
| 7,791,586 B2 | 9/2010 | Shalam |
| 7,805,050 B2 | 9/2010 | Lavelle et al. |
| 7,812,784 B2 | 10/2010 | Chang |
| 7,839,355 B2 | 11/2010 | Lavelle et al. |
| 7,857,176 B2 | 12/2010 | Schedivy |
| 7,857,382 B2 | 12/2010 | Vitito |
| 7,871,115 B2 | 1/2011 | Vitito et al. |
| 7,885,603 B2 | 2/2011 | Santavicca |
| 7,894,003 B2 | 2/2011 | Chang |
| 7,909,396 B2 | 3/2011 | Vitito |
| 7,909,397 B2 | 3/2011 | Shalam et al. |
| 7,933,121 B2 | 4/2011 | Schedivy |
| 7,954,894 B2 | 6/2011 | Schedivy et al. |
| 8,136,777 B2 | 3/2012 | Brawner |
| 8,141,948 B2 | 3/2012 | Cassellia et al. |
| 8,162,395 B2 | 4/2012 | Vitito |
| 8,186,034 B2 | 5/2012 | Vitito |
| 8,201,203 B2 | 6/2012 | Vitito |
| 8,203,657 B2 | 6/2012 | Vitito |
| 8,243,215 B2 | 8/2012 | Schedivy |
| 8,250,611 B2 | 8/2012 | Vitito |
| 8,255,958 B2 | 8/2012 | Vitito |
| 8,261,309 B2 | 9/2012 | Vitito |
| 8,274,615 B2 | 9/2012 | Vitito |
| 8,449,031 B2 | 5/2013 | Chang |
| 2001/0001083 A1 | 5/2001 | Helot |
| 2001/0001319 A1 | 5/2001 | Beckert et al. |
| 2001/0055071 A1 | 12/2001 | Kawai |
| 2002/0005917 A1 | 1/2002 | Rosen |
| 2002/0085129 A1 | 7/2002 | Kitazawa |
| 2002/0105507 A1 | 8/2002 | Tranchina et al. |
| 2002/0113451 A1 | 8/2002 | Chang |
| 2002/0149708 A1 | 10/2002 | Nagata et al. |
| 2002/0186531 A1 | 12/2002 | Pokharna et al. |
| 2003/0020840 A1 | 1/2003 | Hays et al. |
| 2003/0021086 A1 | 1/2003 | Landry et al. |
| 2003/0025367 A1 | 2/2003 | Boudinot |
| 2003/0036357 A1 | 2/2003 | McGowan |
| 2003/0112585 A1 | 6/2003 | Silvester |
| 2003/0128183 A1 | 7/2003 | Chang |
| 2003/0137584 A1 | 7/2003 | Norvell et al. |
| 2003/0140352 A1 | 7/2003 | Kim |
| 2003/0184137 A1 | 10/2003 | Jost |

(56) References Cited

U.S. PATENT DOCUMENTS

| | | |
|---|---|---|
| 2003/0198008 A1 | 10/2003 | Leapman et al. |
| 2003/0202005 A1 | 10/2003 | Sadahiro |
| 2003/0222848 A1 | 12/2003 | Solomon et al. |
| 2004/0007906 A1 | 1/2004 | Park et al. |
| 2004/0080213 A1 | 4/2004 | Chang |
| 2004/0085337 A1 | 5/2004 | Barrows |
| 2004/0085485 A1 | 5/2004 | Schedivy |
| 2004/0085718 A1 | 5/2004 | Imsand |
| 2004/0086259 A1 | 5/2004 | Schedivy |
| 2004/0125549 A1 | 7/2004 | Iredale |
| 2004/0130616 A1 | 7/2004 | Tseng |
| 2004/0160096 A1 | 8/2004 | Boudinot |
| 2004/0212957 A1 | 10/2004 | Schedivy |
| 2004/0227372 A1 | 11/2004 | Lavelle et al. |
| 2004/0227695 A1 | 11/2004 | Schedivy |
| 2004/0227696 A1 | 11/2004 | Schedivy |
| 2004/0227861 A1 | 11/2004 | Schedivy |
| 2004/0228622 A1 | 11/2004 | Schedivy |
| 2004/0237111 A1 | 11/2004 | Iraclianos et al. |
| 2005/0005298 A1 | 1/2005 | Tranchina |
| 2005/0020320 A1 | 1/2005 | Lavelle et al. |
| 2005/0024356 A1 | 2/2005 | Lavelle et al. |
| 2005/0052046 A1 | 3/2005 | Lavelle et al. |
| 2005/0098593 A1 | 5/2005 | Schedivy |
| 2005/0099042 A1 | 5/2005 | Vitito |
| 2005/0099495 A1 | 5/2005 | Vitito |
| 2005/0099547 A1 | 5/2005 | Vitito |
| 2005/0099548 A1 | 5/2005 | Vitito |
| 2005/0102697 A1 | 5/2005 | Vitito |
| 2005/0110313 A1 | 5/2005 | Vitito et al. |
| 2005/0110913 A1 | 5/2005 | Vitito |
| 2005/0122670 A1 | 6/2005 | Oh |
| 2005/0132407 A1 | 6/2005 | Boyer, Jr. et al. |
| 2005/0155068 A1 | 7/2005 | Chang |
| 2005/0166238 A1 | 7/2005 | Vitito |
| 2005/0174498 A1 | 8/2005 | Wu |
| 2005/0200697 A1 | 9/2005 | Schedivy |
| 2005/0223406 A1 | 10/2005 | Vitito |
| 2005/0232585 A1 | 10/2005 | Lavelle et al. |
| 2005/0235326 A1 | 10/2005 | Vitito |
| 2005/0235327 A1 | 10/2005 | Vitito |
| 2005/0242636 A1 | 11/2005 | Vitito |
| 2005/0242637 A1 | 11/2005 | Vitito |
| 2005/0242638 A1 | 11/2005 | Vitito |
| 2005/0249357 A1 | 11/2005 | Schedivy |
| 2005/0251833 A1 | 11/2005 | Schedivy |
| 2006/0023412 A1 | 2/2006 | Schedivy |
| 2006/0034040 A1 | 2/2006 | Simmons et al. |
| 2006/0047426 A1 | 3/2006 | Vitito |
| 2006/0070102 A1 | 3/2006 | Vitito |
| 2006/0070103 A1 | 3/2006 | Vitito |
| 2006/0075934 A1 | 4/2006 | Ram |
| 2006/0097537 A1 | 5/2006 | Schedivy |
| 2006/0112144 A1 | 5/2006 | Ireton |
| 2006/0119151 A1 | 6/2006 | Vitito |
| 2006/0125295 A1 | 6/2006 | Schedivy |
| 2006/0128303 A1 | 6/2006 | Schedivy |
| 2006/0218595 A1 | 9/2006 | Chang |
| 2006/0227212 A1 | 10/2006 | Schedivy |
| 2006/0236345 A1 | 10/2006 | Schedivy |
| 2006/0238529 A1 | 10/2006 | Lavelle et al. |
| 2006/0290835 A1 | 12/2006 | Sakuma |
| 2007/0008094 A1 | 1/2007 | Schedivy |
| 2007/0052618 A1 | 3/2007 | Shalam |
| 2007/0057541 A1 | 3/2007 | Huang |
| 2007/0070259 A1 | 3/2007 | Schedivy |
| 2007/0091015 A1 | 4/2007 | Lavelle et al. |
| 2007/0096517 A1 | 5/2007 | Chang |
| 2007/0101372 A1 | 5/2007 | Chang |
| 2007/0105444 A1 | 5/2007 | Macholz |
| 2007/0108788 A1 | 5/2007 | Shalam et al. |
| 2007/0164609 A1 | 7/2007 | Shalam et al. |
| 2008/0067842 A1 | 3/2008 | Chang |
| 2008/0093956 A1 | 4/2008 | Maxson |
| 2008/0157574 A1 | 7/2008 | LaRussa |
| 2008/0165293 A1 | 7/2008 | Tranchina |
| 2008/0191505 A1 | 8/2008 | Schedivy |
| 2008/0252118 A1 | 10/2008 | Chang |
| 2009/0013357 A1 | 1/2009 | Cassellia et al. |
| 2009/0235513 A1 | 9/2009 | Chang |
| 2009/0315368 A1 | 12/2009 | Mitchell |
| 2010/0017827 A1 | 1/2010 | Shalam et al. |
| 2010/0067884 A1 | 3/2010 | Schedivy |
| 2010/0146563 A1 | 6/2010 | Chang |
| 2010/0211708 A1 | 8/2010 | Rohaly et al. |
| 2010/0246155 A1 | 9/2010 | Snider et al. |
| 2011/0133530 A1 | 6/2011 | Chang |
| 2011/0167460 A1 | 7/2011 | Tranchina |
| 2011/0181796 A1 | 7/2011 | Caltabiano et al. |
| 2012/0162891 A1 | 6/2012 | Trancina et al. |

FOREIGN PATENT DOCUMENTS

| | | |
|---|---|---|
| DE | 3721377 | 1/1989 |
| DE | 4118711 | 12/1992 |
| DE | 19943696 | 3/2001 |
| EP | 0784400 | 7/1997 |
| FR | 2817812 | 12/2000 |
| FR | 2829980 | 9/2001 |
| GB | 2276059 | 9/1994 |
| JP | 58-128942 | 8/1983 |
| JP | 61-161151 | 10/1986 |
| JP | 1-94048 | 4/1989 |
| JP | 2-17777 | 2/1990 |
| JP | 2-144242 | 6/1990 |
| JP | 2-158437 | 6/1990 |
| JP | 3-10476 | 1/1991 |
| JP | 3-8513 | 3/1991 |
| JP | 3-189620 | 8/1991 |
| JP | 3-45875 | 9/1991 |
| JP | 3-122482 | 12/1991 |
| JP | 4-5142 | 1/1992 |
| JP | 4-201639 | 7/1992 |
| JP | 5-38981 | 2/1993 |
| JP | 5-50883 | 3/1993 |
| JP | 5-97098 | 4/1993 |
| JP | 6-57251 | 8/1994 |
| JP | 7-8680 | 2/1995 |
| JP | 9-224202 | 8/1997 |
| JP | 10-75389 | 3/1998 |
| JP | 2001-047921 | 2/2001 |
| JP | 2001-256768 | 9/2001 |
| JP | 2001-354074 | 12/2001 |
| JP | 2004-25949 | 1/2004 |
| JP | 2004-81385 | 3/2004 |
| JP | 2004-231158 | 8/2004 |
| JP | 2004-231159 | 8/2004 |
| JP | 2004-529688 | 9/2004 |
| JP | 2005-503904 | 2/2005 |
| JP | 2005-525856 | 9/2005 |
| JP | 2005-532224 | 10/2005 |
| SE | 63872 | 6/1924 |
| SE | 63912 | 6/1999 |
| SE | 63913 | 6/1999 |
| WO | WO 00/38951 | 7/2000 |
| WO | WO 02/074577 | 9/2002 |
| WO | WO 03/001885 | 1/2003 |
| WO | WO 03/029050 | 10/2003 |
| WO | WO 2004/005077 | 1/2004 |
| WO | WO 2005/038628 | 4/2005 |

OTHER PUBLICATIONS

"Multimedia halt Einzug im Auto", p. 38-39, *Automotive Electronics 2000*.

HR7DDPKG Installation Manual, Audiovox Electronics Corp., dated 2004.

HR9000PKG Installation Manual, Audiovox Electronics Corp., dated 2006.

Request for Reexamination of U.S. Patent No. 6,871,356, dated Jul. 28, 2005 (U.S. Reexamination No. 95/000,103).

Order Granting Request for Reexamination of U.S. Patent No. 6,871,356, dated Sep. 29, 2005 (U.S. Reexamination No. 95/000,103).

(56) References Cited

OTHER PUBLICATIONS

Action Closing Prosecution for Reexamination of U.S. Patent No. 6,871,356, dated Sep. 29, 2005 (U.S. Reexamination No. 95/000,103).

Examiner's Answer during appeal of Reexamination of U.S. Patent No. 6,871,356 dated Nov. 20, 2007 (U.S. Reexamination No. 95/000,103).

Decision on Appeal of Reexamination of U.S. Patent No. 6,871,356 dated Jun. 25, 2009 (U.S. Reexamination No. 95/000,103).

Office Action for U.S. Appl. No. 10/361,897, now U.S. Patent No. 6,871,356 mailed Aug. 7, 2003.

Office Action for U.S. Appl. No. 10/361,897, now U.S. Patent No. 6,871,356, mailed Feb. 26, 2004.

Office Action for U.S. Appl. No. 10/361,897, now U.S. Patent No. 6,871,356, mailed Aug. 23, 2004.

Compaq Tablet PC TC1000 product summary dated Sep. 3, 2002.

Compaq Tablet PC TC1000 "Getting Started" guide, dated Nov. 2002.

Compaq Tablet PC TC1000 Docking Station Reference Guide, dated Nov. 2002.

Panasonic Color Television Operating Instructions CT-27SX32, dated 2002.

U.S. Appl. No. 12/252,026, filed Oct. 15, 2008, titled Headrest-Mounted Monitor.

U.S. Reexamination No. 95/000,103 of U.S. Patent No. 6,871,356, filed Aug. 1, 2005.

U.S. Reexamination No. 95/000,007 of U.S. Patent No. 6,339,455, filed Dec. 16, 2002.

Reissue U.S. Appl. No. 10/430,713 of U.S. Appl. No. 09/474,582, filed May 5, 2003.

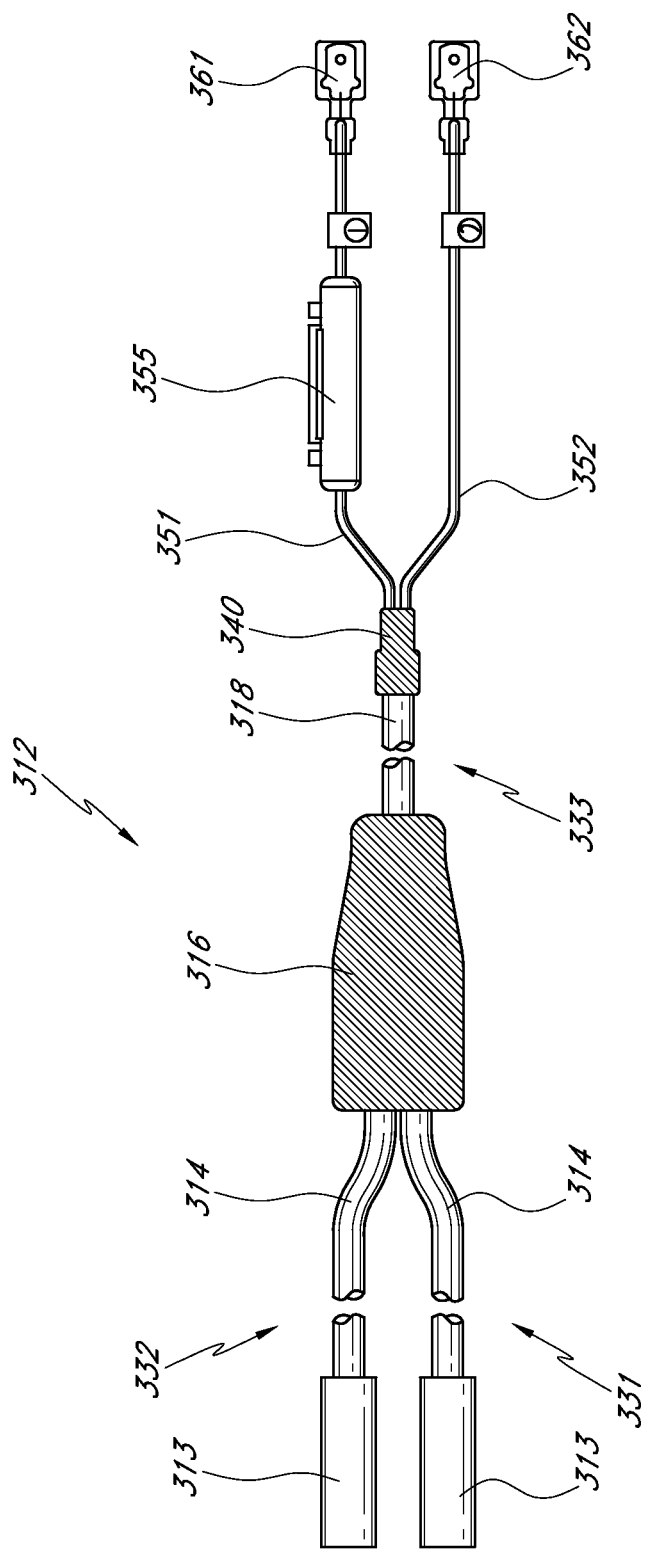
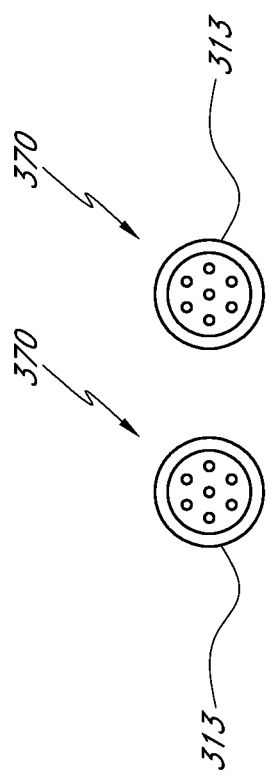
FIG. 16A
FIG. 16B

HEADREST-MOUNTED ENTERTAINMENT SYSTEMS

CROSS-REFERENCE TO RELATED APPLICATIONS

Any and all applications for which a foreign or domestic priority claim is identified in the Application Data Sheet as filed with the present application, are hereby incorporated by reference under 37 CFR 1.57. This application is a continuation of U.S. application Ser. No. 12/830,223, filed Jul. 2, 2010, titled HEADREST-MOUNTED ENTERTAINMENT SYSTEMS, which is a continuation of U.S. application Ser. No. 12/103,638, filed Apr. 15, 2008, titled HEADREST-MOUNTED ENTERTAINMENT SYSTEMS, now U.S. Pat. No. 7,762,627, which is a continuation-in-part of U.S. application Ser. No. 11/475,735, filed Jun. 26, 2006, titled HEADREST MOUNTED ENTERTAINMENT SYSTEM, now U.S. Pat. No. 7,591,508, which claims the benefit under 35 U.S.C. §119(e) of U.S. Provisional Application No. 60/732,788, filed Nov. 2, 2005, titled HEADREST ENTERTAINMENT SYSTEM; U.S. Provisional Application No. 60/740,540, filed Nov. 29, 2005, titled HEADREST ENTERTAINMENT SYSTEM; and U.S. Provisional Application No. 60/811,879, filed Jun. 7, 2006, titled HEADREST MOUNTED ENTERTAINMENT SYSTEM. U.S. application Ser. No. 12/103,638 also claims the benefit under 35 U.S.C. §119(e) of U.S. Provisional Application No. 60/912,156, filed Apr. 16, 2007, titled HEADREST-MOUNTED ENTERTAINMENT SYSTEMS. The entire contents of the above-identified applications are hereby incorporated by reference and made a part of this specification.

U.S. application Ser. No. 12/830,223, filed Jul. 2, 2010, is also a continuation-in-part of U.S. application Ser. No. 12/103,618, filed Apr. 15, 2008, titled HEADREST-MOUNTED ENTERTAINMENT SYSTEMS, now U.S. Pat. No. 7,758,117 which is a continuation-in-part of U.S. application Ser. No. 11/475,735, filed Jun. 26, 2006, titled HEADREST MOUNTED ENTERTAINMENT SYSTEM, now U.S. Pat. No. 7,591,508, which claims the benefit under 35 U.S.C. §119(e) of U.S. Provisional Application No. 60/732,788, filed Nov. 2, 2005, titled HEADREST ENTERTAINMENT SYSTEM; U.S. Provisional Application No. 60/740,540, filed Nov. 29, 2005, titled HEADREST ENTERTAINMENT SYSTEM; and U.S. Provisional Application No. 60/811,879, filed Jun. 7, 2006, titled HEADREST MOUNTED ENTERTAINMENT SYSTEM. U.S. application Ser. No. 12/103,618 also claims the benefit under 35 U.S.C. §119(e) of U.S. Provisional Application No. 60/912,157, filed Apr. 16, 2007, titled HEADREST-MOUNTED ENTERTAINMENT SYSTEMS. The entire contents of each of the above-identified applications are hereby incorporated by reference herein and made a part of this specification.

BACKGROUND OF THE INVENTIONS

1. Field of the Inventions

This application relates to entertainment systems that can be mounted in a vehicle, such as an automobile, and more particularly relates to headrest-mounted entertainment systems for vehicles.

2. Description of the Related Art

Video display units have been used in vehicles, such as, for example, airplanes and cars, to provide passengers with diversion and entertainment on journeys of diverse durations. However, known units and various components thereof have various limitations and disadvantages.

SUMMARY OF THE INVENTIONS

In certain embodiments, a mobile entertainment system comprises a housing configured to be coupled with a mounting plate of a headrest. The housing can define a first hinge portion. In some embodiments, the system further comprises a screen assembly. The screen assembly can define a second hinge portion that cooperates with the first hinge portion to pivotally couple the screen assembly with the housing such that the screen assembly can rotate relative to the housing. In some embodiments, the system further comprises a retaining harness fixedly attached to the mounting plate of the headrest at a first end and fixedly attached to the screen assembly at a second end. The retaining harness can be configured to limit rotation of the screen assembly relative to the housing. Optionally, in some embodiments, the system comprises a headrest configured to be installed in a vehicle. The headrest can comprise the mounting plate.

In certain embodiments, a mobile entertainment system comprises a housing coupled with a mounting plate of a headrest. The housing can define a first hinge portion. In some embodiments, the system further includes a screen assembly comprising a metallic frame. In various embodiments, a surface area of the frame is relatively large as compared with that of the other components of the screen assembly. For example, in some embodiments, the screen assembly includes a media reader and the frame covers a substantial portion of the media reader. In various embodiments, an external or outer surface area of the frame is no less than about ⅛, ⅙, ⅕, ⅓, ½, ⅔, or ¾ the size of an outer surface area of the media reader. In some embodiments, the screen assembly includes a viewing screen. In various embodiments, a maximum cross-sectional area of the frame is no less than about 0.25, 0.33, 0.50, 0.66, 0.75, 1.25, or 1.33 times the size of a viewable surface area of the viewing screen.

In some embodiments, the screen assembly defines a second hinge portion that cooperates with the first hinge portion of the housing to pivotally couple the screen assembly with the housing such that the screen assembly can rotate through a range of angles relative to the housing. The screen assembly can be configured to rotate independent of movement of the headrest. In some embodiments, the system further comprises a retaining harness coupled with both the mounting plate of the headrest and the metallic frame of the screen assembly. The harness can be configured to limit the range of angles through which the screen assembly can rotate. The harness further can be configured to prevent movement of the screen assembly beyond a predetermined distance from the mounting plate. Optionally, in some embodiments, the system comprises a headrest configured to be installed in a vehicle. The headrest can comprise a mounting plate.

In certain embodiments, a method of restraining movement of an entertainment system comprises providing a headrest having a mounting plate. The method can further comprise coupling a housing with the mounting plate of the headrest. The method can further comprise coupling a screen assembly with the housing such that the screen assembly can rotate relative to the housing. The method can further comprise connecting a retaining harness at a first end with the mounting plate and at a second end with the screen assembly.

In certain embodiments, an entertainment system includes a screen assembly having a display and a signal generating device. The entertainment system can also include a housing having a lower portion, an upper portion, and a housing cavity defined by the lower and upper portions, the housing cavity being sized and shaped to receive substantially the screen assembly. The upper portion can be sized and shaped to receive at least a portion of the signal generating device. In some embodiments, the screen assembly can be pivotally coupled to the housing such that the screen assembly can rotate relative to the housing, the lower portion having an opening that is sized and shaped to allow at least a portion of the screen assembly to rotate through the opening. In some embodiments, the entertainment system can also include a shell substantially fixed to a headrest in a vehicle, the shell having a lower portion, an upper portion, and a shell cavity defined by the upper and lower portions of the shell, the shell cavity being sized and shaped to receive substantially the housing. The upper portion of the shell can be sized and shaped to receive at least a portion of the upper portion of the housing. The lower portion of the shell can be sized and shaped to receive substantially the lower portion of the housing, the shell being coupled with the housing and substantially fixed to the housing.

BRIEF DESCRIPTION OF THE DRAWINGS

These and other features, aspects and advantages of the inventions will be better understood with reference to embodiments illustrated in the accompanying drawings. The illustrated embodiments are not intended to define the limits or scope of the inventions.

FIG. 16A is a front plan view of one embodiment of an adapter for coupling with a first and second entertainment system.

FIG. 16B is a partial top plan view of the adapter of FIG. 16A showing coupler interfaces of two connectors.

DETAILED DESCRIPTION OF PREFERRED EMBODIMENTS

Figure 1:
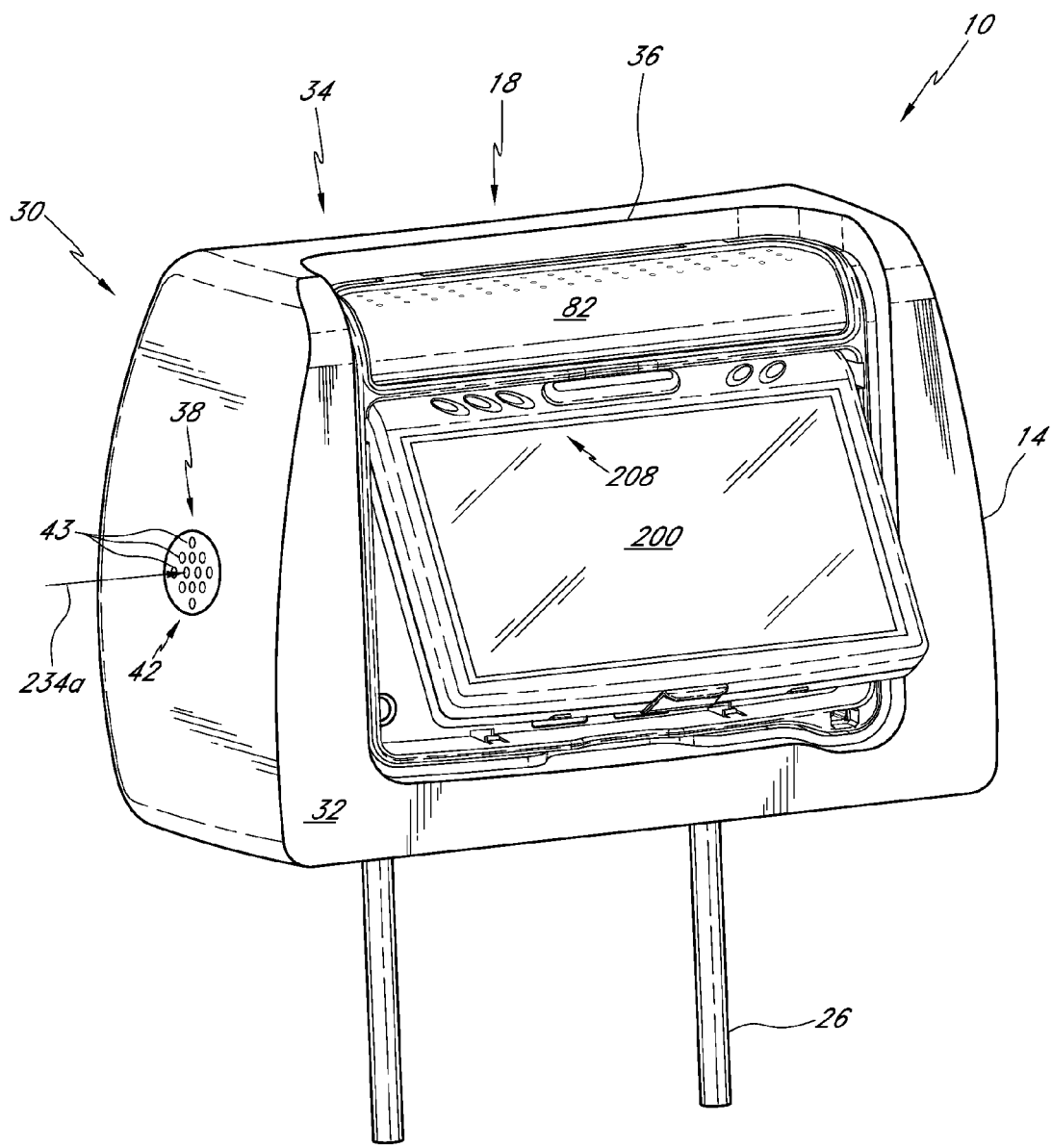
FIG. 1 is a perspective view of one embodiment of a headrest entertainment assembly that includes an entertainment system mounted in a headrest of a vehicle. Access to at least one component of the entertainment system can be limited by a cover, which is shown in a closed position.

FIG. 1 shows one embodiment of a headrest entertainment assembly 10. The assembly 10 has a number of advantageous features. As discussed further below, the headrest entertainment assembly 10 and some variations thereof include a component cover that provides protection in connection with a signal source. Another feature of the assembly 10 and of some variations is a cooling system that keeps the components thereof from overheating. Further advantages of the assembly 10 and of some variations thereof reside in various inventive techniques for manufacturing the assembly 10, which techniques provide advantages associated with inventory control. Also, some embodiments of the assembly 10 and techniques for producing the assembly result in enhanced safety features for passengers in a vehicle in which the assembly 10 is mounted.

The headrest entertainment assembly 10 includes a vehicle headrest 14 and an entertainment system 18. Preferably the headrest entertainment assembly 10 is mounted in a vehicle, such as a car. As used herein "car" is a broad term and is used in its ordinary sense and refers, without limitation, to any personal land transportation vehicle, e.g., a passenger automobile, a truck, a van, a minivan, a sport-utility vehicle, and similar such vehicles. Certain features, aspects and advantages of the embodiments described herein can be used with other vehicles.

The headrest entertainment assembly 10 can be constructed by various preferred methods, which are discussed below. Broadly, in one method, the headrest 14 is formed about other portions of the headrest entertainment assembly 10 so as to provide an integral unit. In other methods, interchangeability of components is enhanced by making the headrest 14 separable from other components of the headrest entertainment assembly 10.

Features of the vehicle headrest 14 are discussed below in connection with various embodiments. In one variation discussed below, the headrest 14 forms a portion of a seat of a vehicle and can be separately movable or adjustable relative to other portions of the seat. Although the headrest environment is preferred, in other embodiments entertainment systems comprising a sub-combination of the components of the assembly 10 can be deployed in an upper region of a seat, e.g., a seat back. The headrest 14 can take other suitable forms.

The headrest entertainment assembly 10 also includes a mounting system 22. In one variation, the mounting system 22 includes at least one seat post 26 that extends between the headrest 14 and a seat back (not shown) to which the headrest 14 can be coupled. In the illustrated embodiment, the mounting system 22 includes two seat posts 26. The seat posts 26 can be solid or hollow and can be configured to convey signals from or to the headrest entertainment assembly 10. Preferably, where two or more seat posts 26 are provided at least one of the seat posts is hollow, having a passage extending therethrough in which at least a portion of a cable conveying the signal can be located. As discussed further below, in some embodiments the size of the passage can be enlarged by reducing the thickness of a wall of the seat posts 26. As discussed further below, in some embodiments, the headrest entertainment assembly 10 includes a signal source mounted in the headrest 14. In other embodiments, a signal source is not mounted in the headrest 14, but is located elsewhere within the vehicle. In other embodiments, the headrest entertainment assembly 10 includes multiple signal sources, one or more of which can be mounted in the headrest and one or more of which can be located elsewhere in the vehicle. In other embodiments, multiple entertainment systems can be provided in multiple headrests. In other embodiments, multiple entertainment systems and multiple signal sources can be provided such as is described in U.S. Pat. No. 6,871,356, which is hereby expressly incorporated by reference herein.

The seat post 26 arrangement facilitates adjustability of the headrest entertainment assembly 10. This adjustability can be combined with additional modes of adjustability, such as tilting of a monitor or other portion of the headrest entertainment assembly 10, as discussed further below.

Figure 11:
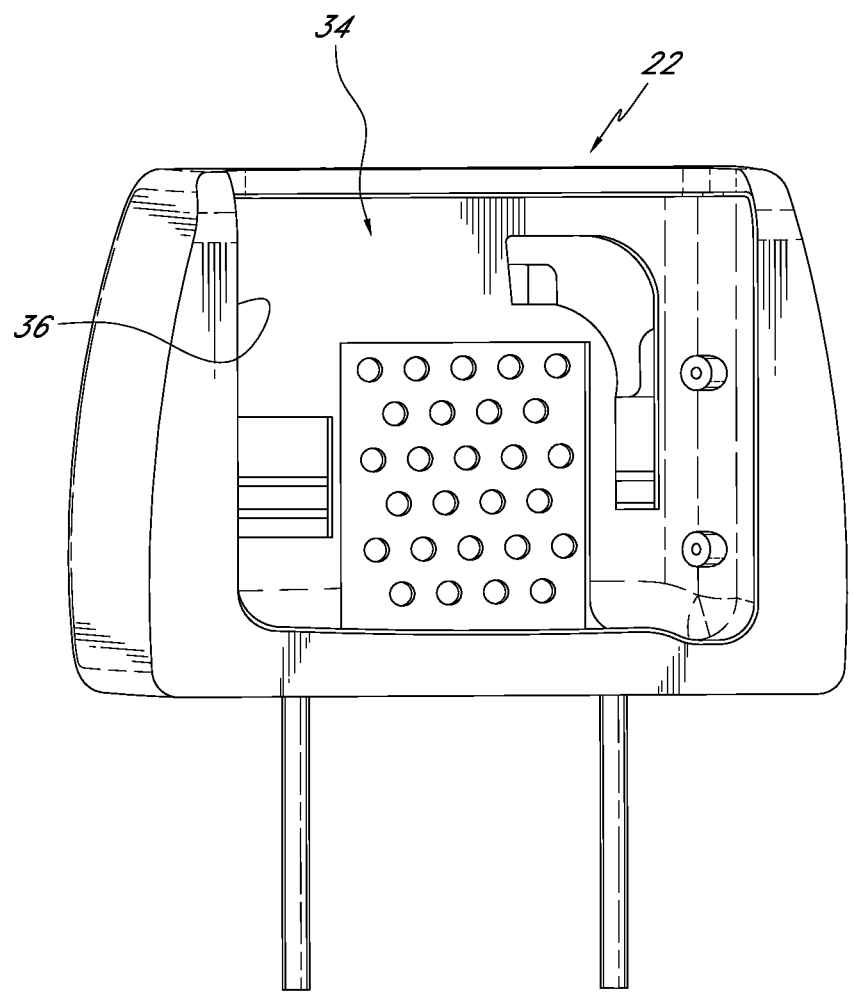
FIG. 11 is a perspective view of one embodiment of a portion of a mounting system.

As discussed further below, the construction of the mounting system 22, e.g., of the posts 26, may be such that cables that interconnect a plurality of entertainment systems can be quickly and efficiently routed therethrough. As discussed further below, one way to facilitate quick routing of a signal cable through the post 26 is by increasing the inner cross-sectional size (e.g., diameter) of a hollow passage extending through the post 26. As discussed further below, the inner cross-sectional size of a passage extending through the posts 26 can be increased by increasing the size (e.g., the inner and outer diameter) of the posts 26. In some applications, the outer size of the posts 26 can not be increased because the size of a corresponding post hole in the seat back in which the post 26 is inserted is selected by car or seat manufacture and cannot easily be increased. In some situations, such as when the outer size of the posts 26 cannot easily be increased, the mounting system 22 can be configured to permit the wall thickness of the posts 26 to be decreased. By providing a fixed outer size and by reducing the thickness of the wall of the post 26, the inner size of the passage in the post can be increased, making routing of signal cables easier. In some arrangements discussed further below, the mounting system 22 is configured to permit the wall thickness of the posts 26 to be decreased by providing a reinforced member that extends between two posts 26. The mounting system 22 is discussed in more detail in connection with FIG. 11.

Figure 13:
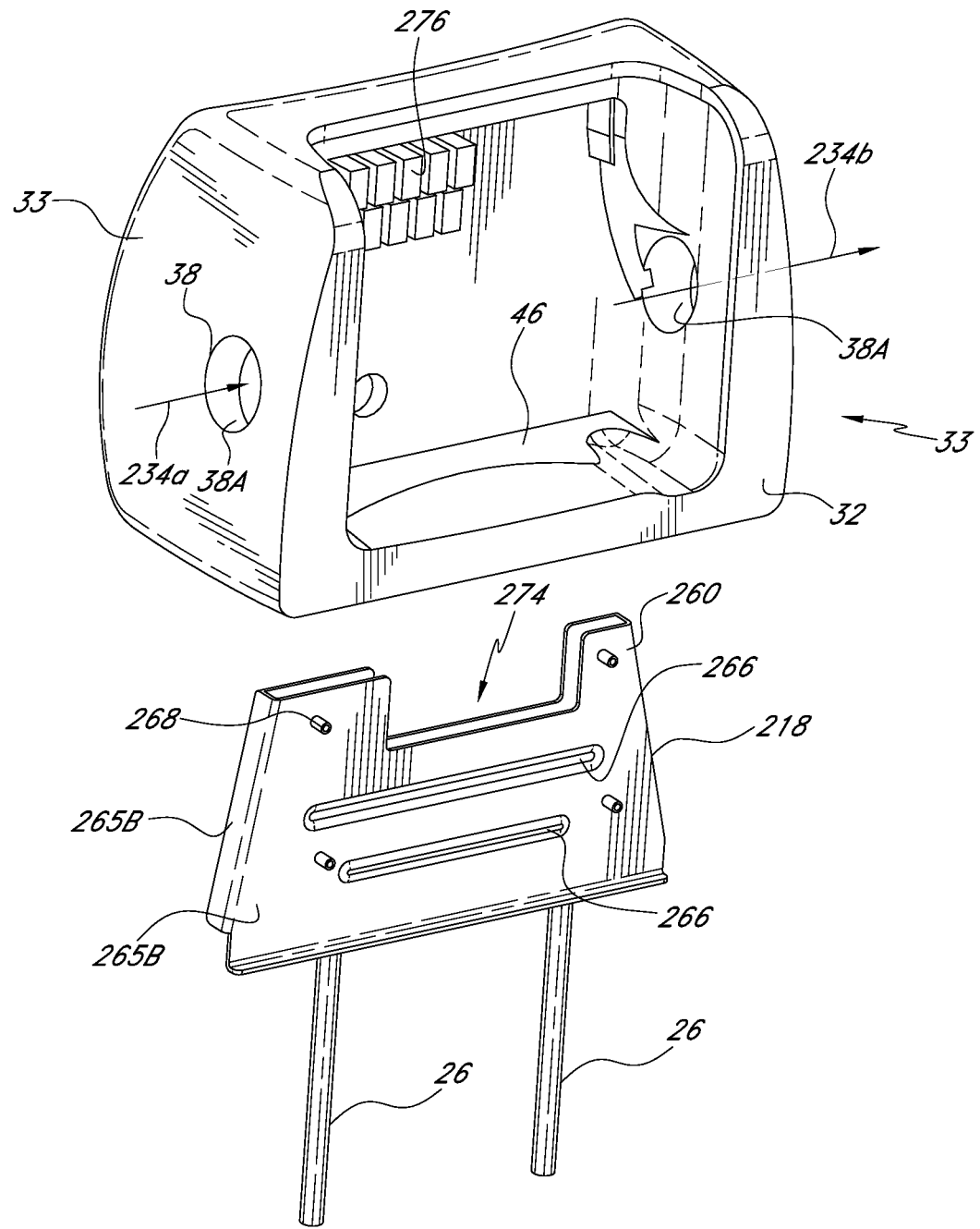
FIG. 13 is a perspective exploded view of one embodiment of a headrest with a portion of one embodiment of a mounting system shown removed therefrom.

In one embodiment, the headrest 14 includes a forward-facing side 28 that includes a pad or a pillow 30 to cushion the head of an occupant in the seat with which the headrest is coupled. The pillow 30 may extend to any of a top, bottom, side-facing side 33, and rear-facing side 32 of the headrest 14, as shown in FIG. 13. Preferably, the pillow 30 is formed by blow-molding a foam material into a mold having a shape and design appropriate for the car in which the headrest 14 is to be used. For example, the headrest 14 can have the same outer shape and design as the factory headrest. The pad 30 can then be wrapped in a suitable material, such as a fabric, e.g., solid or perforated leather, or other suitable material. As discussed further below, in one technique, the pad 30 is blow molded directly onto a portion of the mounting system 22 such that the pad 30 and the mounting system 22 are integrally connected. In another technique, a pad 30 is blow molded as a separate component and is configured to receive at least a portion of the mounting system 22 during assembly such that the pad 30 and the mounting assembly 22 could be disassembled after shipment from the factory.

As discussed above, the pillow 30 provides cushioning for a person seated in the seat with which the headrest 14 is coupled, e.g., to minimize injury in the event of an accident. The headrest 14 preferably also includes a rear-facing side 32. Preferably an entertainment system mounting cavity 34 is formed in the headrest 14. In some embodiments, the entertainment system mounting cavity 34 is accessible from the rear-facing side 32.

Access can be provided to the entertainment system mounting cavity 34 through a mounting cavity aperture 36. Preferably the mounting cavity aperture 36 is shaped to receive the entertainment system 18. In one embodiment, the aperture 36 is at least partially surrounded by a plurality of edges on the rear-facing side 32 of the headrest 14. The aperture 36 can also be partly surrounded by at least one edge on a top surface 37 of the headrest 14. In some arrangements, the headrest 14 includes an intermediate surface that extends between the top surface 37 and the rear-facing surface 32. The intermediate surface can be curved or flat, e.g., radiused or beveled. Accordingly, the mounting cavity aperture 36 can be at least partly surrounded by one or more edges that extend between the top surface 37 and the rear-facing surface 32 of the headrest 14. In other embodiments, the mounting cavity aperture 36 can be at least partially surrounded by one or more edges located on a bottom surface of the headrest 14.

As discussed below, in some embodiments, the entertainment system 18 is configured to be able to move when positioned in the mounting cavity aperture 36. For example, in some embodiments, the entertainment system can pivot at least partially into and out of the entertainment system mounting cavity 34 through the mounting cavity aperture 36.

In some embodiments, the headrest entertainment assembly 10 includes a cooling system to maintain the operating temperature of the components of the headrest entertainment assembly 10 in an acceptable range. Further details of the cooling system are discussed below. In one embodiment, the headrest 14 includes an opening or aperture 38 adjacent which at least a portion of the cooling system can be mounted. The aperture 38 is one configuration of a venting structure that can be incorporated to enhance cooling of the headrest entertainment assembly 10. In some embodiments, at least one of a plurality of apertures 38 and other venting structures adjacent an external surface of the assembly 10 can be provided to enhance cooling. For example, as discussed below, a first aperture 38 can be provided on one surface and a second aperture 38 can be provided on a second surface that is opposite the first surface. This arrangement advantageously increases cross-flow from the first aperture to the second aperture. Cooling of the components of the headrest entertainment assembly 10 can be further enhanced by additional venting structures and by devices, e.g., one or more fans 40, which increase flow across the components thereof. Features of various embodiments of cooling systems will be discussed in greater detail below.

FIG. 13 shows that in some embodiments, a plurality of openings 38 are provided for enhanced cooling of the entertainment system 18. Also, although the openings 38 are located on side surfaces of the headrest 14, these components can be located on other surfaces, such as on one or more of a top surface, a front surface, a rear surface, and a bottom surface. The side surfaces are advantageous locations for the openings 38 because they are exposed in all positions of the headrest 14 and are spaced from the entertainment system 18 and the surface facing the head of the person in the seat. In some arrangements, the top surface of the headrest 14 may be large enough to accommodate openings 38. Wherever positioned, the openings 38 can be any desired shape, e.g., round, elongated. The openings 38 also can be relatively small or relatively large compared to the surface area of the side of the headrest 14 upon which they are located. For example, if a plurality of openings 38 are provided, the openings can be small compared to (in some cases, substantially smaller than) the surface area of the side of the headrest 14 upon which they are located. For example, the openings 38 can be less than about one-half the surface area of the side of the headrest 14 upon which they are located. In other embodiments, the opening(s) 38 can be relatively large, e.g., about one-half or more than, the surface area of the side of the headrest 14 upon which the openings are located. Also, although paired openings 38 are shown as having a similar configuration, e.g., size and shape, multiple openings 38 could be differently configured, e.g., one larger than and one smaller than one-half the surface area of the side upon which they are located.

FIG. 1 shows that an aperture cover 42 extends across the aperture 38 in one embodiment. The aperture cover 42 includes a plurality of discrete openings or venting holes 43 configured to permit air to pass into and out of the entertainment system mounting cavity 34. Such airflow can be used to cool the entertainment system 18 or other components of the headrest entertainment assembly in thermal communication with the system 18.

Figure 1A:
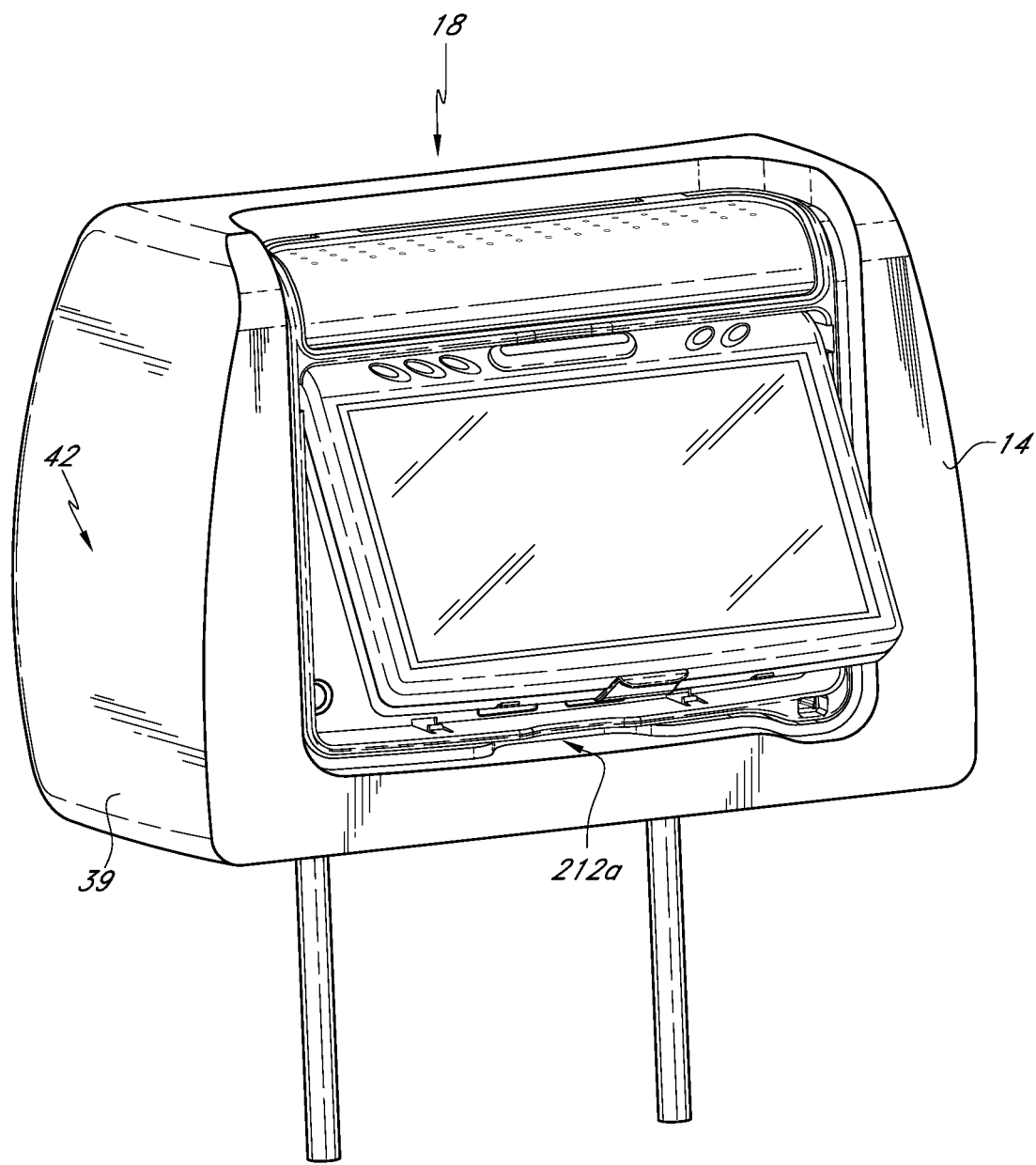
FIG. 1A is similar to FIG. 1 showing another embodiment of a headrest entertainment assembly.

FIG. 1A shows that in some embodiments, visible openings in the aperture cover 42 are not required. This arrangement can be used when other devices are provided to cool the entertainment system 18 such that airflow through the aperture cover 42 is not required. In some arrangements, the aperture cover 42 comprises a porous material membrane that appears solid, but permits airflow therethrough without visible openings. In other arrangements, the aperture cover 42 substantially blocks the aperture 38 where enhanced cooling is not needed, e.g., in entertainment systems that have components that emit low amounts of heat, tolerate greater heat levels, or are disposed in structures not sensitive to heat. In other arrangements, the aperture 38 is not provided. In certain of such arrangements, the material 39 that forms the side surface of the headrest 14 is itself perforated or porous, including structures similar to the venting holes 43 which may or may not be visible.

FIG. 13 shows that the headrest 14 can also include a seat mounting aperture 46 that can be located on a lower or bottom side of the headrest 14. The seat mounting aperture 46 permits at least one component of the mounting system 22 to extend through the bottom side of the headrest 14 to an interior portion thereof. In one embodiment, the entertainment system mounting cavity 34 extends from the rear surface 32 of the headrest 14 to a location vertically above the seat mounting aperture 46. This arrangement permits convenient assembly of the headrest 14 and the entertainment system 18 as discussed below. In some arrangements, a common cavity can be provided in which components of the mounting system 22 and of the entertainment system 18 can be positioned.

FIGS. 2-10 illustrate additional details of various embodiments of the headrest entertainment assembly 10.

In certain embodiments, the entertainment system 18 includes a signal source 78 and a monitor 200. In other embodiments, the entertainment system 18 also includes a component cover 82. In some embodiments, the entertainment system 18 further includes a monitor assembly 74, which includes the monitor 200 and facilitates mounting of the monitor. As discussed below, the monitor assembly 74 provides one or more advantageous features, such as housing the monitor 200, protecting the monitor from damage, locating associated components nearby, and enabling moving or pivoting of the monitor relative to the headrest 14, as discussed further below.

In some embodiments, the entertainment system 18 also includes a component mounting frame 70 to which at least one of the monitor 200 and the signal source 78 are secured. In some arrangements, the mounting frame 70, together with at least one component, provides a unitary construction. In one embodiment, the mounting frame 70 provides a rigid structure for mounting at least one component. In some arrangements, the mounting frame 70 is configured to be coupled with the monitor assembly 74 and the signal source 78. As discussed further below, the mounting frame 70 also can be configured to be coupled with the cover 82 in some embodiments.

In one embodiment, the monitor assembly 74, the signal source 78, and the cover 82 are all coupled with the mounting frame 70 prior to insertion into the entertainment system mounting cavity 34. Preassembling the monitor assembly 74, the signal source 78, and the cover 82 to the mounting frame 70 together is convenient for installation because an installer does not have to separately assemble these components, which can be easily damaged during the installation process if not handled carefully. Further details of techniques for assembling the headrest entertainment assembly 10 are discussed below.

Figure 6:
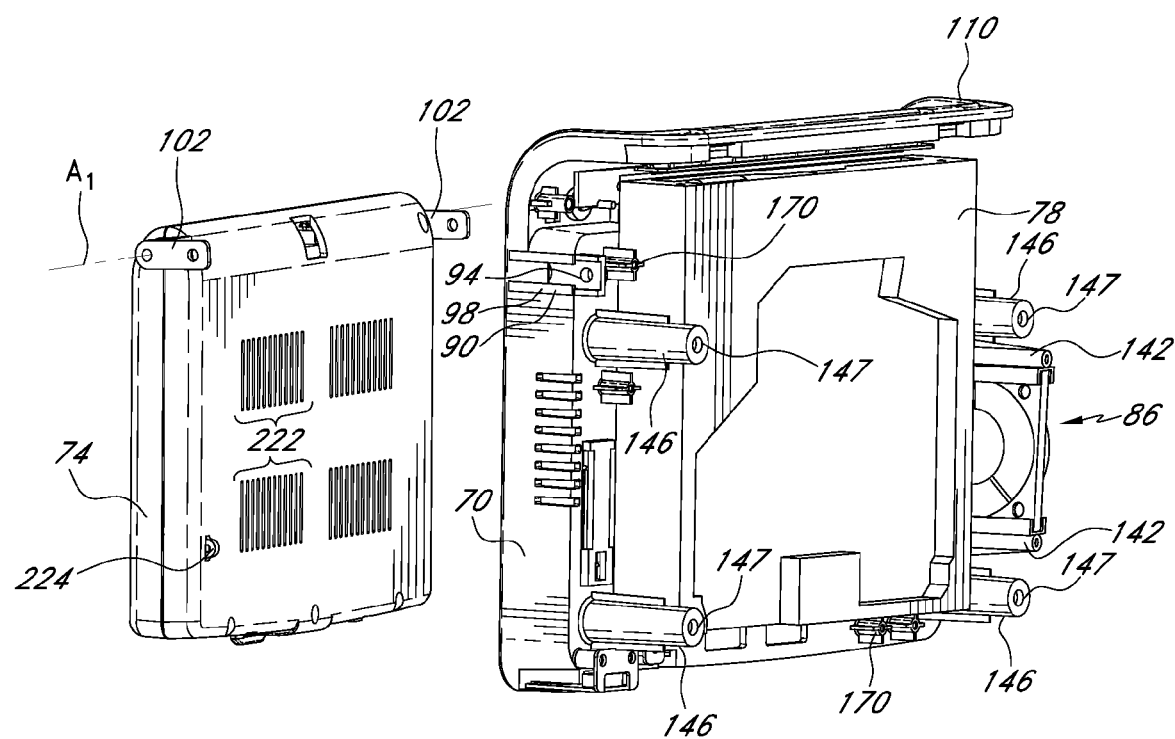
FIG. 6 is a rear perspective exploded view of the entertainment system of FIG. 1 with a monitor assembly removed therefrom.

FIG. 6 shows further details of one embodiment of the component mounting frame 70. The component mounting frame 70 can include a monitor coupling portion 90 to which the monitor assembly 74 can be connected. Preferably, the monitor coupling portion 90 includes one or more hinge mounts 94. Additional structures that can be combined with or incorporated into various embodiments of the assembly 10, including structures for mounting the monitor assembly 74 to the mounting frame 70, are discussed in U.S. Pat. No. 7,044,546, which is hereby expressly incorporated by reference herein. As discussed further below, the monitor coupling portion 90 preferably permits at least a portion of the monitor assembly 74 to move into and out of the entertainment system mounting cavity 34. In one embodiment, the monitor coupling portion 90 enables the monitor assembly 74 to pivot into and out of the entertainment system mounting cavity 34. One arrangement provides a first elongated bracket 98 that includes a hinge mount 94. The hinge mount 94 can include an aperture through which a fastener can be inserted. A second elongated bracket 102 can be coupled with the monitor assembly 74 and can be configured to pivot relative to the monitor assembly 74. Preferably the elongate bracket 102 also includes a hinge mount having a similar configuration to the hinge mount 94.

In one arrangement the monitor assembly 74 is coupled with the frame 70 by a hinge, which may comprise the bracket portions 98, 102.

Coupling of the hinge mounts of the first and second elongate bracket portions 98, 102 can be facilitated by a suitable fastener, for example, a screw or bolt. In other arrangements, a detent arrangement can be relied upon, at least in part, to couple the first and second elongate portions 98, 102. In some embodiments, means for securing the coupling of the first and second elongate portions, or of two portions of the coupling portion 90 can be provided. In one embodiment, the means includes a bonding grease that provides a tighter fit between the first and second elongate portions 98, 102. Where provided, the bonding grease can take any suitable form. Preferably the bonding grease enables movement of the first and second elongate portions 98, 102 relative to each other upon application of a threshold force but prevents such movement upon forces less than the threshold force. Preferably, the securing means, e.g., the bonding grease, prevents the bracket portions 98, 102 from becoming separated from each other due to normal vibration that are induced in the monitor assembly 74 from the vehicle. In other embodiments, the securing means comprises a suitable adhesive which substantially prevents movement due to vibration or any other force.

Figure 5:
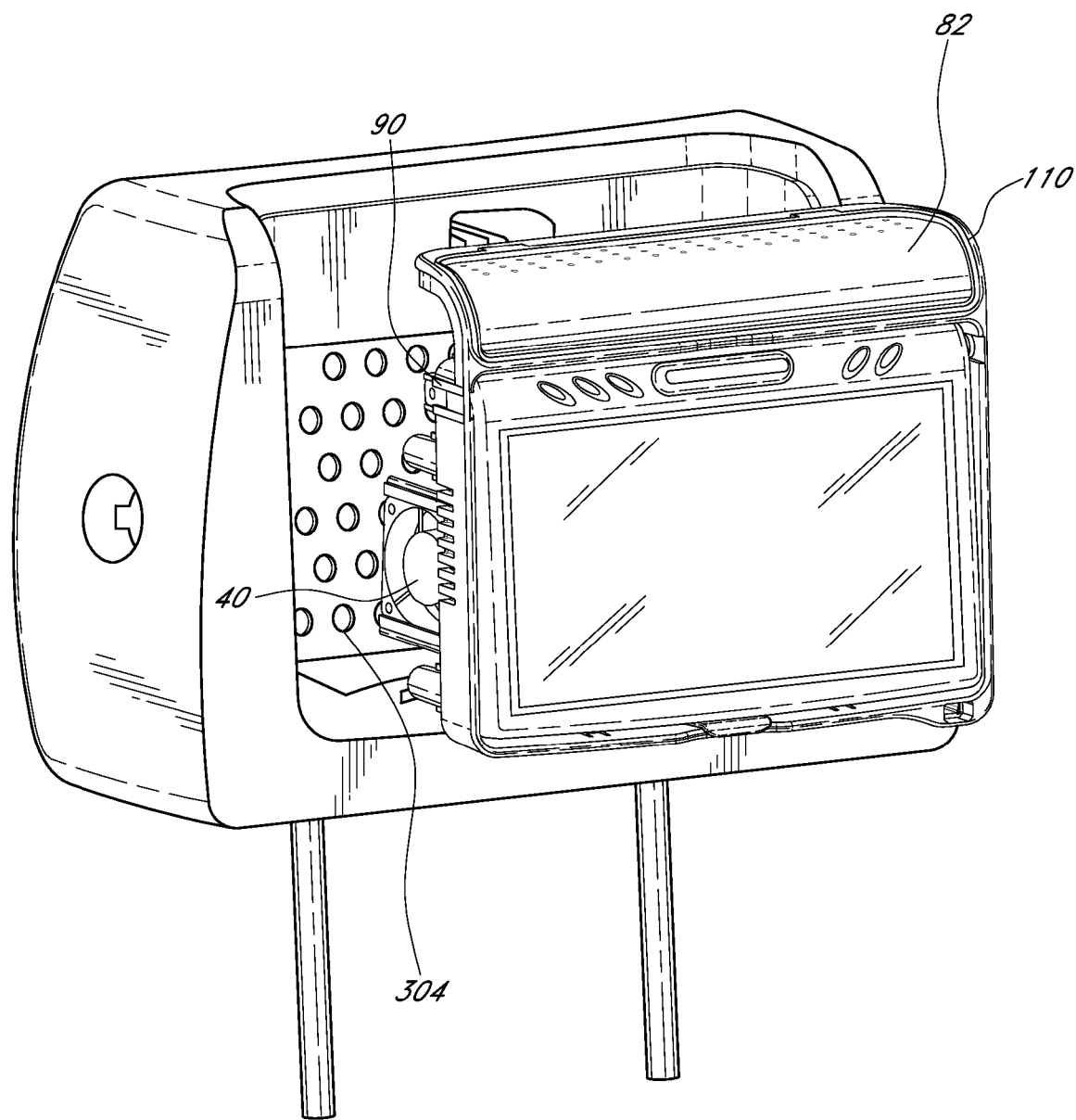
FIG. 5 is a front perspective exploded view of the headrest entertainment assembly of FIG. 1 with the entertainment system removed from the headrest.

When the first and second elongated brackets 98, 102 are coupled at the hinge mounts 94, the monitor assembly 74 is able to pivot relative to the component mounting frame 70. As shown in FIGS. 5 and 6, in one embodiment the component mounting frame 70 includes a plurality (e.g., two) monitor coupling portions 90. FIGS. 5 and 6 also show that in some embodiments a plurality of (e.g., two) hinges can be provided, such as by providing a second elongated bracket 102 on each side of the monitor assembly 74. The illustrated arrangement permits the monitor assembly 74 to pivot about an axis $A_1$ extending through the second elongated brackets 102. In particular, the monitor assembly 74 pivots about the axis $A_1$ at an end of the second elongated bracket 102 opposite an end that is coupled with the first elongate mounting bracket 98 in one embodiment.

As discussed further below, the pivoting of the monitor assembly 74 about the axis $A_1$ serves multiple functions. For example, pivoting enables the monitor 200 to be positioned in an orientation that is most comfortable for the user to view the video signal visible thereon. Pivoting also can enable convenient assembly, by providing an installation position in which the monitor assembly 74 is spaced from the frame 70 sufficiently to expose mounting structures, as discussed below.

The component mounting frame 70 preferably also includes a component cover mount portion 110. The component cover mount portion 110 can comprise a bracket. In one embodiment, the component cover mount portion 110 is located behind (e.g., at a location further recessed from the surface 32 in the mounting cavity aperture 36 when the assembly 10 is assembled) the monitor coupling portion 90. Preferably, the component cover mount portion 110 is located behind a front side of the component mounting frame 70. In one embodiment, the component cover mount portion 110 extends to a location vertically above a component mounting area 114. The component mounting area 114 provides a space or volume into which the signal source 78 can be positioned or mounted as discussed below. The component mounting area 114 can be partially or completely enclosed. In some embodiments, the component mounting area 114 is substantially exposed on a plurality of (e.g., on four) sides.

Figure 2:
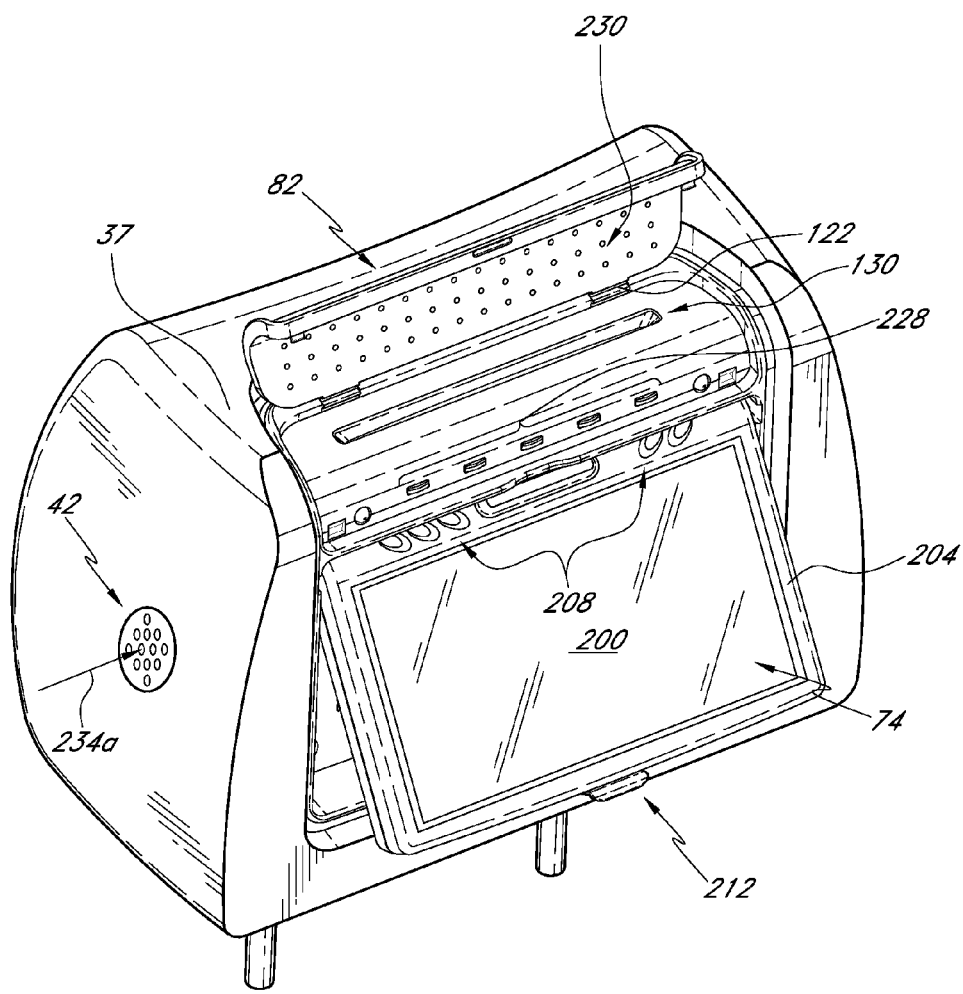
FIG. 2 is a top perspective view of the headrest entertainment assembly of FIG. 1 showing the cover in an open position and showing a monitor of the entertainment system in a tilted position.

FIG. 2 shows that in one embodiment, the component cover mount portion 110 can include a movable mount 122 to which the cover 82 can be coupled. In one form, the movable mount 122 is a hinge. Preferably, the component cover mount portion 110 also includes a component access aperture 130. The access aperture 130 provides access from a location outside the headrest entertainment assembly 10 to the component or signal source 78 located in the component mounting area 114. As discussed further below, the signal source 78 is a DVD player in some embodiments. Accordingly, the component access aperture 130 can be configured as a slot through which a digital video disc ("DVD") can be inserted. In one arrangement, the length of the slot is approximately equal to the width of the monitor 200. In other embodiments, the signal source 78 can be any device that reads a form of media and produces a signal at least partially displayable on the monitor 200. For example, the signal source 78 could also be a photo card reader, a MP3 player, or other similar device.

Figure 7:
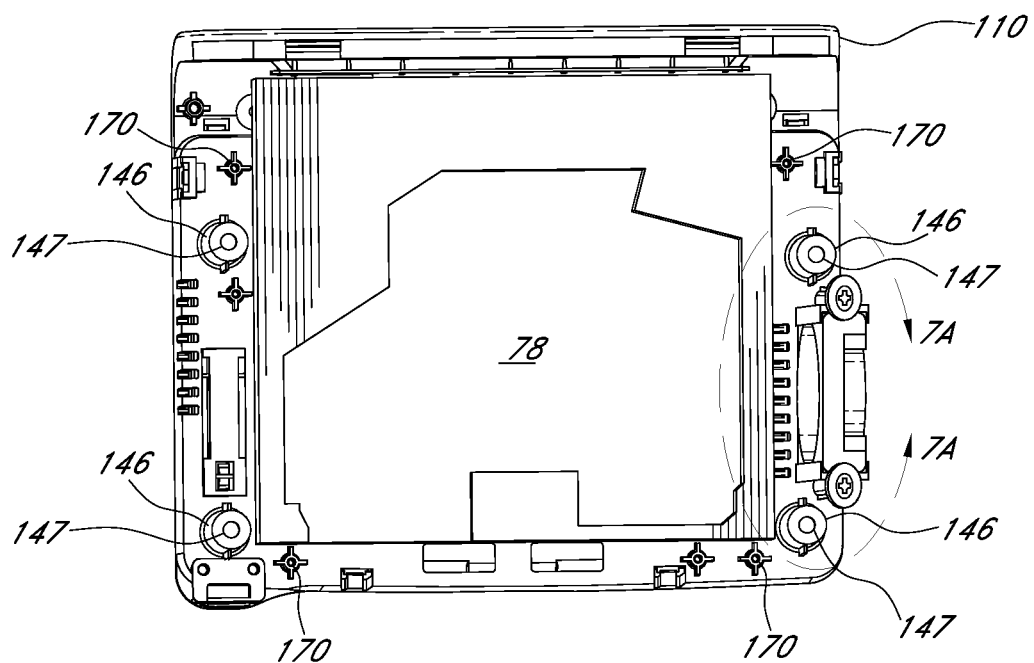
FIG. 7 is a rear plan view of one embodiment of an entertainment system.
Figure 7A:
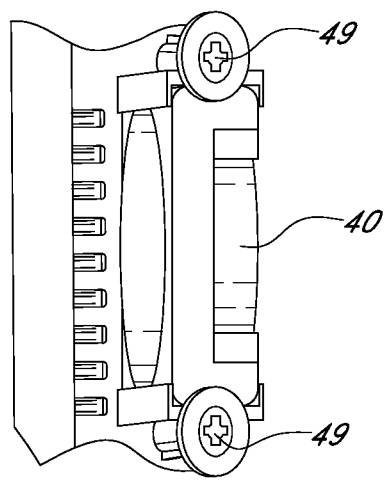
FIG. 7A is an enlarged view of a portion of the entertainment system of FIG. 7.
Figure 8:
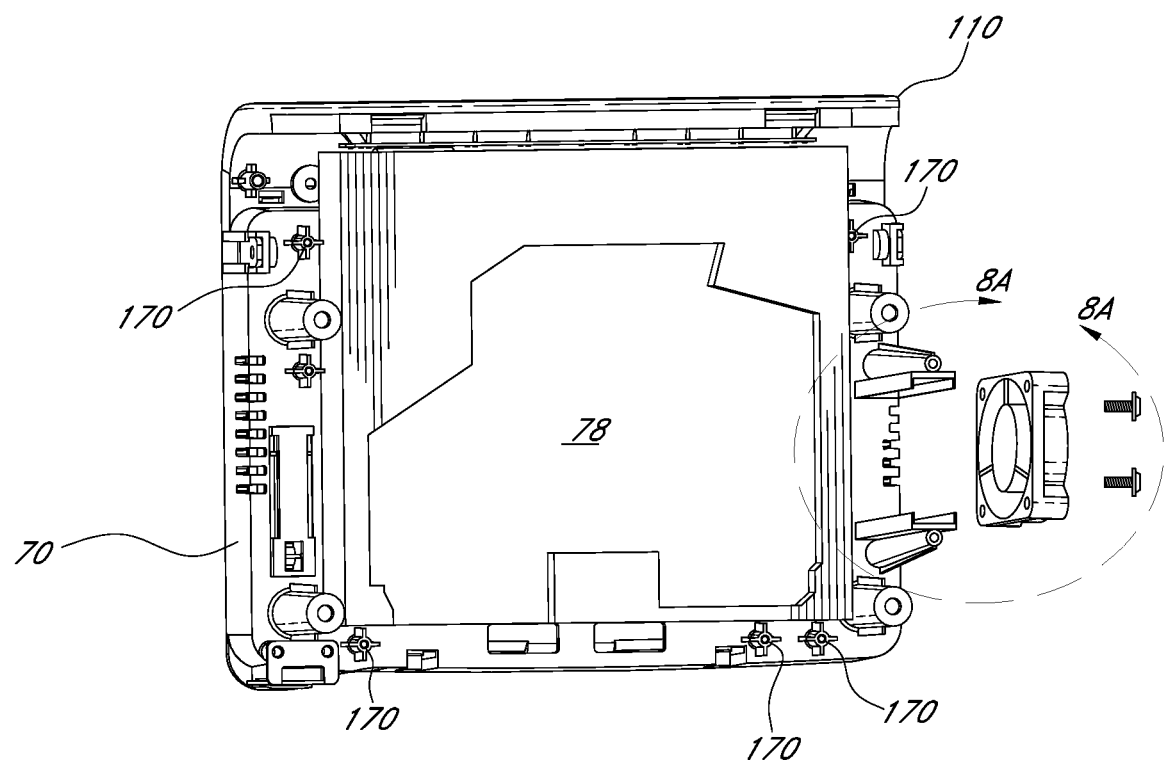
FIG. 8 is a rear perspective exploded view of the entertainment system of FIG. 7 with a portion of a cooling system shown removed therefrom.
Figure 8A:
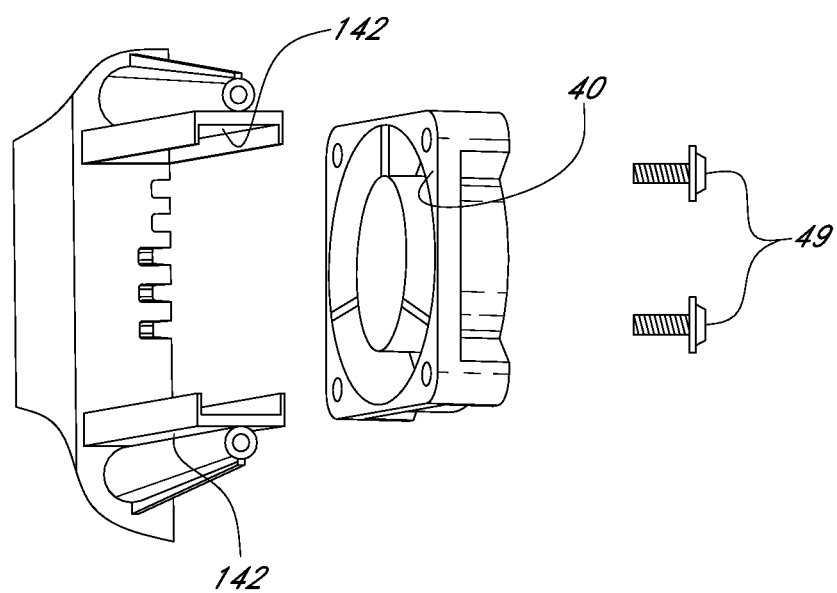
FIG. 8A is an enlarged view of a portion of FIG. 8 showing the removed portion of a cooling system in greater detail.
Figure 9:
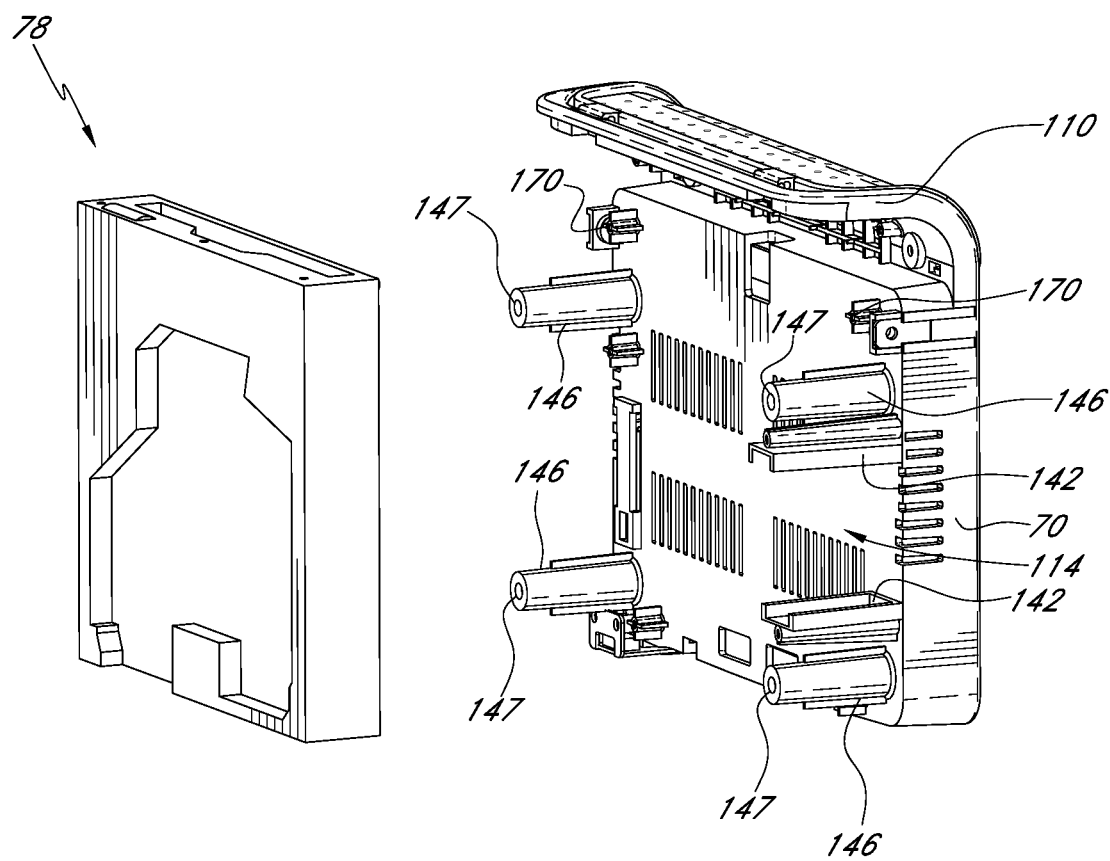
FIG. 9 is a side perspective exploded view of the entertainment system of FIG. 7 showing a signal source removed therefrom.

The component mounting frame 70 also preferably includes one or more cooling system mounts 142. One embodiment of the mounts 142 is shown in detail in FIG. 9. In one arrangement, the mount 142 comprises a pair of posts, each of which includes an elongated slot into which a component of the cooling system 86 can slide. The slots of the cooling system mounts 142 enable quick assembly of the cooling system 86 and the component mounting frame 70. As shown in FIG. 8, the mounts 142 also can include holes formed at an end thereof spaced from the portion of the frame 70 adjacent the monitor assembly 74. Preferably the holes in the mounts 142 are threaded to engage screws. In one assembly technique, as shown in FIGS. 7A and 8A, a cooling fan 40 is positioned between the cooling system mounts 142. The cooling fan 40 is secured in place with fasteners 49 that are advanced through threaded holes in the mounts 142. In some embodiments, each fastener 49 comprises a flange of sufficient width to contact the cooling fan 40. The flange applies a force to an upper surface of the cooling fan 40 which prevents the fan from sliding out of the mounts. In other embodiments, the fasteners are coupled with washers. In still other embodiments, the fasteners are coupled with a stiff, elongate piece that extends between the mounts 142 and contacts a top surface of the fan 40. Each fastener may be secured to a hole in any suitable fashion, e.g., with threads, or a combination of threads and an adhesives whereby loosening of the fastener is minimized or prevented.

The component mounting frame 70 also preferably includes at least one off-set mount post 146. In one embodiment, a plurality of (e.g., four) off-set mount post 146 is provided. In other embodiments, less than four (e.g., one, two, or three) off-set mount posts are provided adjacent an outer portion of the component mount area 114. The off-set mount posts 146 are configured to couple with the mounting system 22, as discussed further below. The off-set mount posts 146 can be configured as elongated structures enabling the component mounting frame 70 to be connected to or otherwise coupled with the mounting system 22. Preferably, the off-set mount posts 146 are at least as long as, and preferably longer than the height or thickness of the signal source 78. This arrangement provides sufficient clearance between the signal source 78 and the mounting system 22.

The off-set mount posts 146 can be configured as conical structures. In one arrangement, the off-set mount posts 146 are elongated conical structures that have an aperture 147 formed at an end thereof spaced from the portion of the components mount frame 70 adjacent to the monitor assembly 74. The aperture 147 in the off-set mount posts 146 preferably is configured for a connecting member (e.g., a screw) to be advanced therethrough to couple with the mounting system 22, as discussed below. In another arrangement, the off-set mount posts 146 are elongated conical structures, with the aperture 147 formed at an end thereof spaced from the component mount frame 70. In another arrangement, the off-set mount posts 146 are hollow with an aperture 148 adjacent the portion of the components mount frame 70 adjacent to the monitor assembly 74. As discussed further below, connecting members can be advanced through at least one of the apertures 147, 148 and received by the mounting system 22 to securely fasten the component mounting frame 70 to the mounting system 22.

In one embodiment, the component mounting frame 70 also includes at least one signal source mounting portion 170. In one embodiment, multiple signal source mounting portions 170 are provided. In one arrangement, four signal source mounting portions 170 are provided. In another arrangement, five signal source mounting portions 170 are provided. Signal source mounting portions 170 can be located adjacent an outer portion of the component mount area 114. The one or more signal source mounting portions 170 are pegs that limit the movement of the signal source but do not coupled with the signal source 78.

In other embodiments, the signal source mounting portions 170 include a bracket through which a fastening member (e.g., a screw or a bolt) can be inserted and to couple the signal source 78 with the component mounting frame 70. In particular, a bracket can extend at least partially around the rear side of the component 78 (e.g., the side farthest from the portion of the component mounting frame adjacent to the monitor assembly 74) and be coupled thereto by at least one fastener (e.g., a screw). Preferably, in this arrangement, the bracket also includes a plurality of flanges that extend out to the signal source mounting post 170. In some arrangements, connecting members can be advanced through these brackets and into threaded holes formed on exposed surfaces of the signal source mounting portions 170.

The component mounting frame 70 is configured to facilitate other aspects and features of the entertainment system 18. For example, the component mounting frame 70 can include a generally planar structure having one or more slots 172 formed therein. The slots 172 can be elongated and positioned close together. Also, a large number of slots 172 can be provided so as to reduce the weight of the component mounting frame 70. In some arrangements, discussed below, the slots 172 function as vents directing heat generated by one or more components away from the entertainment system 18. This feature is discussed more below in connection with an overall discussion of heat dissipation in the headrest entertainment assembly 10.

In one embodiment, a monitor assembly cavity 182 is formed on a forward side of the component mounting frame 70. The cavity 182 permits the monitor assembly 74 to be moved to a fully-closed position, which is a retracted position (shown in FIG. 5). In a retracted position, the monitor assembly 74 may be positioned within the headrest 14, e.g., at a location in front of the rear-facing side 32 thereof.

In one embodiment, the monitor 200 is one component of the monitor assembly 74. The monitor 200 includes a display in one embodiment that can receive video signals from the signal source 78 and display images based on the video signals. In one embodiment, the display or monitor 200 is an active matrix TFT-LCD panel. Preferably, the monitor 200 is relatively thin, enabling the entertainment system 18 to be mounted in a standard headrest 14. In one embodiment, the monitor 200 is a 7-inch TFT-LCD display. The monitor 200 can have a 16:9 widescreen format. The size of the monitor 200 can vary based on the size of the vehicle structure with which it is coupled, e.g., with the size of a headrest, within the scope of this application.

In one embodiment, the monitor 200 is mounted in a monitor housing 204. The housing 204 provides various functions. For example, the monitor housing 204 enables users to handle the monitor assembly 74 without directly touching the monitor 200. Also, the monitor housing 204 is able to absorb some shock to reduce the likelihood that normal interaction with occupants and objects in a vehicle will damage the monitor 200. The monitor housing 204 also can host a plurality of controls 208. The controls 208 can be conventional controls, such as would control the operation of the monitor 200 or an aspect of reproduction of the information from the signal source. In one arrangement, the controls 208 include a feature whereby transmission of a portion of the signal generated by the signal source (e.g., an audio component) is controlled, such as is described in U.S. patent application Ser. No. 10/361,744, filed on Feb. 7, 2003 and published as U.S. Patent Application Publication No. 2004/0080213 A1 on Apr. 29, 2004, the entire contents of which are hereby incorporated by reference herein.

The entertainment system 18 preferably also includes a locking device 212. The locking device 212 can be mounted on the monitor assembly 74, on the components mounting frame 20, or a portion on each of the monitor assembly 74 and the components mounting frame 20. In one embodiment, the locking device 212 includes a catch member 212a and an actuatable latch member 212b. The catch member 212a can be located on the component mounting frame 20, e.g., at least partially within the monitor assembly cavity 182. The actuatable latch member 212b can be located on the monitor housing 204, e.g., adjacent a lower edge thereof. The locking device 212 maintains the monitor 200 in a fully closed position (discussed further below) until the locking device 212 is unlocked, for example by actuating the movable latch 212b. The locking device 212 also can take suitable, conventional forms.

Figure 10:
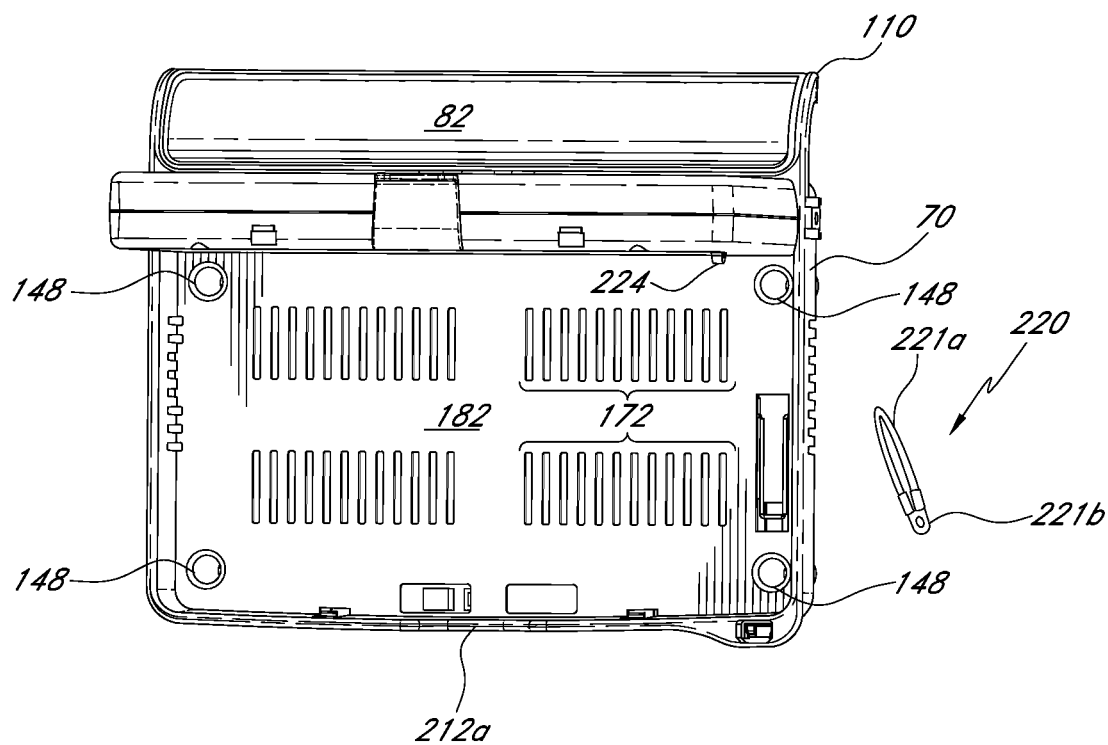
FIG. 10 is a perspective partially exploded view of the entertainment system of FIG. 7 showing portion of a monitor assembly in a tilted position.

In one embodiment, the monitor assembly 74 also includes a motion limiter device 220. In one embodiment, the motion limiter device 220 includes a looped portion 221A coupled at both ends with a mount fixture 221B as shown in FIG. 10. The motion limiter device 220 can take other forms, e.g., as an S-hook, a chain, an elastic member, string, or other conventional coupler. The motion limiter device 220 can comprise an elongate member configured to be connected to the component mounting frame 70 at one end and to a mount portion 224 located on the monitor housing 204 at another end. For example, a post or other structure for coupling to one end of the motion limiter device 220 can be formed in the monitor assembly cavity 182. In another arrangement, an aperture (e.g., a threaded hole) can be formed in the monitor assembly cavity 182 and the motion limiter device 220 can be coupled with the component mounting frame 70 via the aperture, e.g., with a fastener, an adhesive, a combination thereof, or other suitable means. In one embodiment, the mount portion 224 comprises a hook or other structure for coupling to an end of the motion limiter device 220.

In one arrangement, the motion limiter 220 can be quickly disengaged to allow the monitor housing 204 to move to an assembly position, discussed below. This is facilitated in one arrangement by permanently affixing one end of the motion limiter 220 in the monitor assembly cavity 182 and looping the other end around a hook formed on the rear side of the monitor housing 204.

Figure 3:
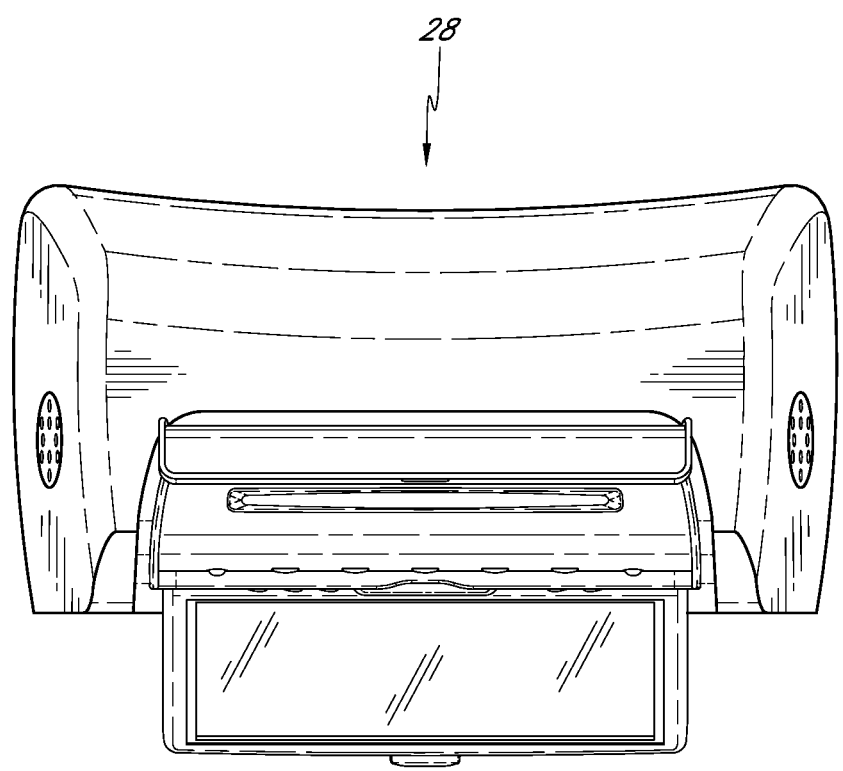
FIG. 3 is a top plan view of the headrest entertainment system of FIG. 1 with the cover in an open position and the monitor in a tilted position.
Figure 4:
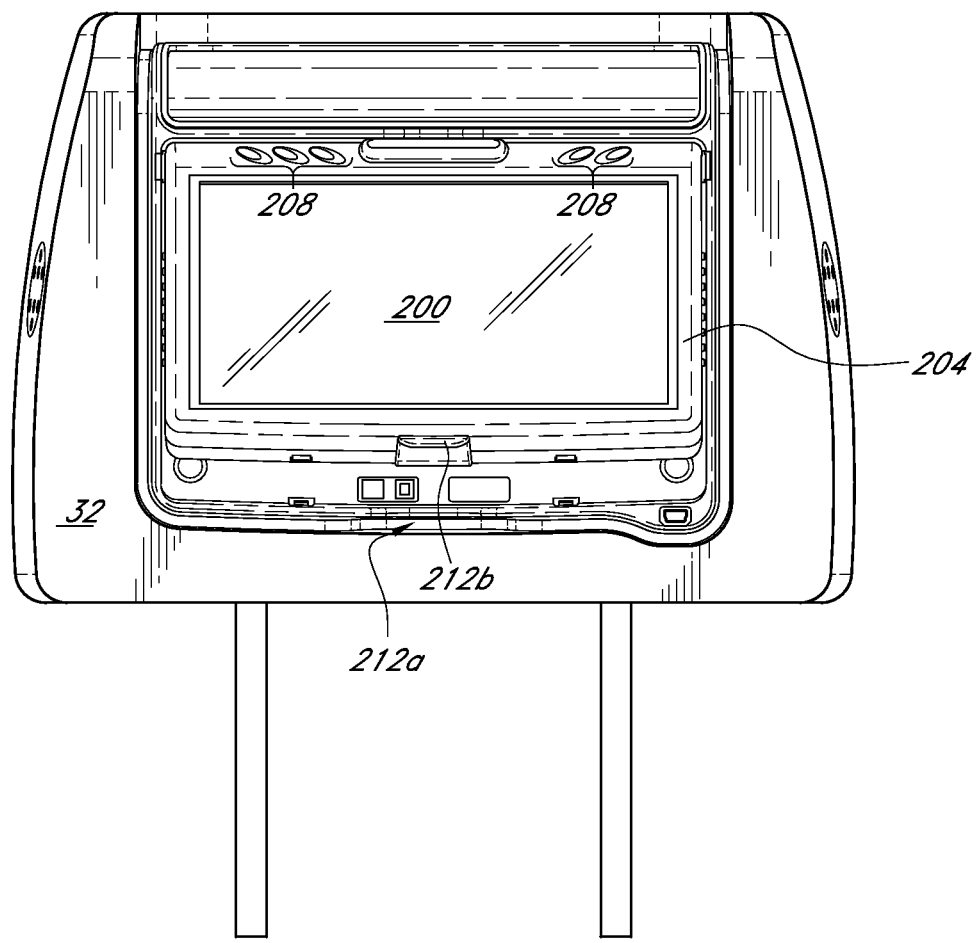
FIG. 4 is a front plan view of the headrest entertainment system of FIG. 1.

As discussed above, the monitor assembly 74 is coupled with the mounting frame 70 in the preferred embodiment. In one arrangement, the monitor assembly 74 is configured to move relative to the component mounting frame 70. Movement of the monitor assembly 74 can alter the orientation of the monitor 200. The arrangement described above enables the monitor 200 of the monitor assembly 74 to move relative to the headrest 14 between a plurality of positions. For example in one embodiment, a fully-closed position is provided in which the monitor 200 is retracted into the monitor assembly cavity 182. The fully-closed position is illustrated in FIGS. 4 and 5. Another position is illustrated in FIGS. 1, 2, and 3, wherein the monitor 200 is tilted out such that a lower end thereof is spaced farther from the monitor assembly cavity 182 than is an upper portion of the monitor 200.

FIG. 10 illustrates a third position in which the monitor 200 is in an installation position. In one embodiment, an installation position orients the monitor 200 at about a 90° angle relative to a plane that includes a base of the monitor assembly cavity 182. This position advantageously provides access to the off-set mount posts 146. For example, where the mounting component frame 70 is coupled with the mounting system 22, discussed below, a fastening device can be inserted through a top portion of off-set mount post 146 (e.g., through the apertures 148). The top portion of the off-set mount post 146 corresponds to the base of the monitor assembly cavity 182 in one embodiment. Fastening devices can further be advanced to the bottom of the off-set mount posts 146 (e.g., through the apertures 147) and coupled with the mounting system 22.

Preferably, the monitor assembly 74 is configured such that when the monitor 200 is positioned in an installation position, such as that shown in FIG. 10, the monitor 200 maintains its orientation relative to the base of the monitor assembly cavity 182. Such an arrangement can be provided by configuring the monitor coupling portion 90 (e.g., the hinge mount(s) 94) such that the monitor 200 locks in place when in the installation position. In one arrangement, the motion limiter 220 can be a bracket or other compression member which holds the monitor 200 in the assembly orientation. One collapsible bracket arrangement is disclosed in U.S. Pat. No. 7,044,546, which is incorporated by reference above.

Preferably, the monitor assembly 74 also includes a plurality of apertures 222 formed in a rear surface thereof. The apertures in the rear surface of the monitor assembly 74 enable heat generated by the monitor 200 to be removed from the monitor assembly 74. As discussed above, the component mounting frame 70 is configured to transfer such heat through apertures formed therein. The apertures 222 can be similar to the apertures 172. In some embodiments, the configuration and position of the apertures 222 and the apertures 172 are the same so that heat can be efficiently vented from the monitor 200 and from the monitor assembly cavity 182. Such heat can further be removed by way of a cooling system 86, discussed below.

FIGS. 1 and 2 illustrate additional aspects of the cover 82, described above. Preferably the cover 82 is configured to move relative to the component cover mount portion 110. As discussed above, the movement can be by way of a movable mount 122 (e.g., a hinge). Preferably the cover 82 is configured to extend from the mount 122 to a location vertically over the component access aperture 130. In one embodiment, the cover 82 extends from the mount 122 to a location vertically over the component access aperture 130 and over one or more control buttons 228 formed on or located adjacent the component cover mount portion 110. The control buttons 228 can be associated with one or more components of the entertainment system 18, e.g., one or more of the signal source 78 and the monitor 200. For example, the control buttons 228 can control at least one aspect of at least one of an audio and a video component of a signal from the signal source 78. In one embodiment, the cover 82 is configured to conform to a portion of the component cover mount portion 110 that is substantially parallel to a top surface of the headrest 14. In another embodiment, the cover 82 is configured to conform to a portion of the component cover mount portion 110 that is substantially parallel to a transitional surface that extends between the top surface and the rear-facing surface 32 of the headrest 14. The component cover 82 can be curved between a top and a transitional surface. Preferably the component cover 82 conforms to an outer surface of the headrest 14.

FIG. 2 shows another feature of the cover 82, which is provided in some embodiments. As discussed further below, the headrest entertainment assembly 10 includes a cooling system configured to efficiently extract heat generated by the components thereof from the headrest 14. To this end, a cover 82 can be provided with one or more venting structures 230. The venting structures 230 are configured to permit heat generated within the headrest, e.g., in the entertainment system mounting cavity 34, to flow out to the outside of the headrest. In one embodiment, the venting structure 230 is provided with the plurality of perforations, which can be formed as an array of small holes. A substantial number of the holes in the array extend at least partially between a lower surface and an upper surface of the cover 82. Accordingly, warm air adjacent the lower surface of the cover 82 can be more quickly transferred to the upper surface of the cover 82 and out of the headrest 14. Although the venting structure 230 is shown in FIG. 2 as a regular array of visible holes, the venting structure can be an irregular array, e.g., concentrated in a portion of the cover over a component that generates more heat.

The venting structure 230 can be configured to be substantially invisible to the naked eye of passengers in some arrangements. In one embodiment, the cover 82 is formed of a permeable material lacking visible holes but through which warm air can be quickly conveyed. Also, a cover 82 may include different numbers of holes in different regions based upon where greater heat is expected to be found. The function of the venting structures in combination with a cooling system will be discussed in greater detail below.

The cover 82 preferably has at least two positions. In a first position, the cover 82 is moved to conform to an upper surface 73 of the component mounting frame 70. For example, the cover 82 can be moved to conform to, or to extend over or otherwise cover, the component cover mount portion 110. In one embodiment, the cover 82 is moved to extend over the component access aperture 130, which is a position sometimes referred to herein as the "closed position" of the cover 82. The closed position advantageously limits access to the component access aperture 130. In some arrangements, the top of the cover 82 is at an elevation below the top of the headrest 14. In other arrangements, the top of the cover 82 is substantially flush with a top surface of the headrest 14, which provides a sleek, continuous appearance as viewed from the front of the headrest 14.

The cover 82 advantageously prevents foreign objects from extending or falling into the access aperture 130 when in the closed position. This feature can prevent such objects from becoming lodged in the signal source 78. For example, a passengers sitting in the seat with which the headrest 14 is coupled may have long hair. Without the cover 82 in the closed position, the person's long hair could slip through the component access aperture 130 and into the signal source 78. If the signal source 78 has moving parts and is operating, the person's hair might become wound around the moving parts. This could harm the person, the signal source, or both.

FIG. 2 shows that the cover 82 has at least one other position. In the second position, the cover 82 is moved away from the access aperture 130. In this position, access is provided to the component access aperture 130 such that media (e.g., a DVD disc, photo card, data card, etc.) can be inserted therethrough into the signal source 78. The second position is sometimes referred to as an "open" position. The open position also is shown in more detail in the top view of FIG. 3. As shown in FIG. 3, the open position provides relatively unrestricted access to the component access aperture 130.

As discussed above, in some embodiments the headrest entertainment assembly 10 is configured to efficiently remove heat from the entertainment system mounting cavity 34 of the headrest. The heat to be removed can be generated by components mounted therein, e.g., the monitor 200 and the signal source 78. In one form, the headrest entertainment assembly 10 is configured for efficient removal of heat by including one or more openings 38 that provide fluid communication between the cavity 34 and the exterior of the headrest 14.

Figure 12:
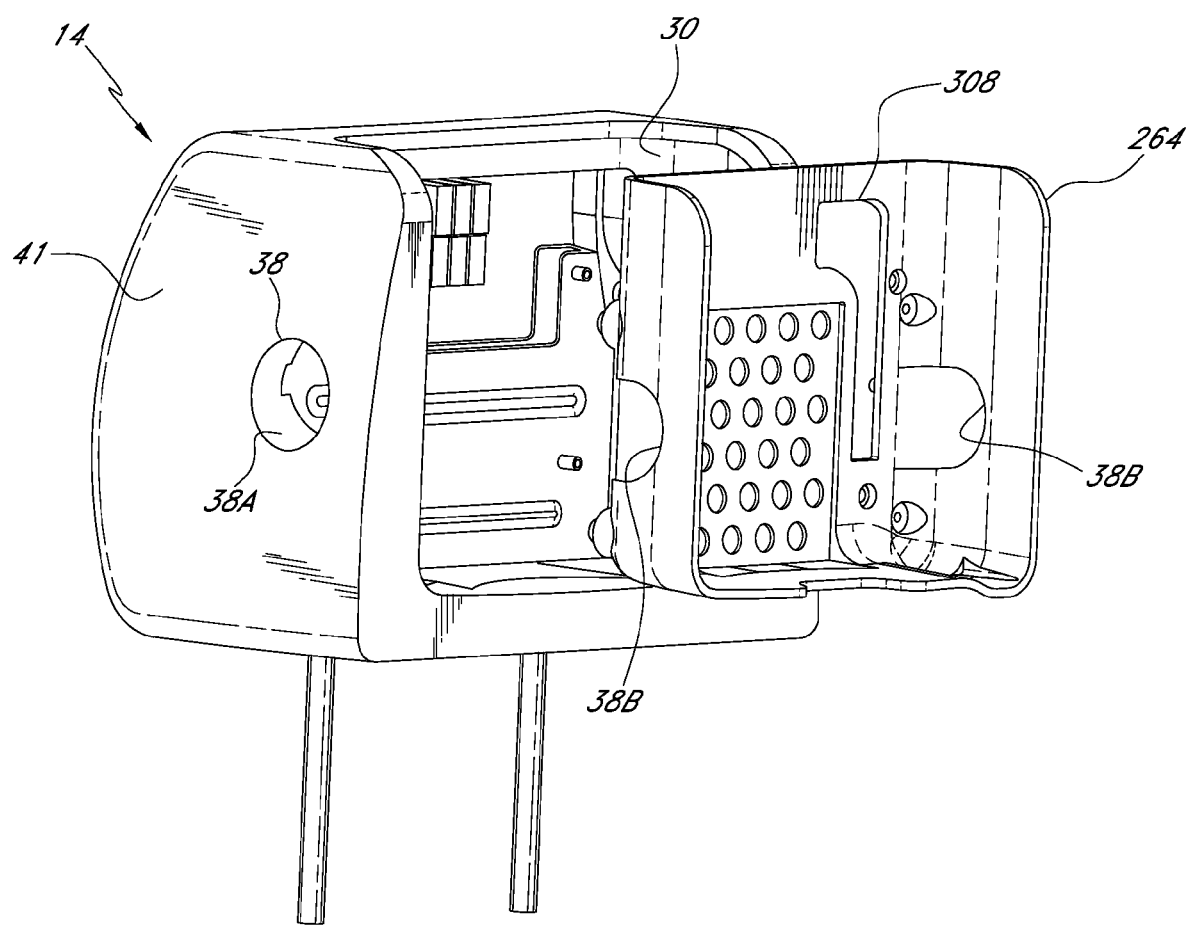
FIG. 12 is a front perspective exploded view of one embodiment of a headrest entertainment system with one embodiment of a component mounting frame shown removed therefrom.

In some embodiments, an airflow path is defined between a first aperture 38 that extends through an outer cover 41 of the headrest 14, a second aperture 38A that extends through the pillow 30, and a third aperture 38B that extends through an entertainment system mounting bracket 264, as shown in FIG. 12. Further enhanced cooling can be provided by including the first, second, and third apertures 38, 38A, and 38B on both sides of the headrest entertainment assembly 10. The outer cover 41 may comprise fabric, such as solid or perforated leather, or other suitable material. In some embodiments, the aperture cover 42 extends across the aperture 38, as discussed above. The aperture cover 42 may be attached to the outer cover 41 by any suitable means, such as, for example, by stitching. In some arrangements, the aperture cover 42 and outer cover 41 form one unitary piece of material.

In certain embodiments, an opening in the pillow 30 aligns with the opening in the outer cover 41. The opening in the pillow 30 may be formed by removing a portion of the pillow, such as by cutting out or punching out the portion. In some embodiments, the opening is formed during fabrication of the pillow. For example, the mold of a blow-molded pillow 30 may be shaped to provide for an opening in the pillow once the mold is removed.

In certain embodiments, an opening in the entertainment system mounting bracket 264 is aligned with the openings in the outer cover 41 and the pillow 30. As discussed above, the off-set mounting posts 146 may be longer than the height or thickness of the signal source 78. In such arrangements, when the mounting posts 146 are fastened to the entertainment system mounting bracket, a cavity is formed between the signal source 78 and the entertainment system mounting bracket 264. In some embodiments, this cavity is in fluid communication with the airflow path defined through the apertures 38, 38A, and 38B, allowing heated air to escape from the cavity through the aperture.

In some embodiments, the openings in the entertainment system mounting bracket 264, the outer cover 41, and the pillow 30 may be offset from each other. In further embodiments, the airflow path is defined within a conduit, e.g., a tube, extending through the openings.

In various embodiments, as discussed above, a plurality of apertures 38 are provided to enhance cooling by creating cross-flow past heat-generating or past heat-sensitive components. As shown in FIG. 12, in some configurations, the apertures may extend through opposing sides of the outer cover 41, the pillow 30, and the entertainment system mounting bracket 264 of the headrest 14. In some embodiments, a cavity is formed between the signal source 78 and the entertainment system mounting bracket 264. The cavity may be in fluid communication with the plurality of apertures 38, thereby allowing a cross-flow of air through the headrest 14. While in some cases, a natural cross-flow is sufficient to remove unwanted heat from the headrest 14, various embodiments provide further enhanced cooling by the structures discussed above. For example, in one embodiment, a cooling fan 40 is coupled with the cooling system mounts 142 as described above.

Figure 15:
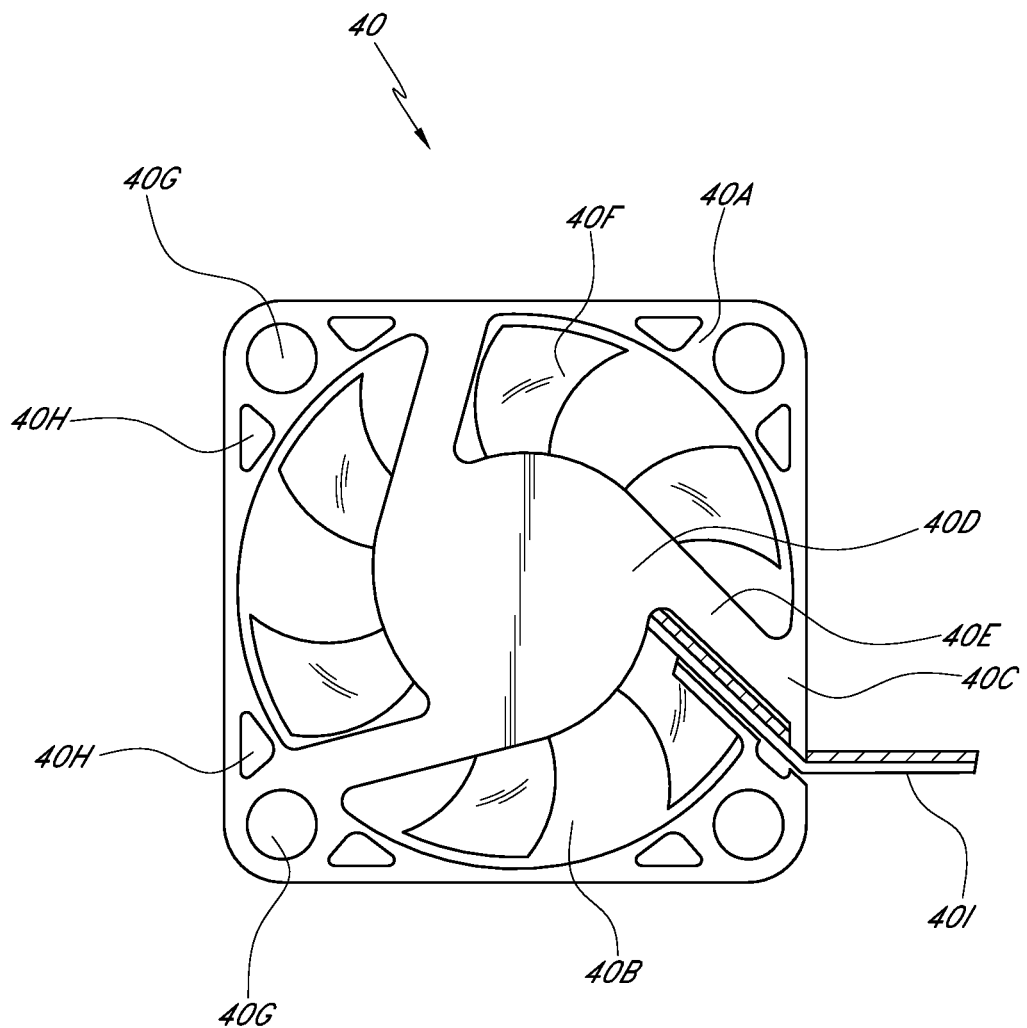
FIG. 15 is a plan view of one embodiment of a cooling fan.

FIG. 15 illustrates one embodiment of a cooling fan 40. The cooling fan 40 comprises a mounting bracket or housing 40A and a plurality of blades 40B. The housing 40A defines a volume within which the plurality of blades 40B can rotate. In certain embodiments, the housing 40A comprises a perimeter portion 40C extending around the periphery of the cooling fan 40 and a central portion 40D that covers a junction (not shown) of the blades 40B. The junction can be a rotatably mounted hub in one embodiment. In some embodiments, the perimeter portion 40C and central portion 40D are connected by one or more support members 40E. The perimeter portion 40C, central portion 40D, and support members 40E can define a plurality of openings 40F through which air can flow.

In certain embodiments, the housing 40A is sized to be inserted between the cooling system mounts 142, as described above with respect to FIGS. 7-9. In some embodiments, the width of the housing 40A is slightly less than the distance between the mounts 142 and the thickness of the housing is slightly less than the width of the elongated slots of the mounts, thereby ensuring a snug fit of the housing within the mounts. In some embodiments, the width of the housing 40A is between about 25 millimeters and about 60 millimeters and the thickness is between about 5 millimeters and 15 millimeters. In one embodiment, the width of the housing 40A is about 40 millimeters and the thickness is about 10.5 millimeters. As shown in FIG. 15, in some embodiments, the housing 40A may be substantially square. In one such embodiment, the width and height of the housing 40A are each about 40 millimeters and the thickness is about 10.5 millimeters.

In some embodiments, the housing 40A comprises a plurality of openings 40G, 40H. The openings 40G may provide an alternative means of mounting the cooling fan 40 to the component mounting frame 70. In some configurations, fasteners are inserted through the openings 40G to secure the housing 40A to a portion of the component mounting frame 70. In some embodiments, the openings 40G, 40H reduce the weight of the housing 40A without compromising the structural integrity of the housing. The openings 40G, 40H may allow venting in addition to that provided by other openings 40F of the housing 40A.

The blades 40B may meet at a common junction (not shown). In some embodiments, the junction is coupled with the central portion 40D of the housing 40A in a manner that allows rotation. In the embodiment depicted in FIG. 15, the axis of rotation is about a line extending perpendicularly through a plane defined by the perimeter portion 40C. In some configurations, the blades 40D rotate clockwise about the axis, and in others, the blades rotate counter-clockwise.

In some configurations, it is desirable that the housing 40A and blades 40B be substantially rigid and lightweight. The housing 40A and the blades 40B may comprise any suitable material, such as plastic.

In certain embodiments, the cooling fan 40 comprises a lead 401 for coupling with a power source (not shown). In some embodiments, the power source operates between about 9.5 Volts and about 15 Volts. The power source provides a direct current in some configurations. The cooling fan 40 can be powered by the car battery. In some embodiments, a battery dedicated to the headrest entertainment assembly 10 powers the cooling fan 40.

The cooling fan 40 can be oriented or configured to force a cooling fluid, e.g., air, into the cavity 34 to enhance convective cooling of heat generating or heat sensitive components located therein. The cooling fan 40 can be oriented or configured to draw a cooling fluid, e.g., air, out of the cavity 34 to enhance convective cooling. Also, a plurality of fans 40 can be used, e.g., one to force air into an aperture 38 and another to draw air out through another opening, enhancing cooling.

The openings 38 can also be used in combination with other venting structures, such as the venting, structures 230 discussed above. This arrangement permits cross-flow of air and allows hot air rising within the cavity 32 to escape therefrom. In another embodiment, the openings 38 and the venting structure 230 are combined with one or more fans.

As discussed above, further enhancement of the cooling system can be incorporated into one or more support structures located inside the cavity 34. For example, the slots and apertures 172 and 222 are configured to permit air to move away from components that may be heat generators or heat sensitive, e.g., the monitor 200 or the signal source 78. The slots 172 can be aligned with the apertures 222 to enhance this movement away from such components and into the stream of flow created by the at least one aperture 38.

Additional cooling can be achieved forward of the entertainment system 18. For example, in one embodiment, at least one component of the mounting system 22 includes perforations or a plurality of small holes 304 through which the movement of hot air can be enhanced. This arrangement fosters additional convective cooling on the forward side of the signal source 78 in the illustrated embodiment.

Various structures have been discussed above that facilitate the efficient removal of heat from the headrest entertainment assembly 10. Efficient removal of heat is facilitated in some embodiments by providing enhanced flow within the headrest 14, e.g., in the entertainment system mounting cavity 34. In the figures, structures that enhance cooling, e.g., by heat transfer by convection, are further illustrates with arrows indicating airflow. Although arrowheads generally indicate the direction of airflow (e.g., from the tail of the arrow to the head), some structures permit airflow to be directed toward the head or toward the tail of the arrow shown.

With reference to FIGS. 1, 2, 12, and 13, an arrow 234a indicates airflow through the aperture 38 (or apertures 38, 38A, 38B). In one arrangement, the airflow indicated by the arrow 234a is through the aperture 38 into the cavity 34. In some applications where relatively little heat is generated or the electronics housed in the headrest 14 are resistant to heat-induced failure, such flow may be sufficient to cool the components. In other embodiments, the cooling fan 40 is mounted to the cooling system mounts 142 such that it is adjacent to the aperture 38. In this arrangement, greater amounts of airflow can be directed into the cavity 34, as indicated by the arrow 234a. An arrow 234b indicates that airflow also can escape from or be forced out of the cavity 34 through another aperture 38 (or set of apertures 38B, 38A, 38), which can be located on an opposite side of the headrest 14. This advantageously creates cross-flow, which is a greater amount of airflow than would be provided through the cavity 34 in the absence of the aperture 38 or another venting structure as described herein.

In most embodiments, cross-flow is enhanced by providing a plurality of pathways for airflow into and out of the cavity 34. In the embodiment of FIG. 13, two apertures 38 are provided to enhance cross-flow through the cavity 34. In another embodiment, the venting structures 230 are a second airflow pathway enabling air to escape from the headrest 14, permitting a greater amount of airflow through the headrest. FIGS. 1 and 2 illustrate that cross-flow is a broad term that includes the positioning of multiple venting structure or apertures on sides of the headrest 14 that are not directly across from each other. Cross-flow enhancing arrangements can be provided by providing at least two venting structures on any combination of the side, the top, or the bottom of the headrest 14. In some embodiments, a plurality of venting structure are provided on the same side of the headrest 14, e.g., one adjacent the fan 40 and one spaced therefrom.

As discussed above, the venting structures 230 are particularly beneficial in providing for egress of heat by convection from the cavity 34 because hot air will rise toward the top of the cavity. One system that provides particularly rapid cooling of the cavity 34 incorporates a plurality of apertures formed on surfaces of the headrest 14 and the venting structure 230 on a top surface of the assembly 10, e.g., on the aperture cover 42.

In some applications the assembly 10 includes a heat management system that incorporates external venting structures, e.g., at least one of the aperture(s) 38 and the venting structure 230, and one or more internal structure configured to enhance heat transfer away from at least one heat generating component. For example, as discussed above, the heat management system can include heat transfer enhancing structures formed on electronic components or housings therefore, such as the apertures 222 formed in the monitor assembly 74. The heat management system also can include heat transfer enhancing structures formed on structures that are partly or occasionally exposed to the external ambient, such as the slots 172 formed in the component mounting frame 70. The heat management system also can include heat transfer enhancing structures formed on structures that are enclosed in or at least substantially entirely enclosed in the cavity 34, e.g., the holes 304 formed in the entertainment system mounting bracket 264.

By combining the venting structures and other heat transfer enhancing structures, more electronic devices can be packed into the confined space of the headrest 14, whereby greater functionality and performance is provided to the assembly 10.

The structures discussed herein for efficiently removing heat from the headrest entertainment assembly 10 provide several advantages. For example, by providing sufficient cooling, multiple components can be mounted within the cavity 34 while maintaining levels of heat that are acceptable to the passenger. Also, the level of heat in the cavity 34 is kept at an acceptable level to reduce component failure due to excessive heating. These and other features make the devices disclosed and claimed herein particularly advantageous.

As discussed above, the headrest entertainment assembly 10 also includes a mounting system 22 that facilitates installation of the entertainment system in the entertainment system mounting cavity 34 of the headrest 14.

In one arrangement, the mounting system 22 includes one or more (e.g., two) seat posts 26, a pillow mounting bracket 260, an entertainment system mounting bracket 264, and an entertainment system mounting feature 268. In one arrangement, as discussed above, the entertainment system mounting bracket 264 is perforated, e.g., with the plurality of small holes 304 formed therein.

In one arrangement, the entertainment system mounting feature 268 comprises a plurality of posts, e.g., four posts, which extend through corresponding apertures in the entertainment system mounting bracket 264. The posts 268 can be threaded to facilitate fastening of the perforated entertainment system mounting bracket 264 to the pillow mounting bracket 260. In one arrangement, the pillow mounting bracket 260 includes a recess, which may be a substantially U-shaped recess, formed on an upper side of the pillow mounting bracket. To give the headrest 14 a more solid feel, a spacer member 276 may be positioned between the pillow 30 and the entertainment system mounting bracket 264.

Further features of the pillow mounting bracket 260 increase the strength of the headrest entertainment assembly 10, particularly of the headrest 14. In one embodiment, as shown in FIG. 13, the pillow mounting bracket 260 includes a first plate-like portion 265A and a second plate-like portion 265B. To provide additional strength to the pillow mounting bracket 260, at least one of the plate-like portions 265A, 265B is provided with one or more reinforcing members 266 to increase the strength of the portion of the plate-like portions 265A, 265B that resides between the posts 26. In one arrangement, the reinforcing member 266 comprises an elongated depression or channel formed in at least one of the plate like portions 265A, 265B. The depression or channel increases the resistance of the plate-like portion to bending or creasing along a plane parallel to the posts in the event of a collision. This arrangement provides other advantages. For example, it can permit other components to be less bulky. For example, a thinner-walled post 26 could be used. As discussed below, providing a thinner walled post 26 increases clearance for routing cables, which makes assembly of the headrest entertainment assembly 10 much easier.

Figure 14:
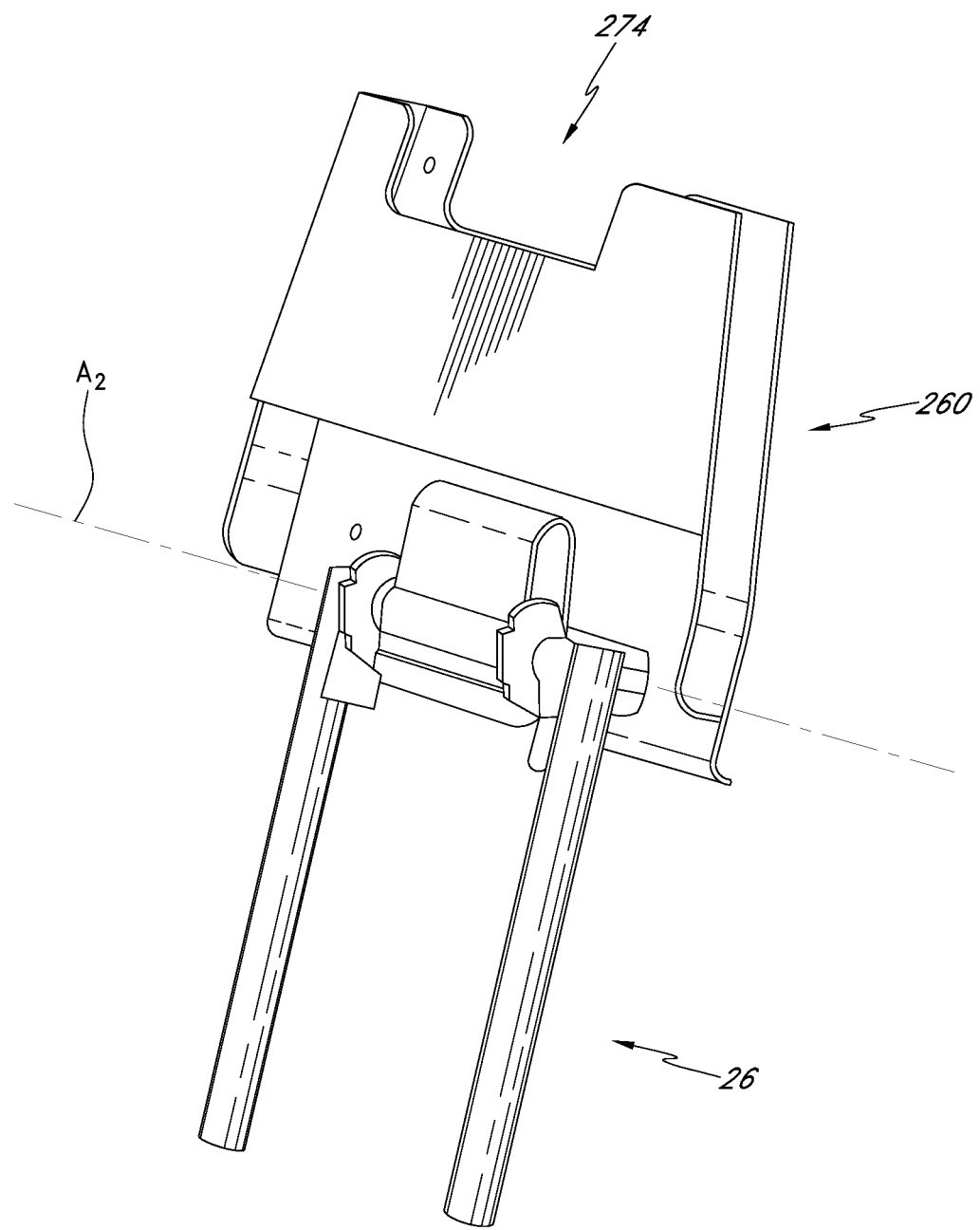
FIG. 14 is a perspective view of one embodiment of a portion of a mounting system.

FIG. 14 shows an axis $A_2$ about which the pillow mounting bracket 260 can be rotated relative to the seat post 26. The headrest 14 can thus be tilted relative to a seat with which it is coupled. In other embodiments, tilting about the axis $A_2$ is not required and is not provided.

FIGS. 12 and 13 illustrate a first stage of one method of assembling the headrest entertainment assembly 10. In the first stage, the pillow 30 and other portions of the headrest 14 generally defining the cavity 34 are provided. The portion of the headrest 14 can be made in any suitable fashion, e.g., by molding. However, as discussed above, this portion of the headrest 14 is a separate, discrete portion of the headrest entertainment assembly 10, e.g., it can be shipped, stored, and inventoried separately from the other components of the assembly 10. As discussed above, this portion of the headrest 14 has a seat mounting aperture 46 through which a pillow mounting bracket 260 can be inserted. FIG. 12 illustrates that in one embodiment, the pillow mounting bracket 260 is inserted through the aperture 46 until the U-shaped portion 274 engages the spacer member 276.

In one technique, thereafter the entertainment system mounting bracket 264 is coupled with the pillow mounting bracket 260 in the cavity 34. FIGS. 5 and 12 illustrate that after the entertainment system mounting bracket 264 is coupled with the pillow mounting bracket 260, the pillow mounting bracket is not able to be separated from the portion of the headrest 14 including the pillow 30. This is one technique for assembling the mounting system 22 to the portion of the headrest 14 including the pillow 30. In one embodiment, the entertainment system mounting bracket 264 includes a passage 308 for routing cables from the entertainment system 18, as discussed below.

In some embodiments, techniques for quickly and efficiently assembling the headrest entertainment assembly 10 involve routing signal cables through the mounting system 22. In particular, one advantageous technique routes signal cables through one or more mount posts 26.

Further techniques for assembling the headrest entertainment assembly 10 are discussed above. In particular, the monitor assembly 74 can be coupled with the frame 70 as discussed above in connection with FIGS. 6-9. Thereafter, the monitor 200 can be tilted to an installation position, such as is shown in FIG. 10. Thereafter fasteners and the motion limiter 220 can be applied to couple the frame 70 to the mounting system 22.

Figure 16:
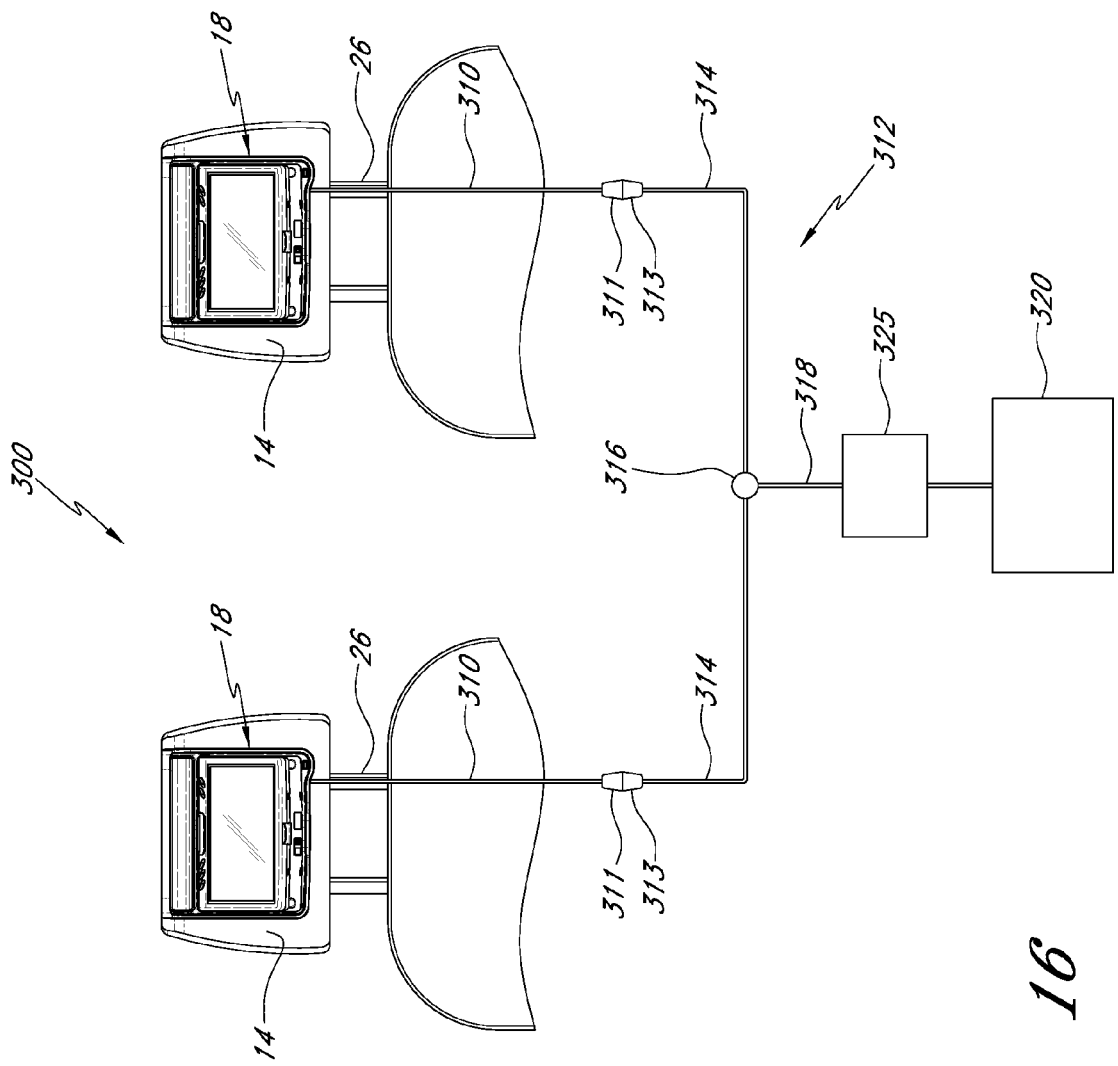
FIG. 16 is a schematic illustration of one embodiment of a mobile video system having an adapter coupled with a first and second entertainment system.

FIG. 16 schematically illustrates one embodiment of a video system 300 comprising multiple entertainment systems 18. In certain embodiments, each entertainment system 18 is mounted in the headrest 14 of a vehicle. Each entertainment system 18 can be coupled with an entertainment system cable 310 capable of extending through the post 26 of the headrest 14. In some embodiments, each entertainment system cable 310 comprises an entertainment system plug or connector 311 sized and configured to extend through the post 26. In certain embodiments, each entertainment system connector 311 can be configured to couple with an adapter 312. In some embodiments, the adapter 312 comprises adapter plugs or connectors 313 configured to couple with the entertainment system connectors 311. The adapter 312 can further comprise one or more primary adapter cables 314 coupled with the adapter connectors 313. In certain configurations, the one or more primary adapter cables 314 and an auxiliary adapter cable 318 extend from a junction 316. In some embodiments, the adapter 312 is coupled with a power source 320. In further embodiments, the adapter 312 is coupled with the power source 320 via a noise suppressor 325.

FIG. 16A illustrates one advantageous embodiment of the adapter 312. In the illustrated embodiment, the adapter 312 comprises a single unit having a first branch 331, a second branch 332, and a third branch 333. Each of the first and second branches 331, 332 includes a primary adapter cable 314 having the junction 316 at one end and an adapter connector 313 at another end. The third branch 333 includes a secondary adapter cable 318 having the junction 316 at one end and a heat shrink tube 340 at another end. As further described below, each of the primary and secondary adapter cables 314, 318 can include one or more branches of communication lines and/or electrical lines. In some embodiments, the junction 316 includes a heat shrink tube that tightly engages the primary and secondary adapter cables 314, 318.

In the illustrated embodiment, one branch of a first electrical line 351 and one branch of a second electrical line 352 extend from the tube 340, which in some embodiments, is a heat shrink tube. In certain embodiments, the first electrical line 351 comprises a fuse 355 and an interlocking connector 361 configured to couple with the noise suppressor 325. In certain embodiments, the second electrical line 352 comprises an interlocking connector 362 configured to couple with the noise suppressor 325. The noise suppressor 325 can be coupled with the power source 320.

With reference to FIG. 16B, in some embodiments, each adapter connector 313 includes a coupling interface 370 for coupling with an entertainment system connector 311. In certain advantageous embodiments, the coupling interface 370 includes any suitable interface, such as a pin/sheath or a plug/socket interface, for creating a mechanical and electrical connection between an adapter connector 313 and an entertainment system connector 311. In the illustrated embodiment, the coupling interface 370 of the adapter connector 313 comprises seven pins for coupling with an entertainment system connector having seven sheaths.

As described in further detail below, in certain embodiments, the adapter 312 allows entertainment systems 18 to be interconnected rapidly and efficiently. In some advantageous embodiments, the adapter 312 couples an output of a first entertainment system 18 with an input of a second entertainment system 18, and couples an output of the second entertainment system 18 with an input of the first entertainment system 18. In many embodiments, the entertainment system connectors 311 of the entertainment systems 18 have the same configuration, and the first branch 331 or the second branch 332 of the adapter 312 can be coupled with either the first or second entertainment system 18. Accordingly, the first and second adapter branches 331, 332 can be interchangeable, which can greatly facilitate installation of multiple entertainment systems 18. Additionally, the adapter can couple multiple entertainment systems 18 with a power source via a single set of electrical lines, which can also facilitate installation.

Figure 17:
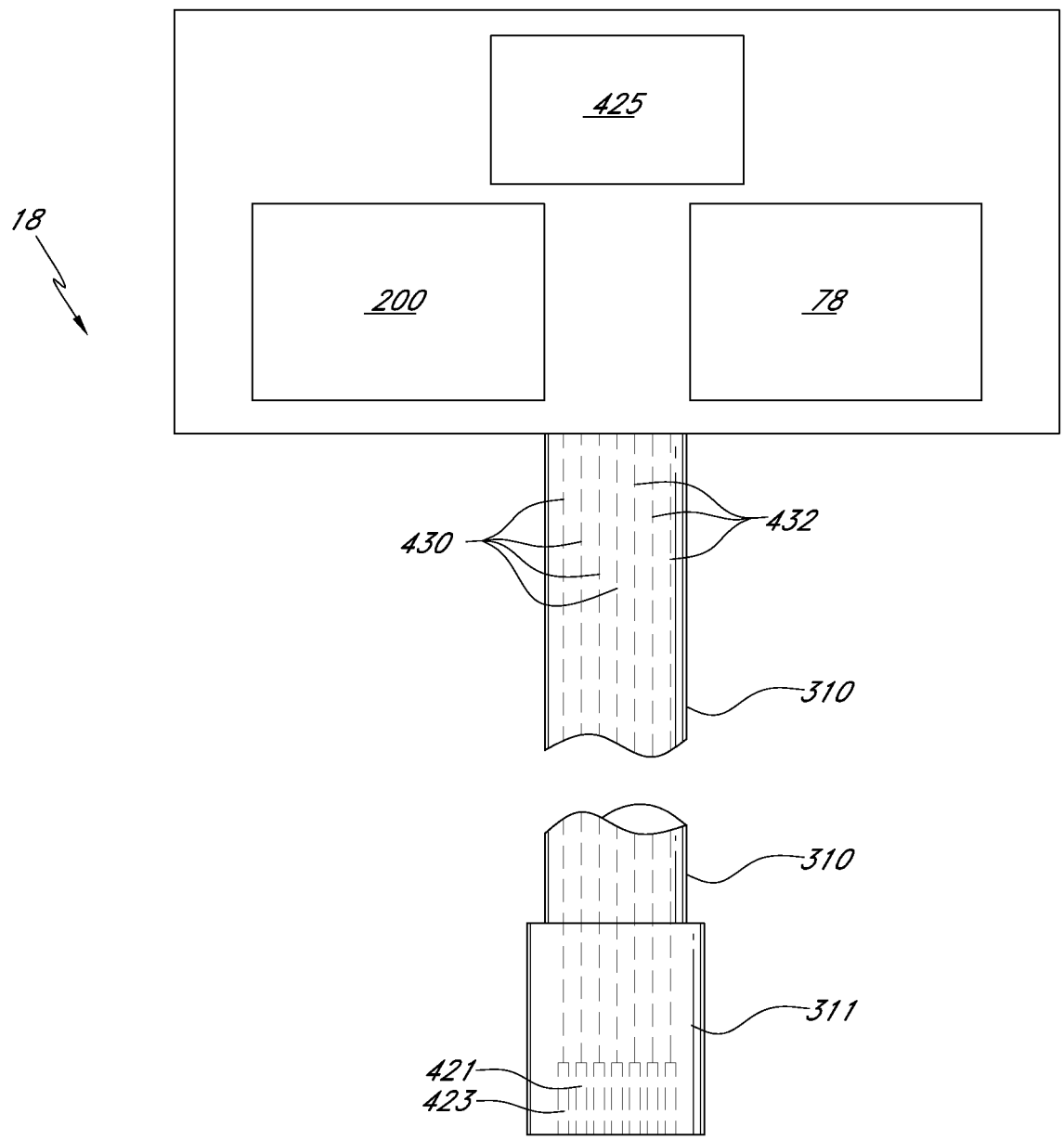
FIG. 17 is a schematic illustration of one embodiment of an entertainment system.

As schematically illustrated in FIG. 17, in certain embodiments, the entertainment system 18 comprises the signal source 78 and the monitor 200. The signal source 78 is capable of producing a signal, at least a portion of which is displayable on the monitor 200. In some embodiments, the signal source 78 is a device that reads a form of media and produces a signal at least partially displayable on the monitor 200. For example, the signal source 78 can be a DVD player, a photo card reader, or an MP3 player.

In some configurations, the entertainment system 18 comprises an output 421 for communicating the signal produced by the signal source 78 to a device other than the monitor 200. For example, via the output 421 of one entertainment system 18, the signal from the signal source 78 can be communicated to a separate entertainment system 18. In some embodiments, the monitor 200 of the entertainment system 18 comprises the output 421. In other embodiments, the signal source 78 of the entertainment system 18 comprises the output 421. In still other embodiments, a pin, plug, or other coupling device of the entertainment system connector 311 comprises the output 421.

In some configurations, the entertainment system 18 comprises an input 423 for receiving a signal. In some arrangements, the signal received via the input 423 of one entertainment system 18 is generated by the signal source 78 of a separate entertainment system 18. In some embodiments, the monitor 200 of the entertainment system 18 comprises the input 423. In other embodiments, the signal source 78 of the entertainment system 18 comprises the input 423. In still other embodiments, a pin, plug, or other coupling device of the entertainment system connector 311 comprises the input 423. Accordingly, in some embodiments, a single connector 311 comprises the input 423 and the output 421 of the entertainment system 18.

In certain embodiments, the monitor 200 of the entertainment system 18 is operable in more than one state. In some embodiments, the monitor 200 displays at least a portion of a signal communicated via the output 421 when in one state, and displays at least a portion of a signal received via the input 423 when in another state. For example, in some preferred embodiments, the video system 300 comprises two entertainment systems 18 generating separate signals. In a first state, the monitor 200 of the first entertainment system 18 displays at least a portion of a first signal generated by the first signal source 78 that is communicated via the output 421, and in a second state, the monitor 200 displays at least a portion of a second signal generated by the second system 18 and obtained via the input 423. In some embodiments, the entertainment system 18 comprises multiple inputs 423 and/or multiple outputs 421. In certain of such embodiments, the monitor 200 can operate in multiple states, displaying the signal associated with each input 423 or output 421 of the entertainment system 18 in at least one separate state.

In some embodiments, the entertainment system 18 comprises one or more transmitters 425 for delivering audio information. In certain preferred embodiments, the transmitter 425 operates at infrared frequencies. In other embodiments, the transmitter 425 operates at radio frequencies. In some embodiments, the video system 300 comprises two entertainment systems 18, each one comprising a transmitter 425. In certain of such embodiments, the first entertainment system 18 is configured to generate a first video signal and a first audio signal, to deliver at least a portion of the first video signal via the first output 421, to deliver at least a portion of the first audio signal via the first transmitter 425, and/or to receive at least a portion of a second video signal via the first input 423. In certain embodiments, the second entertainment system is configured to generate the second video signal and a second audio signal, to deliver at least a portion of the second video signal via the second output 421, to deliver at least a portion of the second audio signal via the second transmitter 425 (preferably at a frequency different from that employed by the first transmitter 425), and/or to receive at least a portion of the first video signal via the second input 423. By selecting among operating states, a user can access the first or second video signal via the monitor 200 of either system 18. The user can also select the first or second audio signal via a receiver, such as a radio within the vehicle or a personal headset, by tuning to the transmitted frequency.

In certain embodiments, signals are communicated from and/or delivered to the entertainment system 18 via the entertainment system cable 310. The entertainment system cable 310 can comprise one or more communication lines 430, such as, for example, electrical wires, optical fibers, and/or any other suitable lines for communicating information. In certain embodiments, the input 423 and the output 421 of the entertainment system 18 are each coupled with a separate communication line 430. Accordingly, in some embodiments the entertainment system cable 310 comprises one communication line 430 dedicated to the input 423 and another communication line 430 dedicated to the output 421 of the entertainment system 18. In other embodiments, the entertainment system cable 310 comprises a separate communication line 430 for each of multiple inputs 423 and multiple outputs of the entertainment system 18.

In some embodiments, the entertainment system cable 310 comprises one or more electrical lines 432 for delivering power to the entertainment system 18. The electrical lines 432 can comprise electrical wires or any other suitable lines for transmitting power. The entertainment system cable 310 can also include one or more electrical lines 432 for electrically grounding the entertainment system 18. For example, in some configurations, the entertainment system cable 310 comprises one electrical line 432 for coupling the system 18 with a ground of the power source 320 and comprises another electrical line 432 providing a common reference or common ground for the entertainment systems 18.

Figure 18:
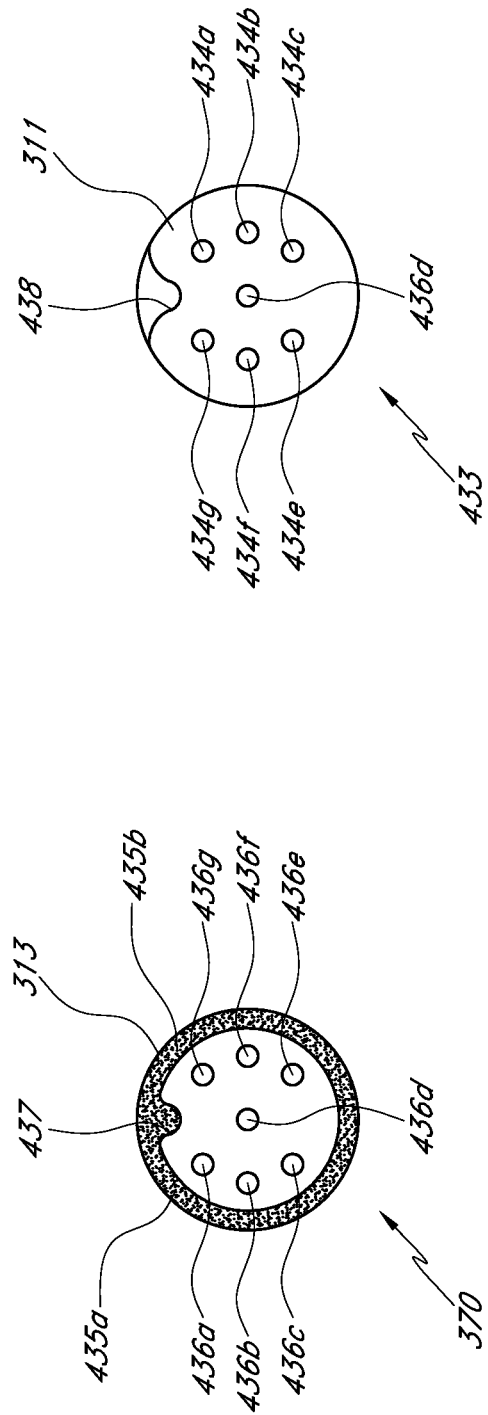
FIG. 18 is a top plan view of one embodiment of an entertainment system connector and one embodiment of an adapter connector.

As illustrated in FIG. 18, in certain embodiments, the entertainment system connector 311 comprises a coupling interface 433. The coupling interface 433 can include any suitable interface, such as a pin/sheath or a plug/socket interface, for creating a connection with a coupling interface 370 of an adapter connector 313. The connection can be a mechanical connection, a friction fit, or some other suitable connection. In some embodiments, the coupling interface 433 comprises a plurality of couplers 434, which are sheaths in the illustrated embodiment. In certain arrangements, a separate coupler or sheath 434 is coupled with each communication line 430 or electrical line 432 of the entertainment system cable 310. For example, in the illustrated embodiment, one sheath 434a is coupled with a communication line 430 dedicated to the output 421 of the entertainment system 18, and another sheath 434b is coupled with a communication line 430 dedicated to the input 423 of the entertainment system 18. In some preferred configurations, each sheath 434 is sized to contact an outer surface of a pin, as described below.

In certain embodiments, the entertainment system connector 311 is sized and configured to extend through the post 26 of the headrest 14. As described above, the inner cross-sectional size (e.g., diameter) of a hollow passage extending through the post 26 can be increased to allow the passage therethrough of a larger entertainment system connector 311 comprising a greater number of sheaths 434. In some situations, this can be accomplished by increasing the size (e.g., the inner and outer diameter) of the posts 26. In other situations, the wall thickness of the posts 26 can be decreased. In the embodiment illustrated in FIG. 18, the entertainment system connector 311 comprises seven sheaths 434. Other embodiments can comprise more or fewer sheaths 434.

With continued reference to FIG. 18, in certain embodiments, an adapter connector 313 comprises a coupling interface 370 having a plurality of couplers 436, which are pins in the illustrated embodiment, that are configured to cooperate with the sheaths 434. As noted above, arrangements other than pin/sheath or plug/socket interfaces are possible for the coupling interfaces 370, 433. In the illustrated embodiment, each of the couplers or pins 436a-g is sized and dimensioned to fit snugly within a corresponding sheath 434a-g. In preferred embodiments, at least a portion of each pin 436 and each sheath 434 is capable of conducting electrical signals. The conducting portions of the pins 436 and sheaths 434 preferably contact one another when the entertainment system connector 311 and adapter connector 313 are coupled.

In other embodiments, the entertainment system connector 311 comprises pins 436 and the adapter connector comprises sheaths 434. In still other embodiments, each connector 311, 313 comprises a combination of pins 436 and sheaths 434. In some configurations, the connectors 311, 313 comprise complementary connection interface members configured to transmit optical signals, rather than electrical signals.

In certain embodiments, the connector 313 comprises a sleeve 435a. In some embodiments, the pins 436 are housed within the sleeve 435a and do not extend beyond a rim 435b (also shown in FIG. 19) of the sleeve 435a. Accordingly, in some embodiments, the sleeve 435a can protect the pins 436 from being bent or otherwise damaged prior to coupling with the sheaths 434 of the connector 311. In many embodiments, the connector 311 is sized and configured to fit snugly within the sleeve 435a when coupled with the connector 313.

Figure 19:
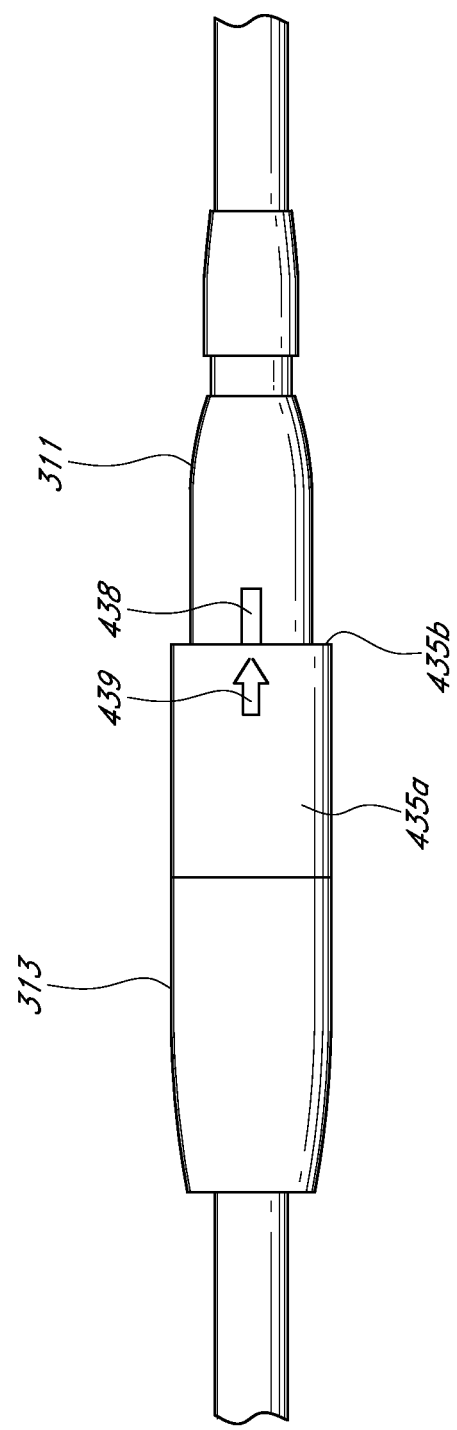
FIG. 19 is a front plan view of one embodiment of an entertainment system connector coupled with an adapter connector.

In certain embodiments, the entertainment system connector 311 and adapter connector 313 can be joined only when the sheaths 434 and the pins 436 are properly aligned. As shown in the illustrated embodiment, the adapter connector 313 can comprise a ridge 437 that extends inwardly from the sleeve 435a of the connector 313. In certain embodiments, the ridge 437 is sized and shaped to fit in a channel 438 of the entertainment system connector 311. As illustrated in FIG. 19, the adapter connector 313 can comprise an indicator 439, such as an imprinted or painted arrow, on an outer surface thereof for demonstrating the location of the ridge 437 on an inner surface thereof. In many embodiments, the indicator 439 permits proper connection of the entertainment system connector 311 and the adapter connector 313 without inspection of the inner surface of the adapter connector 313, thereby facilitating the connection process.

Figure 20:
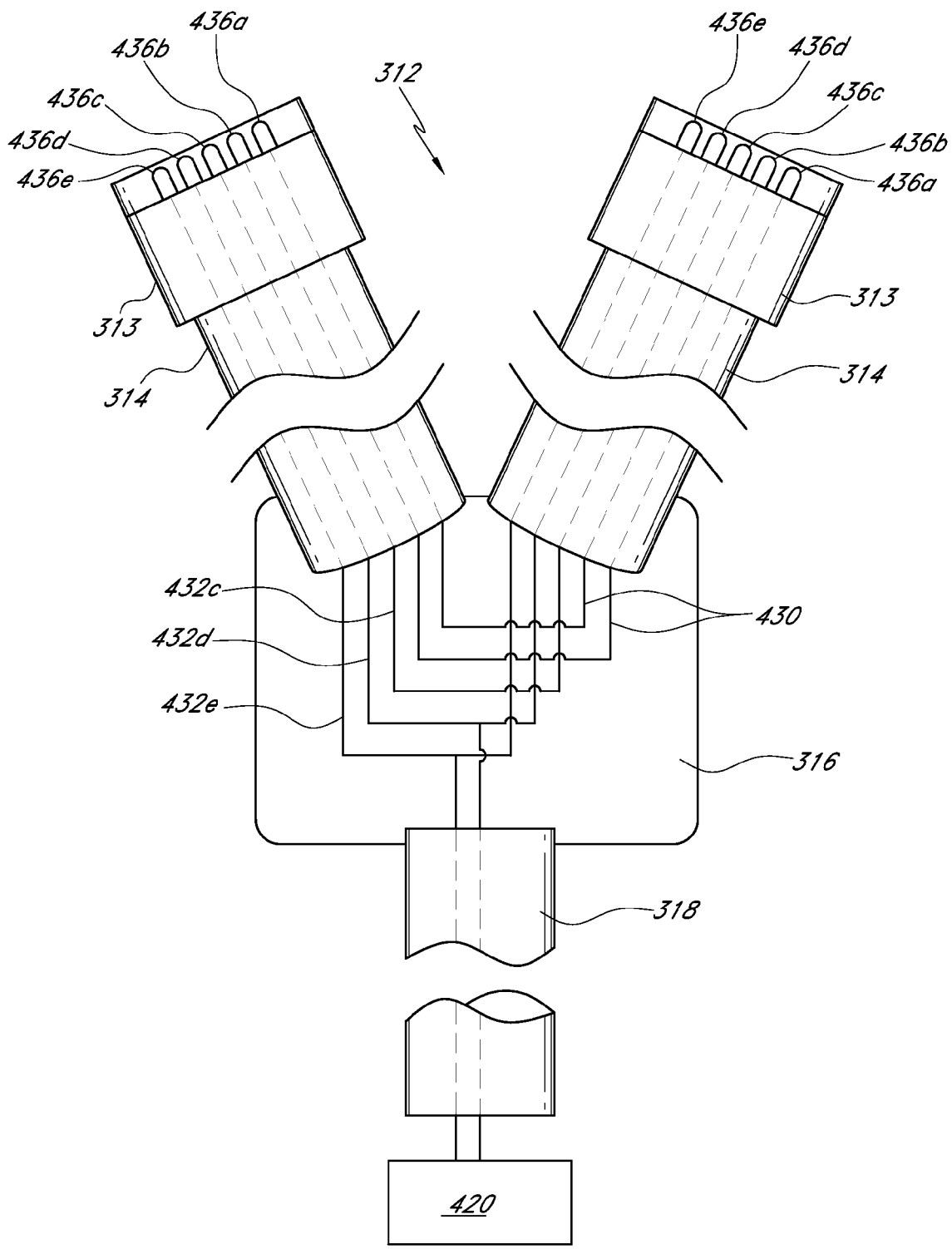
FIG. 20 is a schematic illustration of one embodiment of an adapter coupled with a power source.

As schematically illustrated in FIG. 20, in certain embodiments, the adapter connectors 313 are coupled with one or more primary adapter cables 314. The primary adapter cables 314 can comprise communication lines 430, electrical lines 432, and/or branches thereof. As discussed below, in some embodiments, one end of one branch of a communication line 430 is coupled with one pin 436 of an adapter connector 313 and one end of another branch of the communication line 430 is coupled with one pin 436 of another adapter connector 313. Similarly, one end of one branch of an electrical line 432 can be coupled with one pin 436 of an adapter connector 313 and one end of another branch of the electrical line 432 can be coupled with one pin 436 of another adapter connector 313.

In certain preferred embodiments, the adapter 312 comprises two adapter connectors 313. In some configurations, each adapter connector 313 comprises five or more pins 436. In preferred embodiments, each adapter connector 313 comprises the same configuration of pins 436. In the illustrated embodiment, one end of one branch of an electrical line 432c is coupled with the pin 436c of a first adapter connector 313, and one end of another branch of the electrical line 432c is coupled with the pin 436c of a second adapter connector 313. The electrical line 432c thereby couples both pins 436c. Similarly, an electrical line 432d couples both pins 436d, and another electrical line 432e couples both pins 436e. Accordingly, the two adapter connectors 313 are interchangeable with respect to the pins 436c-e of each connector. As used herein the term interchangeable is a broad term used in its ordinary sense and includes, without limitation, the ability to use one connector in place of another connector.

In the illustrated embodiment, one communication line 430 couples the pin 436a of the first adapter connector 313 with the pin 436b of the second adapter connector 313. Similarly, a second communication line 430 couples the pin 436b of the first adapter connector 313 with the pin 436a of the second adapter connector 313. Accordingly, the two adapter connectors 313 are interchangeable with respect to the pins 436a and 436b.

Advantageously, the inverted configuration of the pins 436a,b of the adapters facilitates the coupling of inputs 423 and outputs 421 of entertainment systems 18. In certain embodiments, the video system 300 comprises two entertainment systems 18 having substantially similar entertainment system connectors 311. Each entertainment system connector 311 has the same configuration of sheaths 434, i.e., for each connector 311, the sheath 434a is coupled with the output 421 of the entertainment system 18 and the sheath 434b is coupled with the input 423 of the entertainment system 18, (see, e.g., FIGS. 17 and 18). Connection of the adapter 312 with the two entertainment system connectors 311 effectively couples the input 423 of one entertainment system 18 with the output 421 of the other entertainment system 18, and vice versa.

In some embodiments, the adapter 312 comprises adapter connectors 313 each having seven pins 436. In certain of such embodiments, the adapter connectors 313 are interchangeable. Certain of such embodiments resemble the illustrated five-pin adapter described above, but comprise two additional communication lines 430 running between the adapter connectors 313. In certain embodiments, the seven-pin adapter 312 is used in a video system 300 comprising two entertainment systems 18, each having two inputs 423 and two outputs 421. The additional communication lines 430 can allow coupling of a second output 421 of the first entertainment system 18 with a second input 423 of the second entertainment system 18, and allow coupling of a second input 423 of the first entertainment system with a second output 421 of the second entertainment system 18.

The interchangeable nature of the adapter connectors 313 can advantageously reduce the time required to install video systems 300, as no time is lost identifying which adapter connector 313 corresponds with the entertainment system connector 311 of a given entertainment system 18. Furthermore, interchangeable adapter connectors 313 can reduce the risk of improper installation which, in addition to increasing the overall installation time of a video system 300, could ultimately damage the video system 300. Additionally, the adapter connectors 313 can allow interoperability among monitors 200 of different makes and models by providing a standard interface for coupling with the input 423 and output 421 of any monitor 200.

The use of adapters 312 to route signals from one entertainment system 18 to another can also provide advantages over the use of a separate signal source selection unit, such as a device that accepts signals from entertainment systems 18, DVD players, video game consoles, and/or other signal sources, and can allow a user to select among the various signals received by the unit. Signal source selection units can be expensive. Furthermore, such units can be costly to install, especially in the aftermarket where vehicles may not be configured to house signal source selection units. Additionally, some vehicles lack the required space for signal source selection units, or the units take up more space than desired by vehicle owners. The installation of such units can also be time-consuming. The use of adapters 312 can reduce or eliminate each of these problems.

With continued reference to FIG. 20, in certain embodiments, the secondary adapter cable 318 comprises an additional branch of the electrical line 432d and an additional branch of the electrical line 432e. In some embodiments, the electrical lines 432d and 432e are coupled with the power source 320. The power source 320 can be an alternating current or direct current source. In some embodiments, the power source 320 comprises the power source of a vehicle. In other embodiments, the power source 320 is dedicated to the video system 300. In some embodiments, the electrical line 432d is connected to the ground of the power source 320. In other embodiments, the electrical line 432d is connected to some other suitable ground.

Figure 20A:
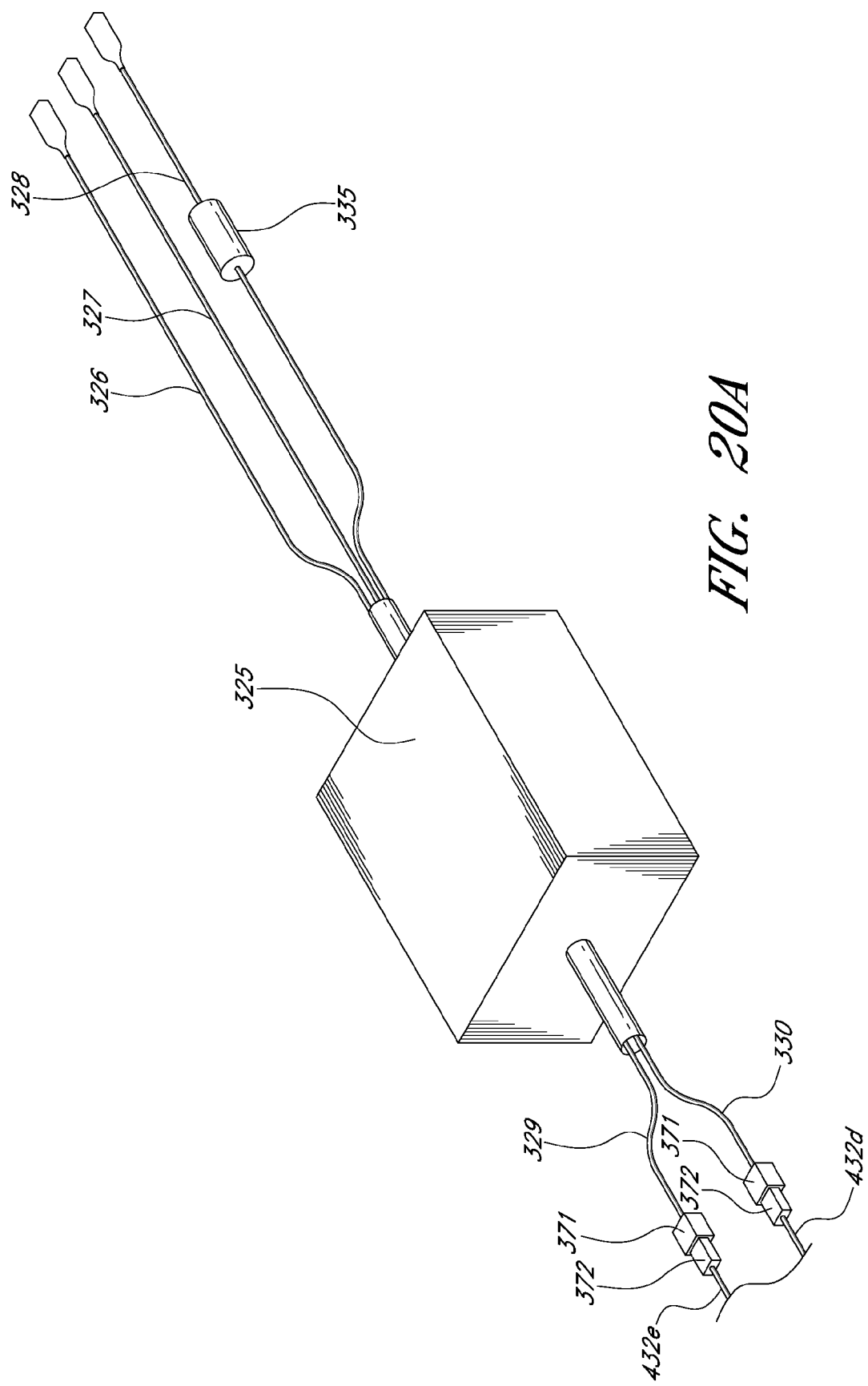
FIG. 20A is a partial perspective view of one embodiment of a noise suppressor coupled with electrical lines of an adapter.

As illustrated in FIG. 20A, in certain embodiments, the electrical lines 432d and 432e are coupled with the noise suppressor 325. In some embodiments, the noise suppressor 325 comprises an input power lead 326, an input ground lead 327, an input accessory lead 328, an output power lead 329 and an output ground lead 330. In some embodiments, the electrical line 432e is coupled with the output power lead 329 and the electrical line 432d is coupled with the output ground lead 330. In some embodiments, the each of the leads 329, 330 comprises a first interlocking connector 371 and each of the lines 432d, 432e comprises a second interlocking connector 372. The first and second interlocking connectors 371, 372 can be configured to engage one another by friction fit or by some other suitable method. In some embodiments, the interlocking connectors 371, 372 are coupled via a fastener, such as a clip or a screw.

In some embodiments, the noise suppressor 325 is coupled with the power source of a vehicle. The input power lead 326 can be coupled with a power line of the vehicle, the input ground lead 327 can be grounded in a suitable manner, and the input accessory lead 328 can be coupled with the accessory power line of the vehicle. In many embodiments, the noise suppressor filters and/or reduces hum from the engine power line, thereby providing a smoother waveform to the output power lead 329 than is received from the input power lead 326.

The input accessory lead 328 can serve a variety of functions. In one preferred embodiment, the input accessory lead 328 signals that a vehicle is being shut off, tripping circuitry within the noise suppressor 325 to reduce power output to the entertainment systems 18. In some embodiments, the reduced power output causes one or more DVD players of the entertainment systems 18 to store playback information to memory prior to shutting down. In some embodiments, the input accessory lead 328 comprises a fuse 335.

With reference again to FIG. 20, in some embodiments, the electrical line 432c couples pins 436c of the adapter 312. Accordingly, in some preferred embodiments, the electrical line 432c provides a common ground among entertainment systems 18 coupled to the adapter 312. In other embodiments, each entertainment system 18 is grounded separately.

In some embodiments, one or more secondary adapter cables 318 can comprise one or more branches of communication lines 430. The communication lines 430 thus can be coupled at one end with a signal source, such as, for example, a signal source selection unit, a DVD player, a television tuner, etc. Branches of the one or more communication lines 430 can be routed through the primary adapter cables 314 and coupled with the adapter connectors 313. The entertainment systems 18 can communicate with the communication lines 430, thereby providing additional viewing and/or listening options to users of the systems 18.

In certain embodiments, the junction 316 comprises a seal for joining the primary adapter cables 314 and the secondary adapter cable 318. In some embodiments, the seal comprises a molded dielectric material, such as polyvinylchloride, that is heat sealed around the primary cables 314 and the secondary cable 318.

Figure 21:
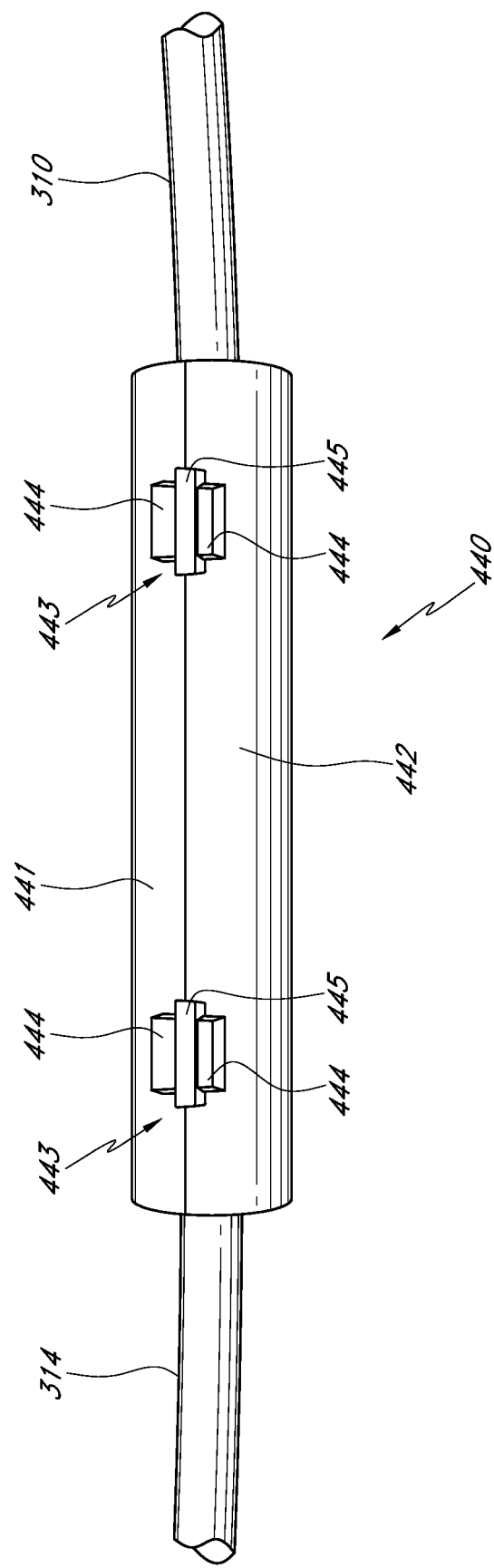
FIG. 21 is a front perspective view of one embodiment of a retention device in a closed configuration and enclosing two coupled connectors.

As illustrated in FIG. 21, in some embodiments, a retainer or retention device 440 secures the entertainment system connector 311 (see, e.g., FIG. 24) and the adapter connector 313 (see, e.g., FIG. 24) in a coupled configuration. In certain embodiments, the retention device 440 is removable, providing ready access to the connectors 311, 313. In some embodiments, the retention device 440 comprises a first housing member 441 and a second housing member 442 that substantially surround the entertainment system connector 311 and the adapter connector 313 when the connectors 311, 313 are coupled. In some embodiments, the retention device 440 substantially encloses and/or encapsulates the connectors 311, 313. Accordingly, in some instances, the retention device 440 can protect the connectors 311, 313 from, for example, dust accumulation, humidity, and/or spilled liquids.

In some embodiments, as illustrated, an exterior surface of the retention device 440 is generally cylindrical when the device 440 is closed. The exterior surface can assume any shape, although generally cylindrical configurations are preferred for use with circularly symmetric cables 310, 314 and/or circularly symmetric connectors 311, 313. In some embodiments, the retention device 440 comprises a single piece of material, such as molded plastic. In other embodiments, two or more pieces can be joined to form the device 440.

Figure 23A:
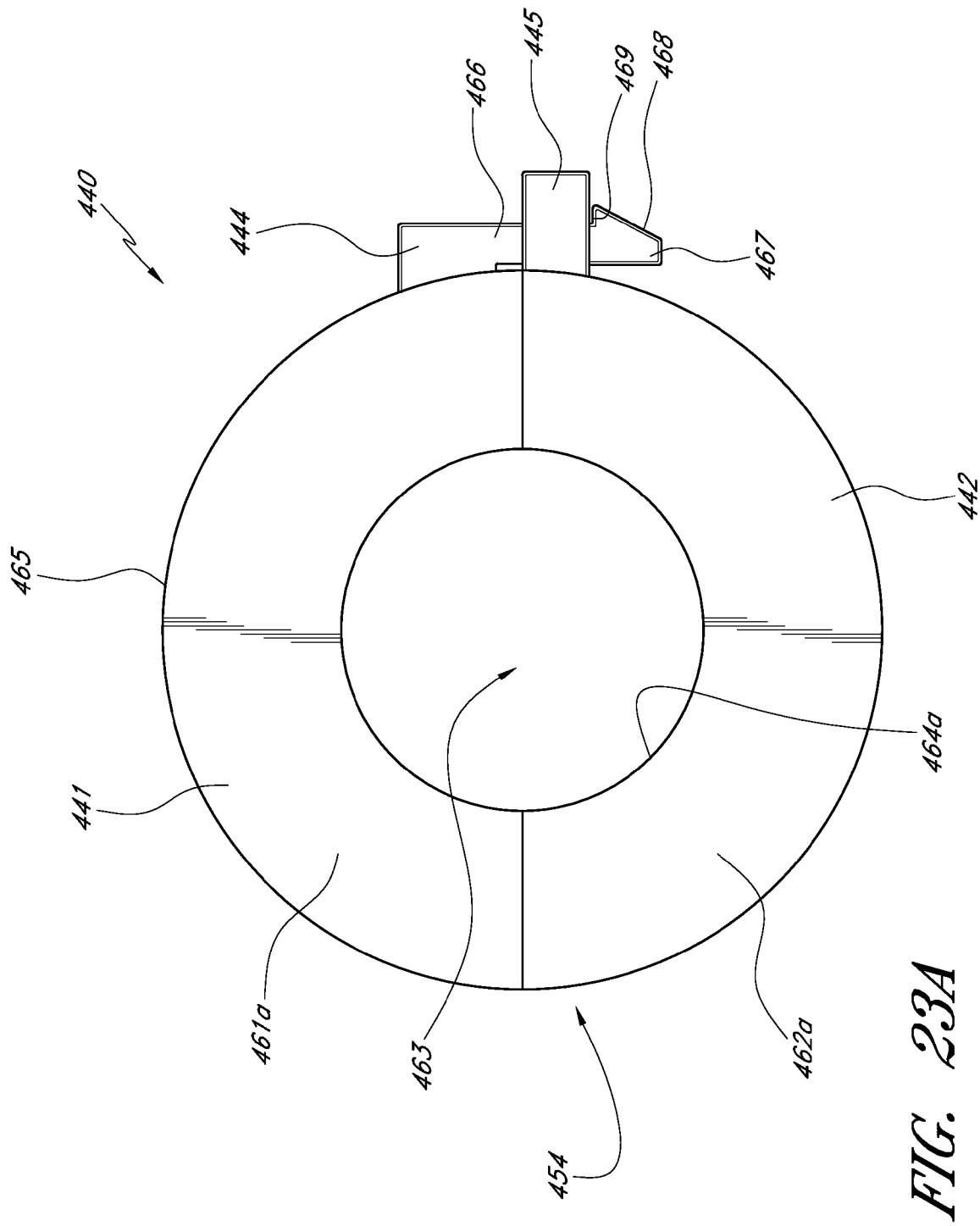
FIG. 23A is a side elevation view of one embodiment of a retention device in a closed configuration.
Figure 23B:
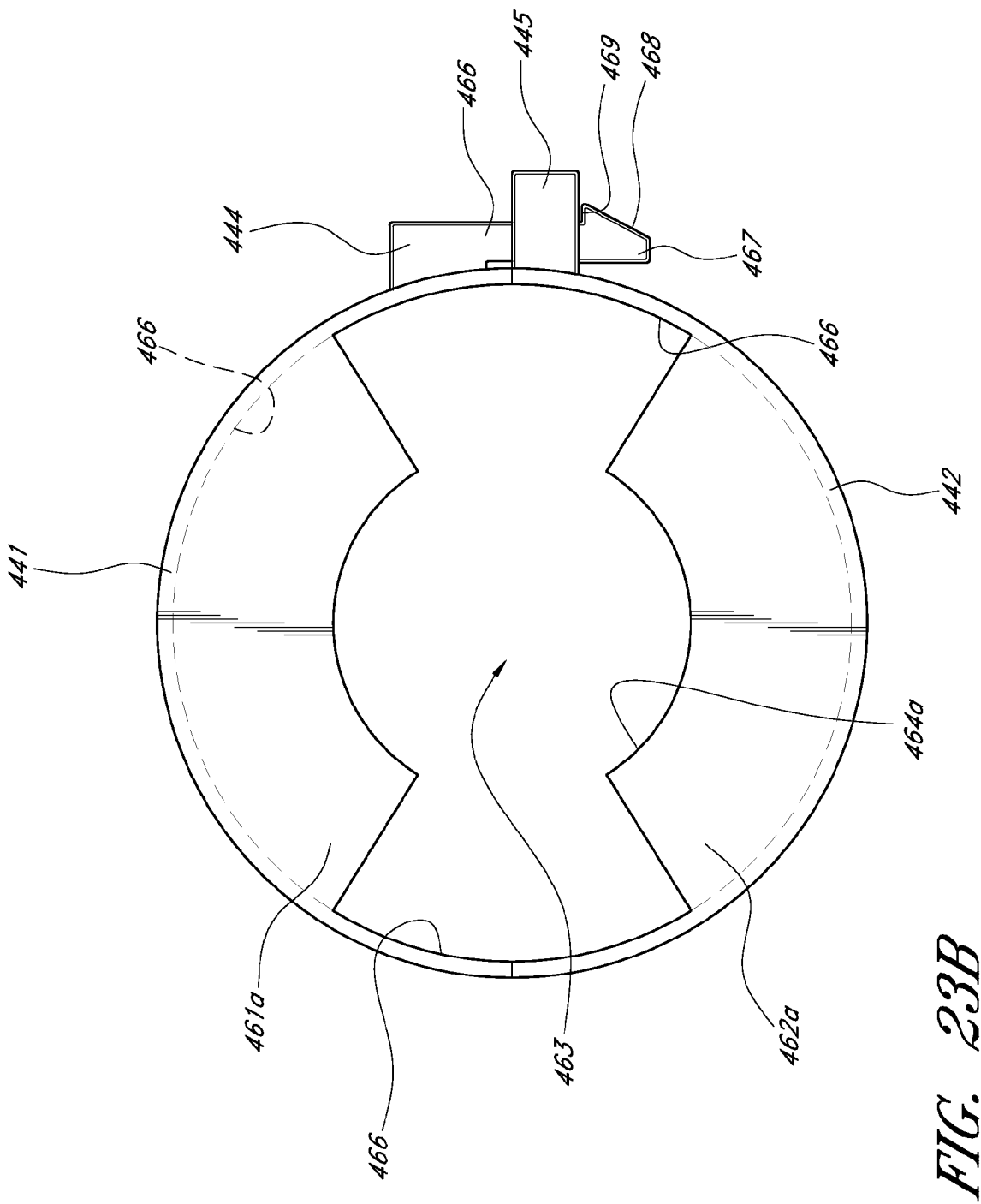
FIG. 23B is a side elevation view of another embodiment of a retention device in a closed configuration.

In certain embodiments, the first and second housing members 441, 442 cooperate to form a cavity 463 (see, e.g., FIGS. 23A and 23B). In many embodiments, the cavity is sized and configured to accept the connectors 311, 313. In some embodiments, the cavity is sized and configured to only accept the connectors 311, 313 when the connectors are coupled with each other. For example, the cavity can comprise an axial length that is substantially equal to the axial length of the connectors 311, 313 in a coupled configuration.

In preferred embodiments, the retention device 440 comprises one or more releasable locks or fasteners 443 that allow the device 440 to be selectively opened and closed. In the illustrated embodiment, the device 440 comprises two fasteners 443. Each fastener 443 comprises a clip extension 444 and a clip aperture 445 that cooperate to allow the selective opening and closing of the device 440, as more fully described below. In various embodiments, the fastener 443 can comprise a clip, clasp, clamp, magnet, hook, hook-and-pile fabric, or other suitable mechanism for maintaining the device 440 in a closed state. In certain embodiments, the fastener 443 is integrally formed with the device 440, and in other embodiments, it is secured to or around the device 440.

Figure 22:
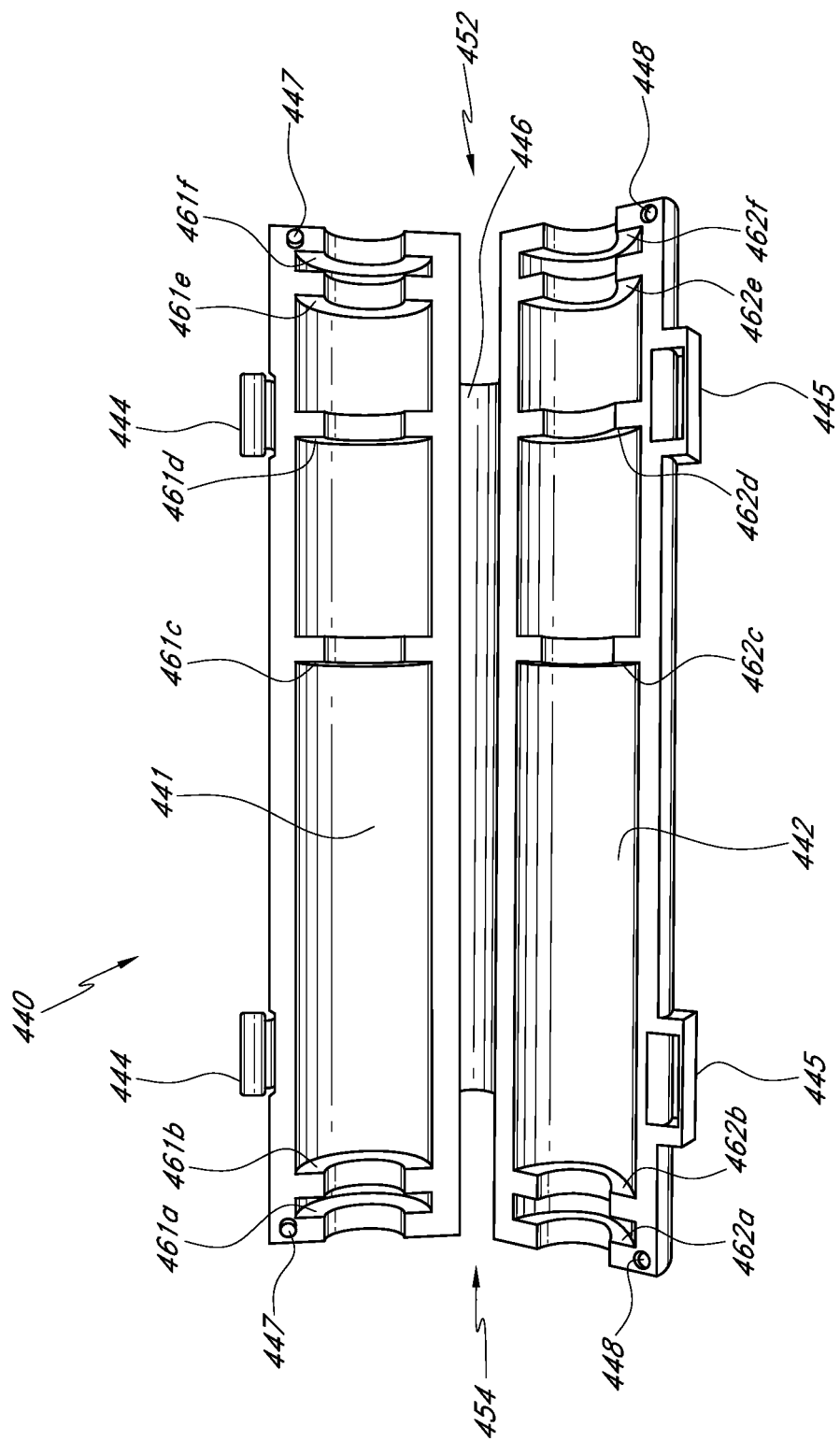
FIG. 22 is a front perspective view of one embodiment of a retention device in an open configuration.

FIG. 22 illustrates one embodiment of the retention device 440 in an open configuration. As shown, the clip extensions 444 are disengaged from the clip apertures 445. In certain preferred embodiments, the retention device 440 comprises a hinge 446 that connects the first and second housing members 441, 442 and allows the housing members 441, 442 to move relative to one another. As illustrated, the hinge 446 can be integrally formed with the first and second housing members 441, 442. In other arrangements, the hinge 446 comprises one or more pieces attached to the first and second housing members 441, 442. In some configurations, one or more fasteners 443 are used in place of a hinge 446.

In some arrangements, the first housing member 441 comprises one or more protrusions 447 and the second housing member 442 comprises one or more recesses 448. The recesses 448 can be configured to accept the protrusions 447 when the device 440 is closed, thereby encouraging alignment of the first and second housing members 441, 442. In the illustrated embodiment, the protrusions 447 are substantially cylindrical with rounded edges. The recesses 448 are also substantially cylindrical, having a diameter slightly larger than that of the protrusions 447. The relative sizes of the protrusions 447 and recesses 448 can be altered to achieve a tighter or looser fit. A wide variety of arrangements are possible for the protrusions 447 and recesses 448.

In the illustrated embodiment, the protrusions 447 and recesses 448 are spaced away from the hinge 446. Additionally, one protrusion 447 and recess 448 pair is located adjacent a proximal end 452 of the device 440, and another protrusion 447 and recess 448 pair is located adjacent a distal end 454 of the device 440. As used herein, the terms proximal and distal refer to spatial orientation with respect to the entertainment system 18. Other arrangements of protrusion 447 and recess 448 pairs are possible.

In some configurations, the first housing member 441 comprises one or more first extensions, inward projections, interference surfaces, or ridges 461 and the second housing member 442 comprises one or more second extensions, inward projections, interference surfaces, or ridges 462. In certain configurations, the first and second ridges 461, 462 extend inward from a surface of the first and second housing members 441, 442, respectively. As illustrated, in some configurations, the first and second ridges 461, 462 extend inward along an entire length of an interior surface of the first and second housing members 441, 442, respectively. In certain configurations, the first and second ridges 461, 462 are substantially C-shaped, as shown. In some embodiments, the first and second ridges 461, 462 are substantially orthogonal to the surfaces of the housing members 441, 442 from which the ridges extend.

FIG. 23A illustrates an end-on view of the distal end 454 of one embodiment of the retention device 440 in a closed configuration. In some embodiments, the first ridge 461a cooperates with the second ridge 462a to define an opening 464a when the device 440 is closed. In certain configurations, the opening 464a is smaller in at least one dimension than a cross-section of the retention device 440. For example, in the illustrated embodiment, the opening 464 is generally circular, and the diameter of the circular opening 464a is smaller than the diameter of the circular cross-section of an exterior surface 465 of the closed device 440. Similarly, the first ridges 461b-f and the corresponding second ridges 462b-f (shown in FIG. 22) of the illustrated embodiment define circular openings 464b-f (not shown) of varying diameters when the device 440 is closed. As described below, the diameter of each circular opening 464 so formed can assume various sizes depending on the purpose of the opening 464.

As illustrated in FIG. 23B, in some embodiments, the cross-section of the opening 464a partially defined by the first and second ridges 461a, 462a is noncircular. For example, in certain cylindrical configurations, the ridges 461a and 462a extend only along a partial length of a surface of the first and second housing members 441, 442, respectively. In certain of such configurations, the opening 464a defined by the ridges 461a and 462a when the device 440 is closed has a measurement in one dimension equal to the diameter of the circular cross-section of an interior surface 466 of the closed device 440, and a measurement in another dimension smaller than the cross-sectional diameter of the interior surface 466. Various other opening configurations can be used, although circular openings are preferred for use with circularly symmetric cables and circularly symmetric connectors.

With continued reference to FIGS. 23A and 23B, in certain embodiments, the clip extension 444 comprises an arm portion 466 and a tip portion 467. The tip portion 467 can comprise a face 468 and a ledge 469. In certain embodiments the face 467 is angled such that when the device 440 is being closed, the clip aperture 445 forces the tip portion 467 inward toward the device 440. As a result, the arm portion 446 is bent, giving rise to a restoring force that eventually seats the ledge 469 under the clip aperture 445 when the device 440 is closed. A top surface of the ledge 469 abuts a bottom surface of the clip aperture 445, thereby retaining the device 440 in a closed position. To open the device 440, the tip portion 467 is depressed toward the device 440 until the top surface of the ledge 469 no longer contacts the bottom surface of the clip aperture 445. In some instances, an upward force is applied to the tip portion 467 to encourage it through the clip aperture 445. In other instances, the device 440 is biased toward opening such that no upward force need be applied to the tip portion 467 to encourage it through the clip aperture 445.

Figure 24:
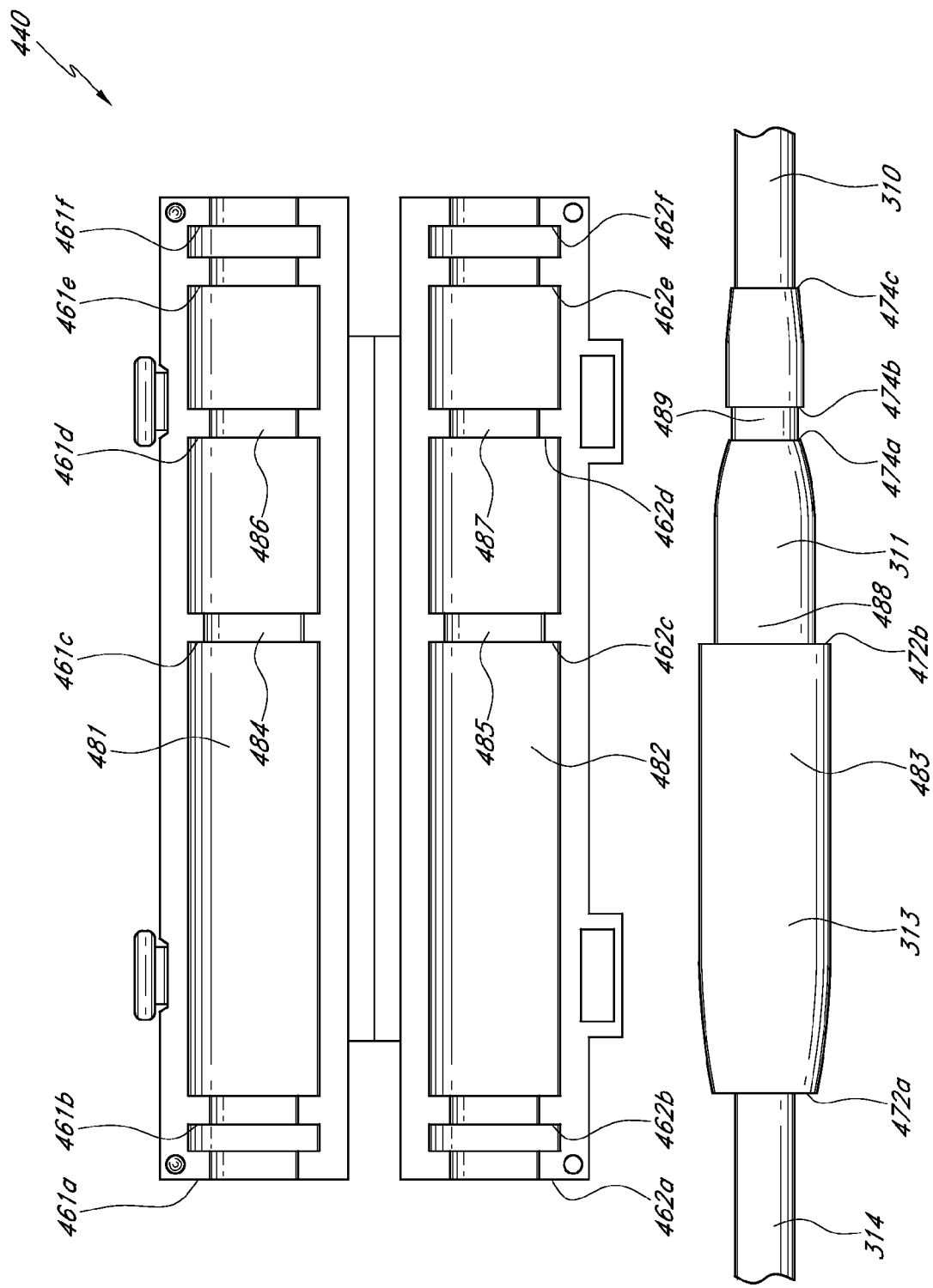
FIG. 24 is a top plan view of one embodiment of a retention device alongside two coupled connectors.

FIG. 24 illustrates one embodiment of a retention device 440 in an open configuration located alongside a coupled adapter connector 313 and entertainment system connector 311. As described above, in certain embodiments, the ridges 461 and 462 cooperate to form openings 464 when the device is closed. In general, the openings 464 can encourage alignment of the connectors 311, 313. In some embodiments, the openings 464 are sized to allow the passage therethrough of a cable (e.g., the cable 310 or the cable 314), but prevent the passage therethrough of a connector (e.g., the entertainment system connector 311 or the adapter connector 313). In other embodiments, the openings 464 are sized to prevent the passage therethrough of the cable as well. For example, the openings 464 can be sized smaller than a thickness of the cable. In certain embodiments, the ridges 461, 462 comprise a material having a high coefficient of friction with respect to a casing of the cable to aid in preventing the movement of the cable. In some embodiments, the casing comprises rubber and the ridges 461, 462 comprise molded plastic. In some embodiments, the ridges 461 and 462 comprise a roughened or etched surface.

In certain embodiments, the adapter connector 313 comprises one or more extensions, projections, or interference surfaces 472 that extend outward from a center of the connector 313. In the illustrated embodiment, the adapter connector 313 comprises two extensions 472a, 472b. The extensions 472a, 472b comprise distal and proximal faces, respectively, of the adapter connector 313. Each extension 472a, 472b extends substantially perpendicularly from an axial center of the connector 313. In certain embodiments, the entertainment system connector comprises one or more extensions 474 that extend outward from a center of the connector 311. In the illustrated embodiment, each extension 474a, 474b, and 474c extends substantially perpendicularly from an axial center of the connector 311.

In some embodiments, the opening 464b formed by the ridges 461b and 462b when the device 440 is closed is smaller in at least one dimension than the extension 472a. In certain of such embodiments, the opening 464d formed by the ridges 461d and 462d is smaller in at least one dimension than the extension 474a, and/or the opening 464e formed by the ridges 461e and 462e is smaller in at least one dimension than the extension 474c. In such configurations, the ridges 461b,d,e and 462b,d,e can operate to prevent the separation of the coupled connectors 311, 313. For example, in certain embodiments, as axial forces are applied to the cables 310, 314 in a manner that would separate the connectors 311, 313, the extension 472a contacts one or more of the ridges 461b and 462b. Similarly, the extension 474c contacts one or more of the ridges 461e and 462e. Accordingly, the ridges 461b,e and 462b,e cooperate with the extensions 472a and 474c to prevent the connectors 311, 313 from moving away from each other, e.g., interference surfaces cooperate to prevent axial movement of the connectors 311, 313 relative to each other. In some embodiments, additional interference surfaces cooperate with each other to prevent relative movement between the connectors 311, 313. For example, in some embodiments, the ridges 461d and 462d cooperate with the extension 474a to prevent the connector 311 from moving axially with respect to the connector 313. In further embodiments, one or more of the openings 464a,b,e,f through which the cables 310, 314 can extend are smaller than the cables 310, 314, which further serves to prevent separation of the connectors 311, 313.

In some embodiments, the retention device 440 comprises one or more surfaces, or interference surfaces, configured to prevent the connectors 311, 313 from moving laterally relative to each other. In the illustrated embodiment, the device 440 comprises interior surfaces 481 and 482. In some embodiments, the interior surfaces 481, 482 comprise one substantially continuous surface when the device 440 is closed. In some embodiments, the interior surfaces 481, 482 contact an exterior surface 483 of the connector 313 when the device is closed 440. In certain of such embodiments, the interior surfaces 481, 482 cooperate with the exterior surface 483 to substantially prevent the connector 313 from moving in a transverse or lateral direction relative to the connector 311. For the illustrated case of a circularly symmetrical connector 313, the transverse or lateral direction can be, for example, any radial direction. In certain embodiments, contact between the interior surfaces 481, 482 and the exterior surface 483 along an axial length of the connector 311 maintains a longitudinal axis of the connector 311 aligned with a longitudinal axis of the device 440 and prevents radial movement of the connector 311 relative to the connector 313. Similarly, in some embodiments, contact between interior surfaces 484, 485 and 486, 487 of the device 440 and exterior surfaces 488, 489 of portions of the connector 313, respectively, maintains a longitudinal axis of the connector 313 aligned with a longitudinal axis of the device 440 and prevents radial movement of the connector 313 relative to the connector 311.

In further embodiments, the retention device 440 can comprise interference surfaces, such as the surfaces 481-484, that prevent rotational movement of the connectors 311, 313 relative to each other, such as by friction (as described below). In many embodiments, some interference surfaces of the device 440 are configured to prevent or inhibit multiple forms of relative movement between the connectors 311, 313.

In some embodiments, an interior surface of the retention device 440 is smaller than an exterior surface of one or more of the connectors 311, 313. In such embodiments, friction can arise between one or more of the connectors 311, 313 and the device 440 when the device 440 is closed, thereby helping to secure or securing the connectors 311, 313 in a coupled configuration. In certain of such embodiments, the interior surface of the device 440 is coated with a high-friction material, is roughened, or is etched, thereby increasing the friction. Furthermore, in such embodiments, the retention device 440 can be placed in tension when the device 440 is closed, thereby creating a bias towards being in an open configuration. As discussed above, such a bias can aid in opening the device 440 when the clip configuration of the illustrated embodiment is employed.

The retention device 440 can provide various advantages over conventional methods, such as the use of electrical tape, for securing connectors to one another. As discussed above, the retention device 440 can apply normal and frictional forces to the connectors 311, 313. These forces can often be stronger than the forces supplied by electrical tape, thereby ensuring a more reliable coupling of the connectors. The use of a retention device 440 also facilitates replacement of an entertainment system 18, if needed. Whereas removing electrical tape can be time consuming, removal of the retention device 440 is relatively quick.

In some embodiments, a headrest-mounted entertainment system includes a screen structure that can be rotated relative to the headrest in which it is mounted. In certain of such embodiments, the screen structure includes both a viewing screen and a media reader, such as, for example, a DVD player. The ability to rotate the screen structure in a system of this variety can provide various advantages, such as the selection of a desired viewing angle of the screen and/or the ability to load a storage device into the media reader.

However, in some instances, inclusion of a media reader as a part of the screen structure increases the overall mass of the structure. The increased mass can yield higher stresses on certain portions of the screen structure in the event of a collision, which can potentially cause the structure to rotate outward from the headrest in an undesirable manner and/or separate from the headrest and move through the passenger compartment of a vehicle. For example, in some instances, the increased mass of the screen structure can produce higher stresses on hinge members that connect the structure with the headrest, potentially causing the structure to break free from the hinge members. Once freed from the hinge members, the screen structure could move unrestrained through the vehicle.

Certain embodiments disclosed herein advantageously reduce or eliminate at least the foregoing problems. Although some embodiments are described in the context of screen structures that include media readers, the disclosed features can be employed beneficially in a variety of contexts, including, without limitation, screen structures that do not include media readers. Accordingly, the following discussion should not be construed as being limited to the disclosed embodiments, which are presented herein by way of illustration.

Figure 25:
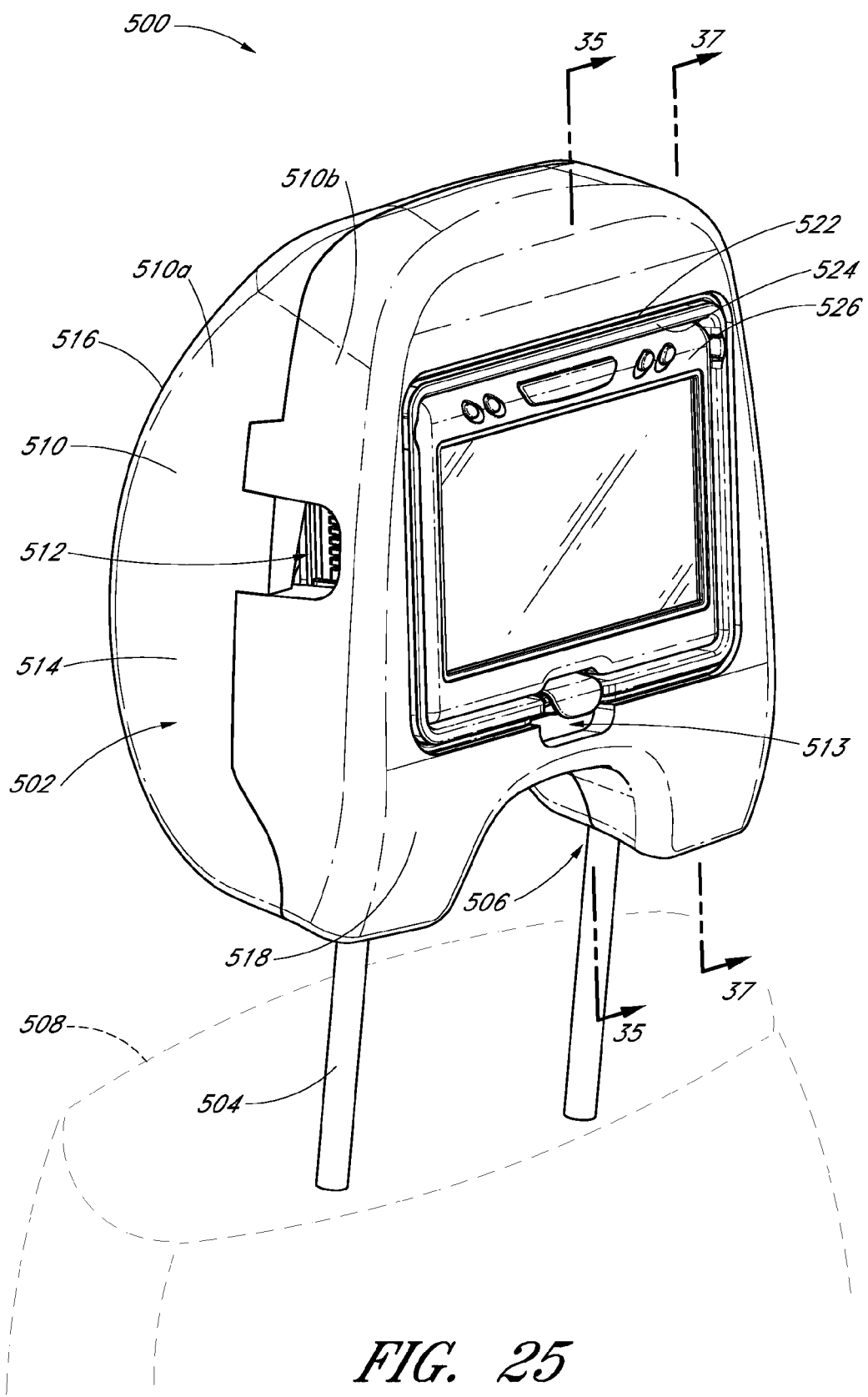
FIG. 25 is a rear perspective view of an embodiment of an entertainment system.

FIG. 25 illustrates an embodiment of a headrest device, headrest display unit, or entertainment system 500. The entertainment system 500 can resemble any of the entertainment systems 18 described above in various respects, and can differ in other respects, such as those described hereafter.

In certain embodiments, the entertainment system 500 includes a headrest 502, which can resemble the vehicle headrest 14 described above. In some embodiments, the headrest 502 includes one or more seat posts or headrest posts 504 such as the posts 26 described above. As further discussed below, the posts 504 can form a portion of a mounting structure, framework, or mounting assembly 506 (also shown in FIG. 26), which can be configured to provide structure to the entertainment system 500. As discussed below, components of the entertainment system 500 can be attached to the mounting structure in relatively fixed engagement.

In certain embodiments, the posts 504 are sized and shaped so as to be slidably received in a seat back 508, which can be mounted in a vehicle. In some embodiments, the posts 504 permit a portion of the headrest 502 against which a passenger can rest his or her head to be selectively spaced from the seatback 508. For example, in some embodiments, the posts 504 include notches or indentations that interact with detents in the seatback 508 to selectively secure the headrest 502 in a variety of positions.

In some embodiments, the headrest 502 includes one or more cushions, pillows, or pads 510 such as the pad 30 described above. The pads 510 can be formed in any suitable manner, such as any of the methods described above. In some embodiments, a plurality of pads 510 are fitted to each other or otherwise joined to form a larger pad structure or pad assembly. For example, in the illustrated embodiments, two pads 510*a*, *b* are fitted together to form a pad assembly.

In some embodiments, the one or more pads 510 define one or more openings 512, such as the openings 38. The openings 512 can be in one or more side surfaces 514 (see also FIGS. 3 and 4) of the headrest 502, or can be located in other surfaces of the headrest 502. The one or more openings 512 can permit airflow therethrough for purposes of cooling components of the entertainment system 500. In some embodiments, the pad 510*b* includes a recessed portion that can at least partially define a cavity 513. In some embodiments, the cavity 513 is sized and shaped to receive one or more, two or more, or three or more finger tips of a user. In some embodiments, the cavity has a width between about 0.5 inches and about 3.0 inches, between about 0.8 inches and about 2.5 inches, between about 1.0 inches and about 2.0 inches, or between about 1.0 inches and about 1.5 inches. The one or more openings 512 and the cavity 513 are described further below.

In some embodiments, the headrest 502 defines a front surface or face 516 and a rear or back face 518. In many embodiments, the headrest 502 is configured to be mounted in a vehicle such that the front face 516 substantially faces a direction of forward travel of the vehicle and the back face 518 substantially faces a direction of rearward travel of the vehicle. Accordingly, in some embodiments, the front face 516 can be positioned to abut a back surface of a head of a passenger. The back face 518 of the headrest 502 can be directed toward a passenger compartment of the vehicle, and can be viewable by passengers seated rearward of the seatback 508 with which the headrest 502 is coupled. By way of convenience and not limitation, the terms "front," "forward," and the like are generally used hereafter to describe the direction of forward travel, and the terms "back," "rear," and the like are generally used to describe the direction of rearward travel, when the entertainment system 500 or components thereof are mounted in a vehicle.

Figure 30:
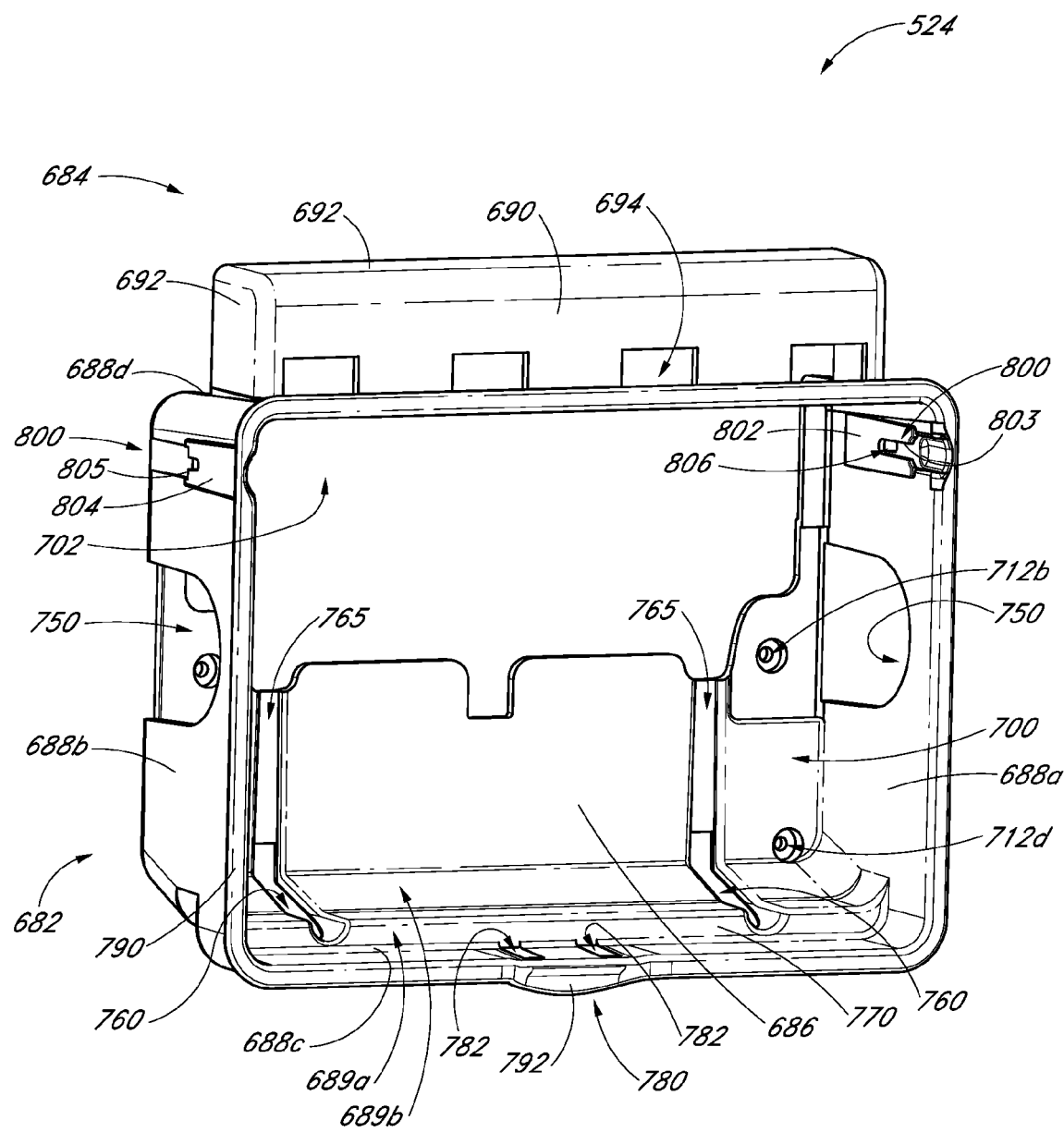
FIG. 30 is a rear perspective view of the housing of FIG. 29.
Figure 31:
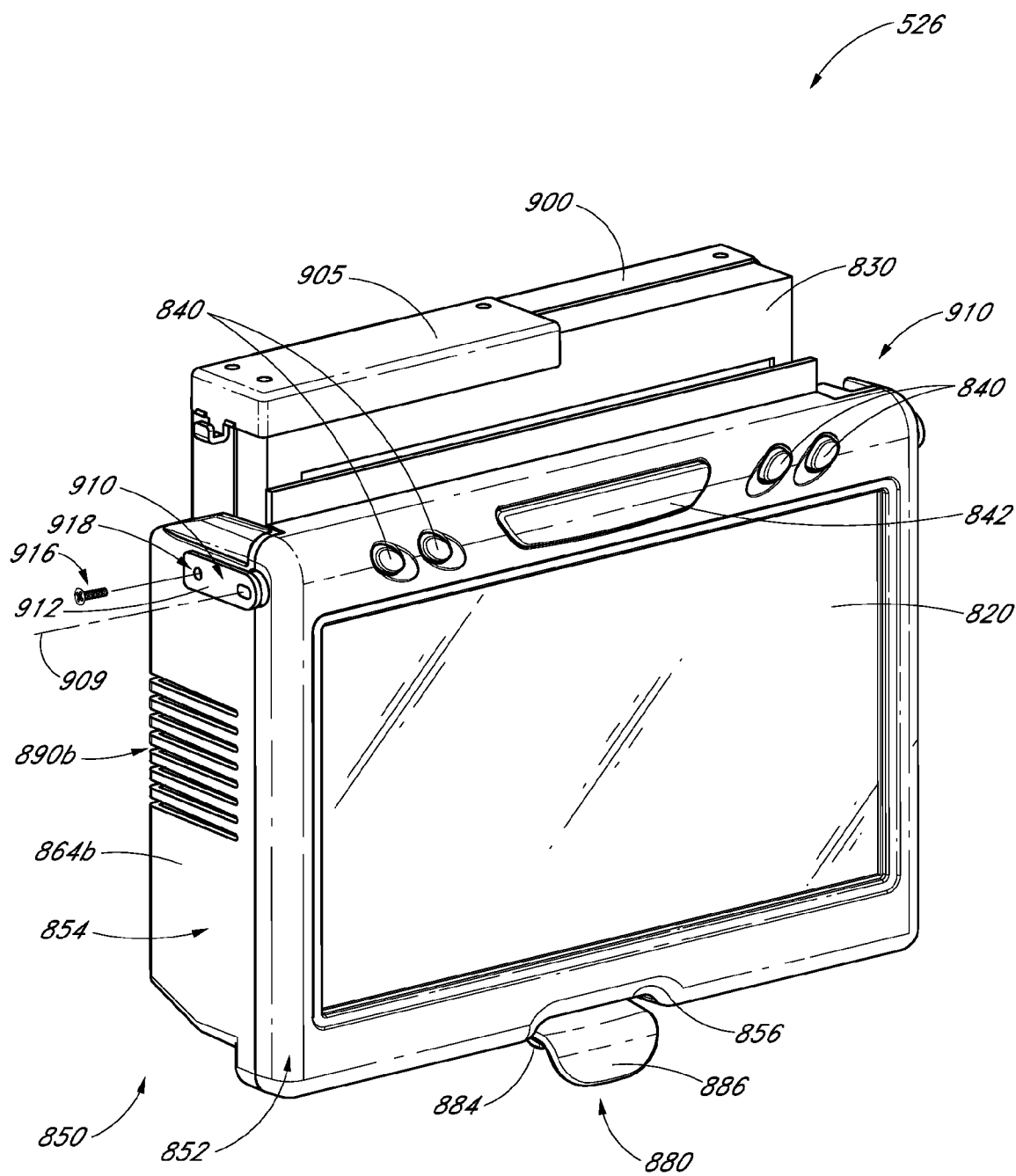
FIG. 31 is a rear perspective partially exploded view of an embodiment of a screen assembly compatible with the entertainment system of FIG. 25.
Figure 32:
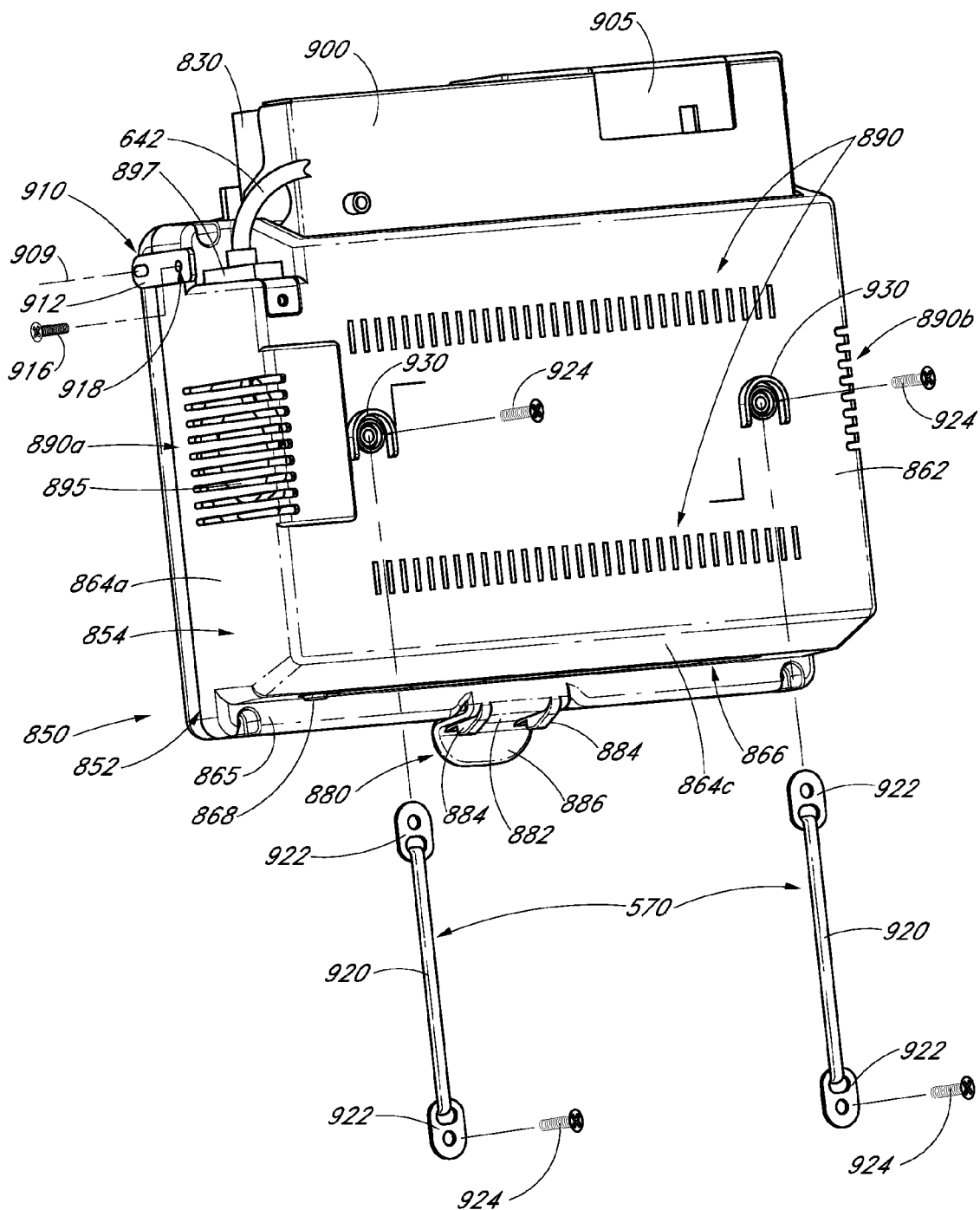
FIG. 32 is a front perspective partially exploded view of the screen assembly of FIG. 31 and of an embodiment of a retaining harness compatible with the entertainment system of FIG. 25.

With continued reference to FIG. 25, in certain embodiments, the entertainment system 500 includes an outer casing, case, receptacle, bin, or shell 522 (also shown in, e.g., FIGS. 27 and 28); an inner casing, frame, support structure, or housing 524 (also shown in, e.g., FIGS. 29 and 30); and a monitor structure, display device, screen structure, or screen assembly 526 (also shown in, e.g., FIGS. 31 and 32). As further discussed below, in some embodiments, the shell 522 and/or the housing 524 can be coupled in substantially fixed engagement with the mounting assembly 506. In further embodiments, the screen assembly 526 is pivotally coupled with the housing 524 such that the screen assembly 526 can rotate relative to the housing 524, and hence, relative to the headrest 502.

In some embodiments, a covering (not shown) is included over the one or more pads 510. The covering can comprise any suitable material, such as, for example, fabric or leather. In certain embodiments, a portion of the covering is included between the shell 522 and the housing 524. Accordingly, in some embodiments, the shell 522 is substantially hidden from view by the covering in an assembled entertainment system 500. In some embodiments, the covering includes one or more aperture covers 42 (see FIGS. 1-4) configured to cover the one or more openings 512. As described above, the aperture covers 42 can include holes or can otherwise be configured to permit the passage of air therethrough.

Figure 26:
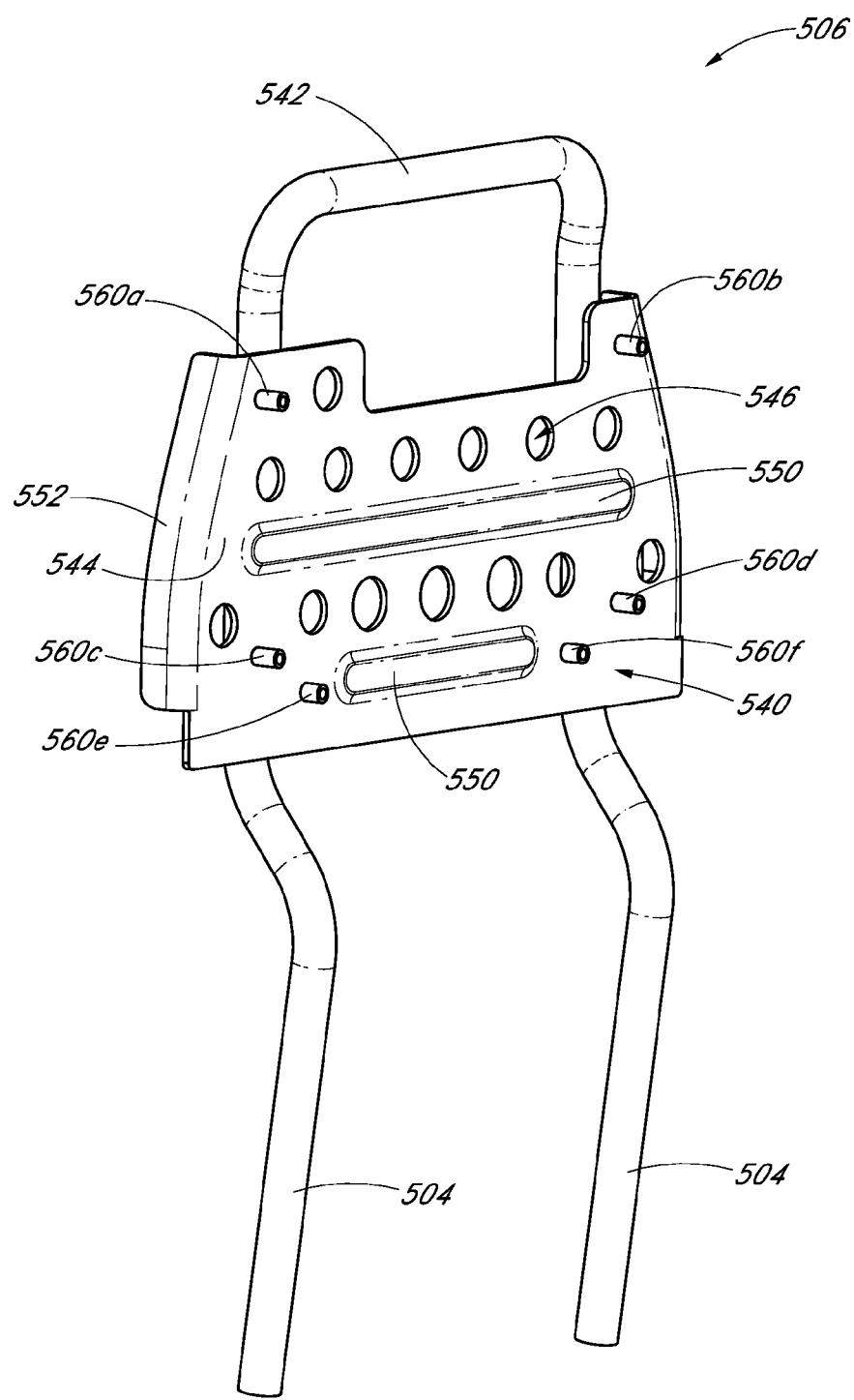
FIG. 26 is a rear perspective view of an embodiment of a mounting assembly compatible with the entertainment system of FIG. 25.

FIG. 26 illustrates a rear perspective view of an embodiment of a mounting assembly 506. In certain embodiments, the mounting assembly 506 includes a base plate, core member, or mounting plate 540 coupled with the one or more posts 504. In some embodiments, the mounting assembly 506 further includes an upper bar 542 coupled with the mounting plate 540. The posts 504 and the bar 542 can comprise a unitary piece of material, or alternatively, can include separate pieces. In some embodiments, material and/or manufacturing costs are reduced without significantly affecting the structural integrity or strength of the mounting assembly 506 when the bar 542 and the posts 504 include separate pieces. This structure may also provide tolerance benefits. The bar 542 and the posts 504 can be attached to the mounting plate 540 in any suitable manner, including, for example, via welding or mounting hardware.

In some embodiments, the mounting plate 540 includes a substantially planar portion 544 that defines a relatively flat surface. In some embodiments, the planar portion 544 further defines one or more apertures or openings 546 that can reduce material costs of producing the mounting plate 540 and/or the weight of the mounting plate 540 without significantly affecting the structural integrity of the mounting plate 540.

In some embodiments, the mounting plate 540 includes one or more reinforcing members 550, such as the reinforcing members 266 described above. The reinforcing members 550 can include substantially elongated channels that are raised, or alternatively, recessed, relative to the planar portion 544. In some arrangements, the mounting plate 540 includes one or more flanges 552 that extend at an angle (e.g., substantially perpendicular) to the planar portion 544. The flanges 552 can provide the mounting plate 540 with strength and can inhibit bending, twisting, or other deformations of the plate 540. In some embodiments, the flanges 552 extend forward relative to the rear face of the substantially planar portion 544. Accordingly, in some embodiments, the flanges 552 do not pose an obstacle to mounting the shell 522 to the mounting plate 540.

The mounting plate 540 can include one or more mounting features or protrusions 560 with which the shell 522 and/or other components of the entertainment system 500 can be coupled, as further described below. In some embodiments, the protrusions 560 extend rearward from the substantially planar portion 544 and can be accepted within openings defined by the shell 522. Accordingly, in some embodiments, the protrusions 560 can inhibit rotation of the shell 522 about an axis perpendicular to the planar portion 544. In some embodiments, the mounting plate 540 includes a plurality of protrusions 560a, b, c, d to which the shell 522 is secured, and includes one or more additional protrusions 560e, f to which a motion limiting device, deployment controller, or retaining harness 570 (see, e.g., FIG. 32) is secured, as further described below. In some embodiments, the protrusions 560 may be tapped. Other arrangements for the protrusions or mounting features 560 are also possible.

The mounting assembly 506 (e.g., the mounting plate 540, the posts 504, and/or the bar 542, in some embodiments) can comprise any suitable material for providing the headrest 502 with structure and strength. In some embodiments, the mounting assembly 506 comprises a metal, such as, for example, steel. Other materials are also possible.

Figure 27:
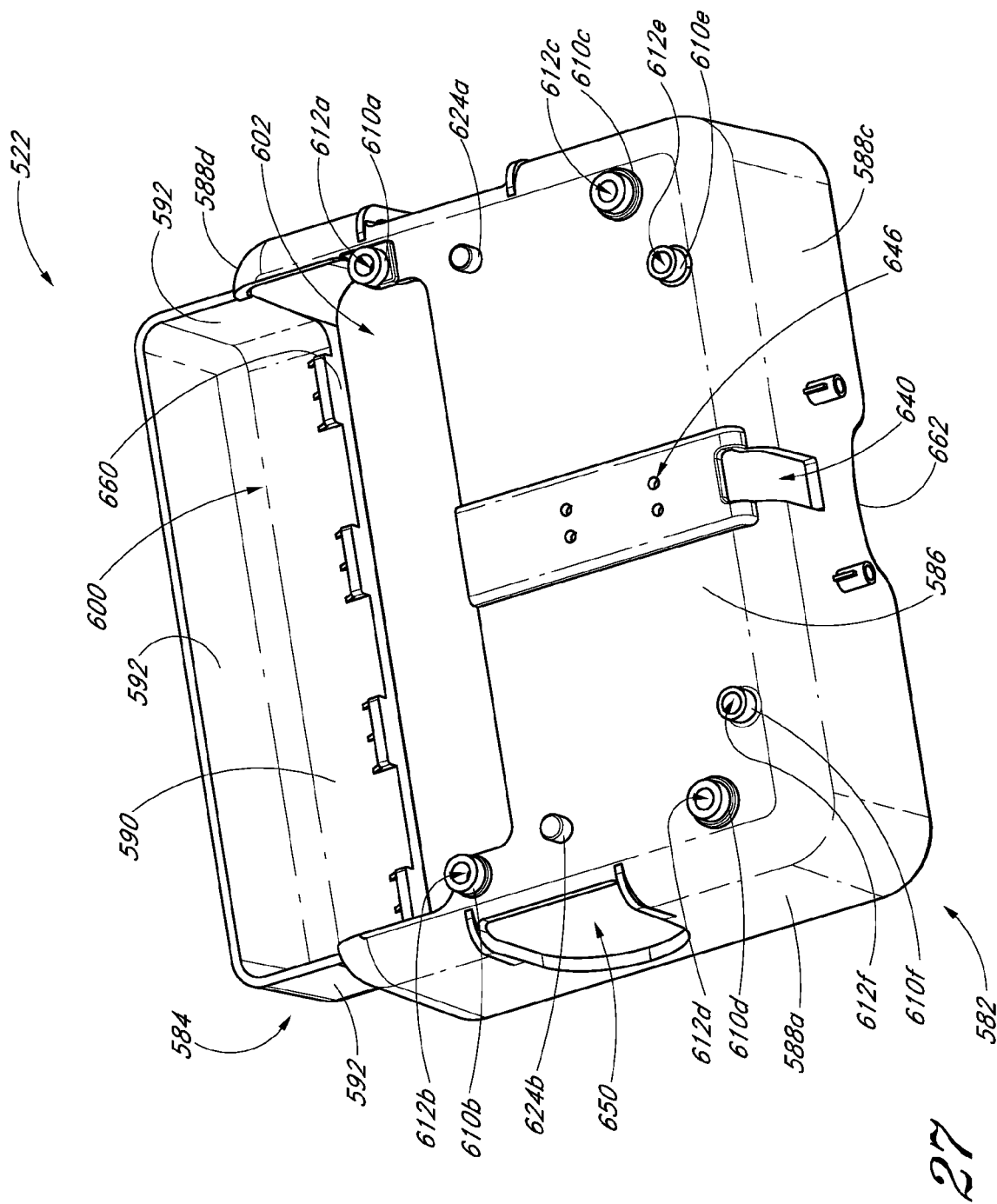
FIG. 27 is a front perspective view of an embodiment of a shell compatible with the entertainment system of FIG. 25.
Figure 28:
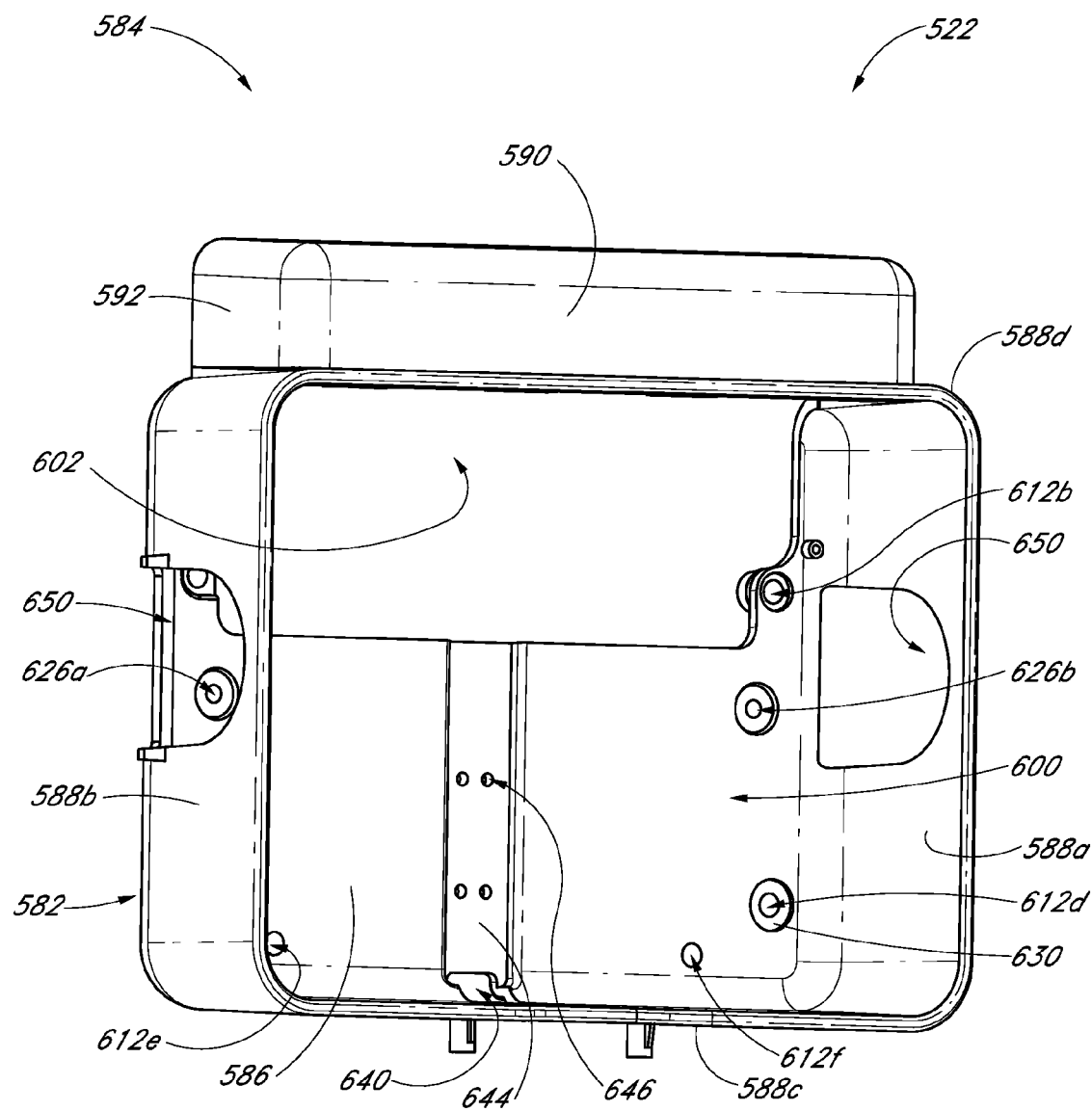
FIG. 28 is a rear perspective view of the shell of FIG. 27.

With reference to FIGS. 27 and 28, in certain embodiments, the shell 522 includes a lower portion 582 and an upper portion 584. The terms "upper," "lower," and similar terms denoting spatial relationships are generally used in this Detailed Description for convenience in describing the embodiments depicted in the figures. Such terms should not be construed as limiting possible arrangements of the shell 522 or of other components of the entertainment system 500 identified thereby, unless so specified.

In some embodiments, the lower portion 582 is substantially shaped as a parallelepiped which, in further embodiments, can include rounded edges and/or corners. The lower portion 582 can include a base wall 586 and one or more side walls (or sidewalls) 588. In some embodiments, the lower portion 582 includes four separate sidewalls 588a, b, c, d at four sides of the lower portion 582. In some embodiments, three sidewalls 588a, b, c extend from the base wall 586, and in further embodiments, can extend substantially perpendicular with respect to the base wall 586. The sidewalls 588a, b, c can include rounded portions that connect with the base wall 586. In some embodiments, a fourth sidewall 588d is spaced from a substantial portion of the base wall 586. In some embodiments, the upper portion 584 extends from the fourth sidewall 588d.

The upper portion 584 can also be shaped as a parallelepiped, which can include rounded edges and/or corners. The upper portion 584 can include a back wall 590 and one or more sidewalls 592. In some embodiments, the one or more sidewalls 592 are substantially perpendicular to the back wall 590. In further embodiments, the back wall 590 of the upper portion 584 and the base wall 586 of the lower portion 582 are substantially parallel. Other shapes and configurations of the shell 522 are also possible.

In some embodiments, the shell 522 defines a cavity 600 sized to receive at least a portion of the housing 524. In some embodiments, the upper and lower extents of the cavity 600 are defined by the upper and lower portions 582, 584 of the shell 522. The shell 522 can define an aperture, port, opening, or window 602. In some embodiments, the window 602 is defined by and/or extends through the base wall 586 of the lower portion 582. The window 602 can further be defined by one or more sidewalls 592 of the upper portion 584. In some embodiments, the window 602 is sized to permit the passage therethrough of a portion of the screen assembly 526 as the screen assembly 526 is rotated, as further discussed below.

In certain embodiments, the shell 522 includes one or more mounting features or projections 610. In some embodiments, the projections 610 extend from a forward-facing surface of the base wall 586. Each projection 610 can define an opening, orifice, channel, or port 612 that can extend through the base wall 586. In some embodiments, each projection 610a, b, c, d, e, f defines a port 612a, b, c, d, e, f sufficiently large to receive a corresponding protrusion 560a, b, c, d, e, f of the mounting plate 540. In some embodiments, the ports 612 are sized such that the protrusions 560 fit snugly within the projections 610. Accordingly, in some arrangements, the projections 610 and protrusions 560 can cooperate to prevent rotation of the shell 522 relative to the mounting plate 540 about an axis substantially perpendicular to the mounting plate 540.

In some embodiments, fasteners, coupling devices, or mounting hardware is advanced through the ports 612*a, b, e, f* into the protrusions 560*a, b, e, f* to attach the shell 522 to the mounting plate 540. As used herein, the term "mounting hardware" is a broad term used in its ordinary sense and includes, without limitation, any suitable combination of fasteners, screws, bolts, nuts, washers, pins, rivets, or the like. Mounting hardware or fasteners discussed herein can be formed of any suitable material, and in some embodiments, are substantially rigid and stress-resistant. For example, any fastener discussed herein can be formed of metal. In some embodiments, mounting hardware is advanced through the ports 612*e, f* into the protrusions 560*e, f* to secure a portion of the retaining harness 570 to the mounting plate 540, as further described below. Mounting hardware can also be advanced through the ports 612*c, d* into the protrusions 560*c, d* to attach both the housing 524 and the shell 522 to the mounting plate 540.

The shell 522 can define one or more protrusions 624*a, b*. The protrusions 624*a, b* can each define an opening 626*a, b* for receiving mounting hardware. In some embodiments, the openings 626*a, b* extend through only a portion of the protrusions 624*a, b*, and do not extend through the entirety thereof. Mounting hardware can be advanced into the protrusions 624*a, b* to attach the housing 524 to the shell 522.

In some embodiments, the shell 522 defines one or more recesses 630 (see FIG. 28) each configured to receive a portion of the housing 524. The recesses 630 can help prevent rotation of the housing 524 relative to the shell 522 about an axis substantially perpendicular to the base wall 586.

In some embodiments, the shell 522 defines an opening 640 through which one or more cables 642 (see FIG. 32) can pass. In some embodiments, the one or more cables 642 comprise one or more of the cable 310, the communication lines 430, and/or the electrical lines 432 described above with respect to, e.g., FIGS. 16 and 17. Other arrangements are also possible. The cable 642 can be of any suitable variety, and can be configured to transmit, carry, or otherwise deliver power, signals, or the like to or from the screen assembly 526. In various embodiments, one or more of the cables 642 are configured to transmit electrical signals, optical signals, and/or other suitable signals. The one or more cables 642 are further discussed below.

With reference to FIG. 28, the shell 522 can include a channel 644 for receiving the one or more cables 642. In some embodiments, the channel 644 is recessed relative to a back surface of the base wall 586 and thus provides sufficient clearance for the one or more cables 642 to pass between the shell 522 and the housing 524 in an assembled entertainment system 500. In some embodiments, the one or more cables 642 are mounted to the channel 644. The channel 644 can include one or more openings 646 for receiving mounting hardware to secure the one or more cables 642 within the channel 644.

With reference again to FIGS. 27 and 28, in some embodiments, the shell 522 defines one or more vents or openings 650 through which air can be channeled. In further embodiments, two openings 650 are defined by opposite sidewalls 588*a, b* of the lower portion 582. The openings 650 can permit cooling of the entertainment system 500 in a manner such as described above with respect to the entertainment system 18.

In some embodiments, the shell 522 includes one or more extensions 660 (see FIG. 27) to which upholstery can be mounted (e.g., via stapling). The extensions can project forward from the back wall 590 of the upper portion 584, in some arrangements.

In certain embodiments, a lower sidewall 588*c* defines a recess 662. As further discussed below, the recess 662 can provide space for a flange defined by the housing 524, which can be beneficial in some embodiments of a locking mechanism.

The shell 522 can be formed of any suitable material. In preferred embodiments, the shell 522 comprises a substantially rigid material capable of providing a structural core about which the pads 510 can be arranged or formed and/or to which a covering of the headrest 502 can be attached. In some embodiments, the shell 522 comprises plastic. In further embodiments, the shell 522 comprises a plastic (or a composite plastic) that is capable of providing rigid support, yet is relatively flexible or pliable. In some embodiments, the plastic can be substantially resistant to shattering, shearing, tearing, or otherwise permanently deforming in the event of a vehicle collision, yet, in the unlikely event that such deformations should occur, the plastic can deform in a manner that results in few, if any, sharp or jagged edges. Accordingly, in the event that a shell 522 does shear or tear in a collision, the plastic can produce one or more edges that are relatively unlikely to cut a passenger.

In some embodiments, the shell 522 comprises a composite plastic that includes acrylonitrile butadiene styrene plastic (ABS plastic) and polycarbonate plastic (PC plastic). In various embodiments, the composite plastic comprises between about 40 percent and about 90 percent ABS plastic and between about 10 percent and about 60 percent PC plastic, between about 50 percent and about 80 percent ABS plastic and between about 20 percent and about 50 percent PC plastic, between about 60 percent and about 80 percent ABS plastic and between about 20 percent and about 40 percent ABS plastic, or between about 65 percent and about 75 percent ABS plastic and about 25 percent and about 35 percent PC plastic. In further embodiments, the composite plastic comprises no less than about 40 percent, about 50 percent, about 60 percent, about 70 percent, or about 80 percent ABS plastic and comprises no more than about 60 percent, about 50 percent, about 40 percent, about 30 percent, or about 20 percent PC plastic. In some embodiments, the composite plastic comprises about 70 percent ABS plastic and about 30 percent PC plastic. Other combinations of ABS and PC plastic are possible. Furthermore, other plastics may also be included and/or may replace one or more of the ABS and PC plastic. Additives may also be included with the composite plastic. Still further compositions are possible.

Figure 29:
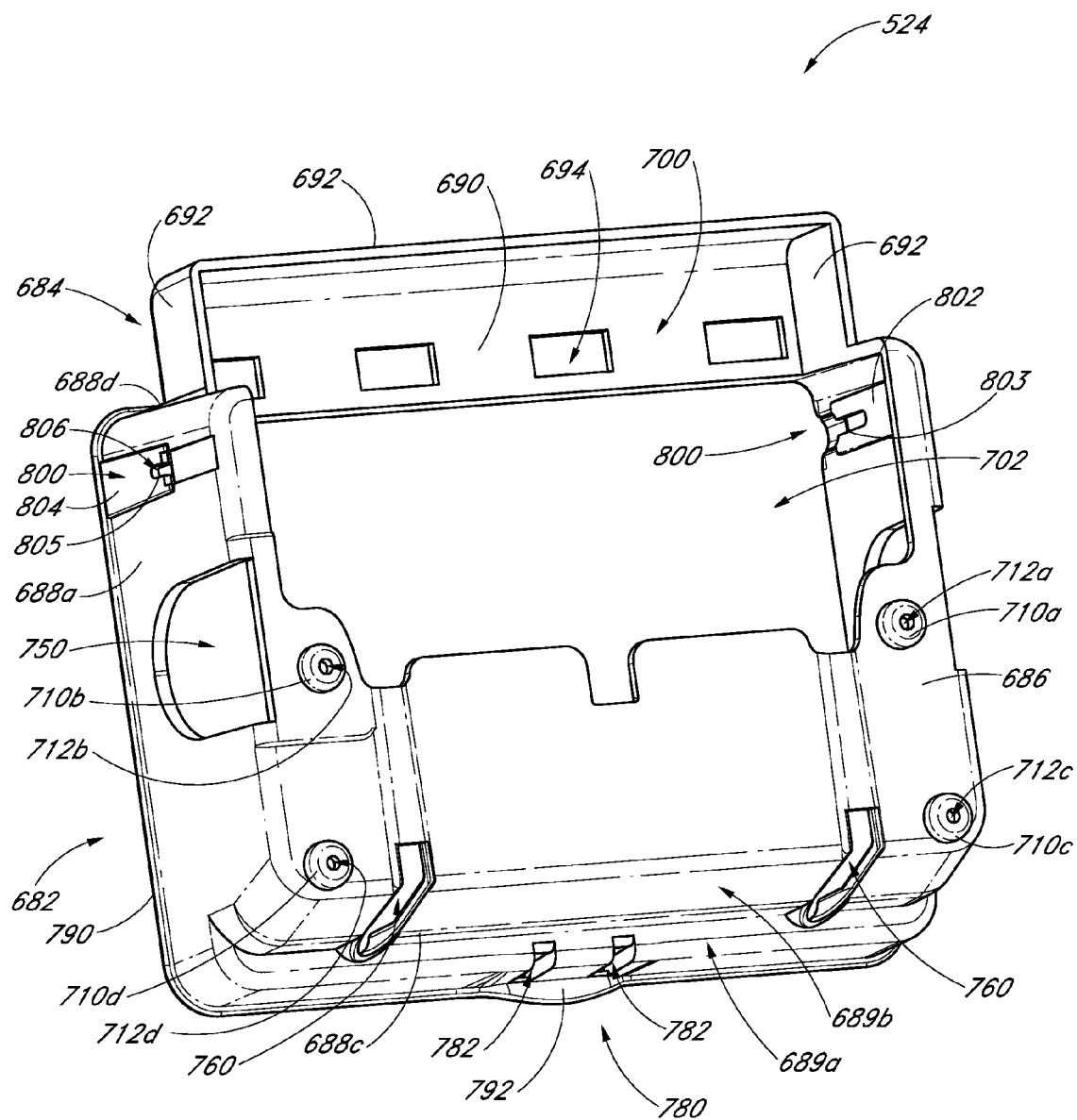
FIG. 29 is a front perspective view of an embodiment of a housing compatible with the entertainment system of FIG. 25.

With reference to FIGS. 29 and 30, in certain embodiments, the housing 524 is sized and shaped to be received within the cavity 600 defined by the shell 522. The housing 524 can include a lower portion 682 and an upper portion 684. In some embodiments, the lower portion 682 is sized and shaped to be received within the lower portion 582 of the shell 522 and the upper portion 684 is sized and shaped to be received within the upper portion 584 of the shell 522.

In some embodiments, the lower portion 682 of the housing 524 includes a base, foundation, backing, mounting portion, or base wall 686 and one or more borders, sides, edges, or sidewalls 688. In some embodiments, the lower portion 682 includes four separate sidewalls 688*a, b, c, d* at four sides of the lower portion 682. In some embodiments, three sidewalls 688*a, b, c* extend from the base wall 686. In some embodiments, a fourth sidewall 688*d* is spaced from a substantial portion of the base wall 686. In some embodiments, the upper portion 684 extends from the fourth sidewall 688*d*.

In some embodiments, one or more of the sidewalls 688*a, b, c, d* are angled with respect to the base wall 686. In certain arrangements, two of the sidewalls 688*a, b* are substantially planar, and can extend from the base wall 686 at an angle of between about 0 degrees and about 15 degrees relative to a line perpendicular to a plane defined by the base wall 686. In some embodiments, a third sidewall 688*c* includes one or more faces or portions 689*a, b* that are angled relative to a surface normal of the base wall 686 by different amounts. In some embodiments, the angle defined by one or more of the portions 689*a, b* is between about 0 degrees and about 30 degrees. Other arrangements are also possible.

The upper portion 684 of the housing 524 can be shaped substantially as a parallelepiped, which can include rounded edges and/or corners. The upper portion 684 can include a back wall 690 and one or more sidewalls 692. In some embodiments, the one or more sidewalls 692 are substantially perpendicular to the back wall 690. In some embodiments, the back wall 690 defines a series of openings 694 configured to receive the extensions 660 of the shell 522. The back wall 690 of the upper portion 684 and the base wall 686 of the lower portion 682 can be substantially parallel, in some arrangements. Other shapes and configurations of the housing 524 are also possible.

In some embodiments, the housing 524 defines a cavity 700 sized to receive at least a portion of the screen assembly 526. In some embodiments, the upper and lower extents of the cavity 700 are defined by the upper and lower portions 682, 684 of the housing 524. The housing 524 can define an aperture, port, opening, or window 702. In some embodiments, the window 702 is defined by and/or extends through the base wall 686 of the lower portion 682. The window 702 can further be defined by one or more sidewalls 692 of the upper portion 684. In some embodiments, the window 702 is sized to permit the passage therethrough of a portion of the screen assembly 526 as the screen assembly 526 is rotated, as further discussed below.

In certain embodiments, the housing 524 includes one or more mounting features or projections 710. In some embodiments, the projections 710 extend from a forward-facing surface of the base wall 686. As described above, in some embodiments, at least a portion of one or more of the projections 710 is sized and shaped to fit snugly within one or more of the recesses 630 defined by the shell 522. Interaction of the projections 710 and the recesses 630 can help to prevent rotation of the housing 524 relative to the shell 522 about an axis substantially perpendicular to the base wall 686

Each projection 710 can define an opening, orifice, channel, or port 712 that can extend through the base wall 686. In some embodiments, mounting hardware is advanced through the ports 712*a, b* into the ports 626*a, b* of the shell 522 to secure the housing 524 to the shell 522. In some embodiments, mounting hardware is advanced through the ports 712*c, d*, through the ports 612*c, d* of the shell 522, and into the protrusions 560*c, d* of the mounting plate 540 to secure the housing 524 and the shell 522 to each other and to the mounting plate 540.

In some embodiments, the housing 524 defines one or more vents or openings 750 through which air can be channeled. In further embodiments, two openings 750 are defined by opposite side walls 688*a, b* of the lower portion 682. The openings 750 can be aligned with and/or can cooperate with the openings 650 of the shell 522 and the openings 512 of the headrest 502 to permit cooling of the entertainment system 500, as further described below.

In some embodiments, the housing 524 defines one or more apertures, paths, ports, openings, or passageways 760. The passageways 760 can be substantially elongate, and in some embodiments, extend from the base wall 686 to a rear portion 689*b* of the third or lower sidewall 688*c*. The passageways 760 can extend in a direction substantially perpendicular to a plane defined by the base wall 686. In some embodiments, the passageways 760 are sufficiently wide to permit the passage therethrough of at least a portion of a tool or device that is configured to aid in the coupling or decoupling of mounting hardware with the shell 522 and/or the mounting plate 540, such as, for example, the stem or tip of a screwdriver. In some embodiments, a lower end of each passageway 760 is curved or rounded, and can thus facilitate rotation of the device within the passageway 760. The lower ends of the passageways 760 can further help to align the device with the ports 612*e, f* of the shell 522, and can thus aid in the attachment to and/or removal from the mounting plate 540 of the retaining harness 570, as further described below.

In certain embodiments, the base wall 686 defines one or more depressions, recesses, receptacles, retainers, or channels 765 (see FIG. 30) configured to receive at least a portion of the retaining harness 570 when the screen assembly is in a stowed configuration within the housing 524. In some embodiments, the channels 765 are substantially elongated and extend upward from the passageways 760. The channels 765 can extend between the passageways 760 and the window 702. In some embodiments, the channels 765 are recessed relative to a rearward-facing surface of the base wall 686, and can be sufficiently wide and deep to accept at least a portion of the retaining harness 570 therein such that the retaining harness 570 does not interfere with the closing of screen assembly 526. For example, in some embodiments, the channels 765 provide sufficient clearance for the harness 670 such that the screen assembly 526 can transition from a deployed orientation in which at least a portion of the screen assembly 526 is outside of the cavity 700 to a stowed orientation in which substantially all of the screen assembly 526 is within the cavity 700.

In some embodiments, the housing 524 defines an abutment surface, stop, or ridge 770. The ridge 770 can interfere with a portion of the screen assembly 526 as the screen assembly is rotated into the cavity 700 to prevent further rotation of the screen assembly.

With continued reference to FIGS. 29 and 30, in some embodiments, the housing 524 defines a catch, locking member, or lock portion 780. The lock portion 780 can be defined by the lower sidewall 688*c* of the housing 524. In some embodiments, the lock portion 780 includes one or more recesses, holes, or openings 782. In some embodiments, the lock portion 780 includes two elongated openings 782 that are substantially parallel to each other. The openings 782 can extend in a direction substantially perpendicular to a plane defined by the base wall 686. Other arrangements are also possible. For example, in some embodiments, the lock portion 780 comprises a single opening 782. In other embodiments, the lock portion 780 includes more than one opening 782 or more than two openings 782. In some embodiments, the openings 782 comprise depressions, indentations, or recesses that extend downward from an inner surface of the lower sidewall 688*c*.

In certain embodiments, the housing 524 defines a rim 790 that extends about a rearward periphery of the sidewalls 688. The rim 790 can substantially define a plane that constitutes a rearward spatial extent of the cavity 700. In some embodiments, a portion of the rim 790 near the lock portion 780 is slightly enlarged and is recessed relative to the remainder of the rim 790. The rim 790 can define a flange 792 that extends downward from the lower sidewall 688c. In some embodiments, the flange 792 is substantially rounded or shaped as a partial bowl, and thus can define a concavity that extends forward from the rim 790. As further discussed below, the flange 792 can aid in opening the screen assembly 526 (e.g., when transitioning the screen assembly 526 from a closed configuration to a deployed configuration). In some embodiments of an assembled entertainment system 500, the recess 662 defined by the lower sidewall 588c of the shell 522 provides sufficient space for the flange 792 to extend downward.

In some embodiments, the housing 524 defines one or more hinge portions, hinge elements, channels, retainers, or receptacles 800 configured to aid in coupling the screen assembly 526 with the housing 524. In some embodiments, the receptacles 800 are substantially elongate and extend in a direction substantially perpendicular to a plane defined by the base wall 686. Each receptacle 800 can include an inner wall 802 and an outer wall 804 that can be substantially parallel to each other. The inner and outer walls 802, 804 can cooperate to form a relatively small cavity for receiving a portion of the screen assembly 526. In some embodiments, the inner wall 802 defines a slot 803 and the outer wall 804 defines a slot 805. The slots 803, 805 can overlap in such a manner as to form an opening 806 through which a fastening member, such as a screw, can be advanced. In certain instances, defining the opening 806 in this manner provides the receptacles 800 with a strong fastening point particularly suited to forward-directed and rearward-directed forces typical in the context of vehicular travel, as the inner and outer walls 802, 804 serve to resist forward and rearward movement within the slots 803, 805, respectively.

In some embodiments, the receptacles 800 are formed in two sidewalls 688a, b of the housing 524. In some embodiments, the receptacles 800 are at or adjacent a top edge of the housing 800 (e.g., near the upper sidewall 688d), and in other embodiments, are at or adjacent a bottom edge of the housing 800 (e.g., near the lower sidewall 688c).

The housing 524 can be formed of any suitable material. In preferred embodiments, the housing 524 comprises a substantially rigid material capable of providing the screen assembly 526 with structural support and/or protection from bumps and shocks. In some embodiments, the housing 524 comprises plastic. In further embodiments, the housing 524 comprises a composite plastic such as any of the varieties described above with respect to the shell 522.

With reference to FIG. 31, in certain embodiments, the screen assembly 526 is sized and shaped to be received within the cavity 700 defined by the housing 524. In some embodiments, the screen assembly 526 includes a display, monitor, or viewing screen 820. The viewing screen 820 can be of any suitable variety, including those listed above with respect to the monitor 200. In some embodiments, the viewing screen 820 defines a substantially planar viewing surface.

In some embodiments, the screen assembly includes a signal generating device, media player, or media reader 830. The media reader 830 can be configured to receive a nonvolatile storage medium and to generate signals based on information stored on the storage medium. For example, in some embodiments, the media reader 830 comprises a DVD player, and can be configured to receive one or more DVDs in order to produce audio and/or video signals therefrom. In some embodiments, the media reader 830 delivers video signals to the viewing screen 820, which displays the signals in a visually perceivable form. Other arrangements for delivering signals to the viewing screen 820 are also possible, including any suitable arrangement described above.

In some embodiments, the screen assembly 526 includes one or more control buttons 840. The control buttons 840 can be selectively actuated to affect operation of the viewing screen 820 and/or the media reader 830. In some embodiments, the screen assembly 526 includes a communication panel 842. The communication panel 842 can include and/or cover one or more lights (e.g., LEDs) that can communicate an operational state of the screen assembly to a user. The communication panel 842 can further include and/or cover a transceiver, transmitter, or receiver configured to communicate signals to and/or receive signals from an auxiliary device. For example, in some embodiments, the panel 842 covers an infrared transmitter that relays audio information to a personal headset.

With reference to FIGS. 31 and 32, in some embodiments, the screen assembly 526 includes an outer housing, a shell, or a casing 850. In further embodiments, the casing 850 includes a rear cover 852 and a front cover 854. In certain embodiments, the rear cover 852 is substantially rectangular and can include rounded corners and/or edges. In some embodiments, a lower edge of the rear cover 852 defines a depression or indentation 856, described further below. The rear cover 852 can substantially frame the viewing screen 820, the buttons 840, and/or the communication panel 842.

In certain embodiments, the front cover 854 is shaped substantially as a parallelepiped. The front cover 854 can include a substantially planar base wall 862 and one or more sidewalls 864 that are oriented approximately perpendicularly with respect to the base wall 862. In some embodiments, a lower sidewall 864c of the cover 854 includes an angled portion that transitions between the base wall 862 and a portion of the lower sidewall 864 that is substantially perpendicular to the base wall 862. In some embodiments, an abutment surface, stop, or ridge 865 extends downwardly from the lower sidewall 864c. As discussed above, the ridge 865 can be configured to interfere with the ridge 770 of the housing 524 to limit rotation of the screen assembly 526 into the cavity 700 of the housing 524. The lower sidewall 864c can define an opening 866 through which a storage device or storage medium (e.g., a DVD) can be inserted or removed from the media reader 830. In some embodiments, an eject button 868 extends through the lower sidewall 864c.

Figure 35:
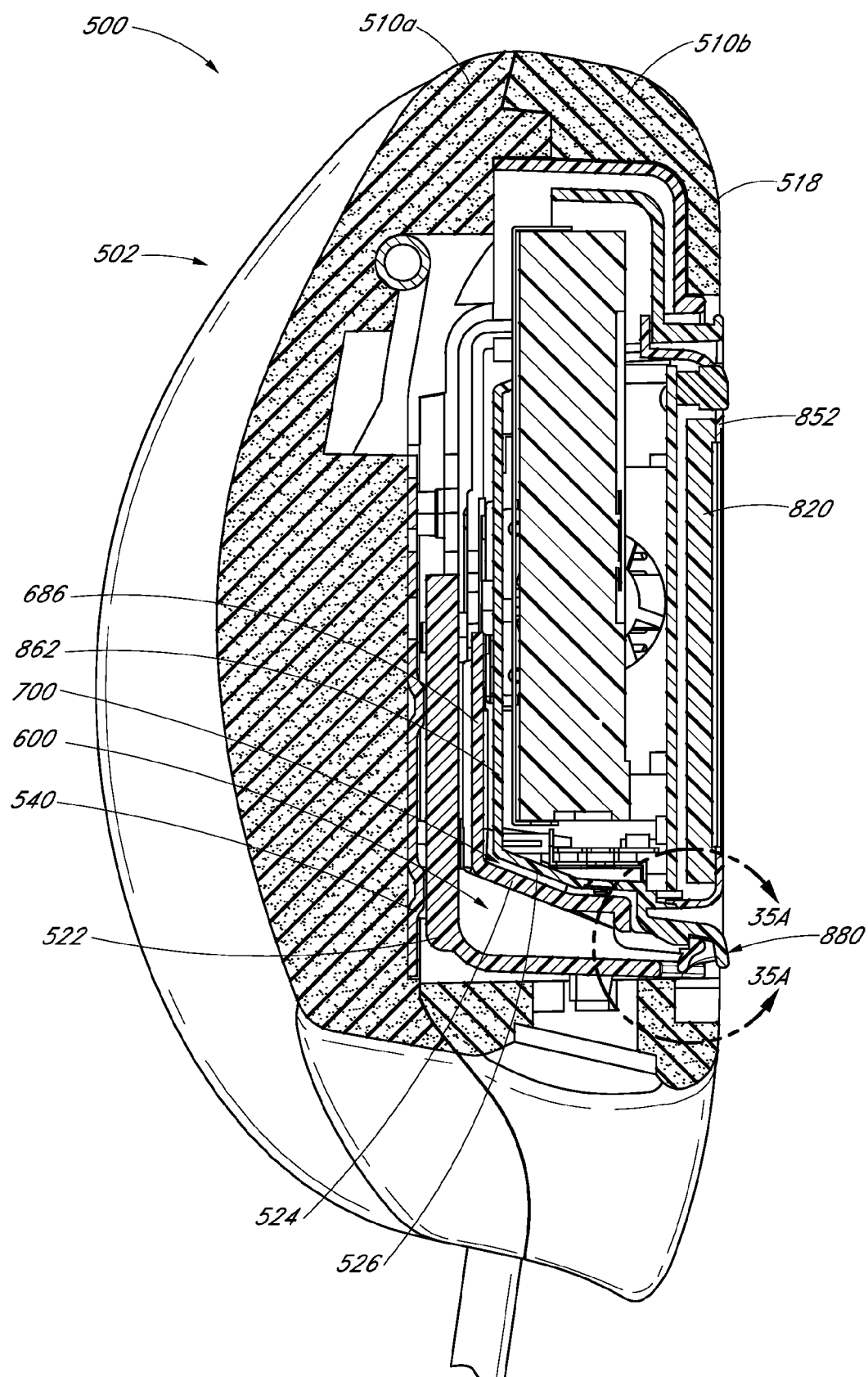
FIG. 35 is a side cross-sectional view of the entertainment system of FIG. 25 shown in a stowed configuration.

In some embodiments, the lower sidewall 864c includes a lock portion, latch member, detent, or arm 880, which, in further embodiments, is integrally formed with the front cover 854. In some embodiments, the arm 880 extends rearward from the ridge 865, and thus can include a rearward-projecting portion 882. In some embodiments, the arm 880 extends rearward of the rear cover 852 (as shown in FIGS. 31 and 35). In some embodiments, one or more protrusions, latch devices, catches, or projections 884 extend downward from the rearward-projecting portion 882 of the arm 880. As discussed below, in some embodiments, the projections 884 can cooperate with the openings 782 of the lock portion 780 to secure the screen assembly 526 in a stowed configuration.

The arm 880 can include a manual interface or finger catch 886 that extends downward at the end of the portion 882. In some embodiments, the finger catch 886 includes rounded edges and can further have a curved or rounded end. In various embodiments, the finger catch 886 can be sufficiently wide to permit one or more, two or more, or three or more finger tips of a user to be placed thereon. In various embodiments, the width of the finger catch 886 is between about 0.5 and about 2.0 inches or between about 0.75 and about 1.5 inches.

In some embodiments, the finger catch 886 is moved or rotated upward to actuate the arm 880, as further described below. The indentation 856 defined by the rear cover 852 thus can provide the arm 880 with a relatively larger range of motion. In some embodiments, the arm 880 comprises a resilient material capable of undergoing repeated, relatively small displacements without being permanently deformed. In various embodiments, the arm 880 and/or the front cover 854 comprises plastic. In further embodiments, the plastic is composite plastic, such as any of the composite plastics described above with respect to the shell 522. In some embodiments, the rear cover 852 comprises the same material as the front cover 854.

In some embodiments, the front cover 854 defines one or more venting structures 890, which can include a plurality of elongated slots or openings. One or more venting structures 890 can be included in the base wall 862. In some embodiments, a first venting structure 890a is located in a first sidewall 864a and a second venting structure 890b is located in a second sidewall 864b. The first and second venting structures 890a, b can be substantially aligned with each other so as to permit air to flow readily from the first venting structure 890a to the second venting structure 890b (or vice versa). In some embodiments, a fan 895 is positioned adjacent the first venting structure 890a.

In some embodiments, the first and second venting structures 864a, b are aligned with and/or can cooperate with the openings 750 of the housing 524, the openings 650 of the shell 522, and the openings 512 of the headrest 502 to permit cooling of the entertainment system 500. For example, in some embodiments, relatively cool air from an environment surrounding the headrest 502 is drawn through a first set of openings 512, 650, 750 and through the first venting structure 890a into the screen assembly 526 via the fan 895, and heated air is forced from the screen assembly 526 through the second venting structure 890b and through a second set of openings 512, 650, 750 into the environment surrounding the headrest 502.

As discussed above, in some embodiments, one or more cables 642 are connected with the screen assembly 526. In some embodiments, the screen assembly 526 includes a grommet 897 configured to snugly retain the one or more cables 642 from movement into or out of an opening in the front cover 854. In some embodiments, the one or more cables 642 can supply the fan 895, the viewing screen 820, and/or the media reader 830 with power; can relay electrical signals to the viewing screen 820 and/or the media reader 830; and/or can relay electrical signals from the media reader 830. Other functions of the one or more cables 642 are also possible.

In some embodiments, the screen assembly 526 includes a mounting structure or frame 900. In preferred embodiments, the frame 900 comprises a high-strength material resistant to tearing or shearing. In some embodiments, the frame 900 comprises a metal or metal alloy, such as, for example, steel. As further discussed below, various components of the screen assembly 526 can be coupled with the frame 900. In some embodiments, a cap or cover 905 can be coupled with the frame 900 to substantially cover an opening in the frame 900. The cover 905 can protect connection wires or ribbons or other relatively sensitive portions of the electrical circuitry of the screen assembly 526 from snagging or catching on the pads 510 of the headrest 502 as the screen assembly 526 is rotated from a stowed configuration to a deployed configuration (see, e.g., FIG. 36). In some embodiments, the cover 905 comprises plastic.

In certain embodiments, the screen assembly 526 includes one or more hinge elements, hinge portions, or hinges 910 that are configured to pivotally mount the screen assembly to the housing 524. The hinges 910 can extend through an opening (not shown) defined by the front and rear covers 854, 852, and can be configured to rotate within the opening. In some embodiments, the hinges 910 include first hinge portions, slabs, or plates 912 that can be substantially rectangular. In some embodiments, the plates 912 are sized and dimensioned to be received within the receptacles 800 of the housing 524. In some embodiments, a fastener 916 is inserted through an opening 918 defined by a plate 912 and through an opening 806 defined by a receptacle 800 to secure the hinge 910 to the housing 524. In some embodiments, the fastener 916 comprises a metal screw. The hinge 910 can further be coupled with the frame 900, as described below.

The hinges 910 can define an axis of rotation 909 about which the screen assembly 526 can rotate. In various embodiments, the axis 909 is substantially within or is substantially parallel to a plane defined by the viewing screen 820. In some embodiments, the axis 909 is proximate, adjacent, at, or near an upper edge of the screen assembly 526, such as a top wall of the rear cover 852. In further embodiments, the axis 909 is proximate, adjacent, at, or near a rear surface of the screen assembly 526, such as a rear face of the rear cover 852. Accordingly, in some embodiments, the axis 909 is at a top, rear corner of the screen assembly 526, which can permit a large portion of the screen assembly 526 to move away from the cavity 700 defined by the housing 524 when the screen assembly 526 is pivoted from a stowed position to a deployed position.

With reference to FIG. 32, in certain embodiments, the retaining harness 570 is configured to be coupled at one end with the screen assembly 526 and at another end to the mounting plate 540. In some embodiments, the retaining harness 570 comprises two separate straps, lines, wires, or cords 920. The cords 920 can be formed of any suitable material, and preferably are sufficiently strong and sufficiently resistant to high impulsive forces to be able to withstand movement of the screen assembly 526 away from the mounting plate 540 in the event of a collision. In various embodiments, the cords 920 comprise metal, nylon, or some other suitable material. For example, in some embodiments, the cords 920 are reinforced with steel.

In some embodiments, one or more ends of the cords 920 are secured to one or more eyelets 922, which can comprise metal. The eyelets 922 can be attached to the cords 922 in any suitable manner. For example, in some embodiments, an end of a cord 920 is advanced through an opening in an eyelet 922 and doubled back. The end of the cord 920 can be secured to the remainder of the cord 920 via any suitable fastener, such as a crimp sleeve. In other embodiments, the eyelets 922 are integrally formed with the cords 920. In still other embodiments, the retaining harness 570 does not include eyelets 922.

In some embodiments, a first eyelet 922 at a first end of a cord 920 is secured to the screen assembly 526 and a second eyelet 922 at a second end of the cord 920 is secured to the mounting frame 540. For example, in some embodiments, a fastener 924 (e.g., a metal screw) is advanced through the first eyelet 922, through the base wall 862 of the screen assembly 526 and is secured to the frame 900 (see FIG. 37). The second eyelet 922 can be secured to the mounting frame 540 via another fastener 924 in a manner such as described above. For example, the fastener 924 can be advanced through the eyelet 922, through one of the ports 612e, f of the shell 522, and into one of the protrusions 560e, f of the mounting plate 540 (see FIG. 37).

In some embodiments, the base wall 862 defines one or more rotation-limiting features or ridges 930. In some embodiments, the ridges 930 include two substantially linear portions connected by a rounded portion. The linear portions can be substantially parallel to each other. In some embodiments, an outer perimeter of an eyelet 922 is complementary to an inner perimeter of a ridge 930 such that the eyelet 922 is substantially prevented from rotating about an axis that is substantially perpendicular to the base wall 862 when the eyelet 922 is received within the ridge 930. Other configurations are also possible for the rotation-limiting features 930.

Figure 33:
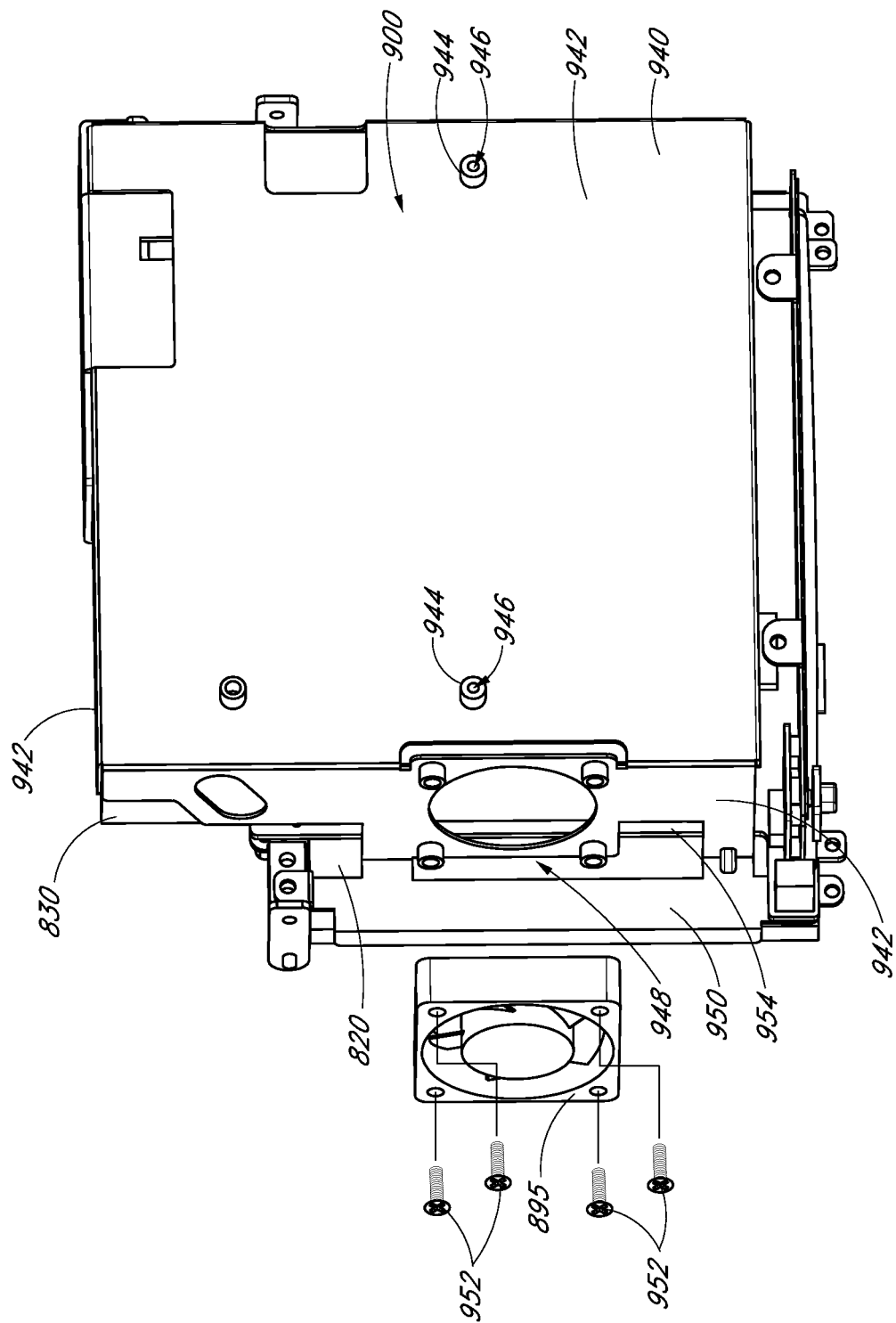
FIG. 33 is a front perspective partially exploded view of the screen assembly of FIG. 31 with an outer casing removed therefrom showing, inter alia, an embodiment of a frame.
Figure 34:
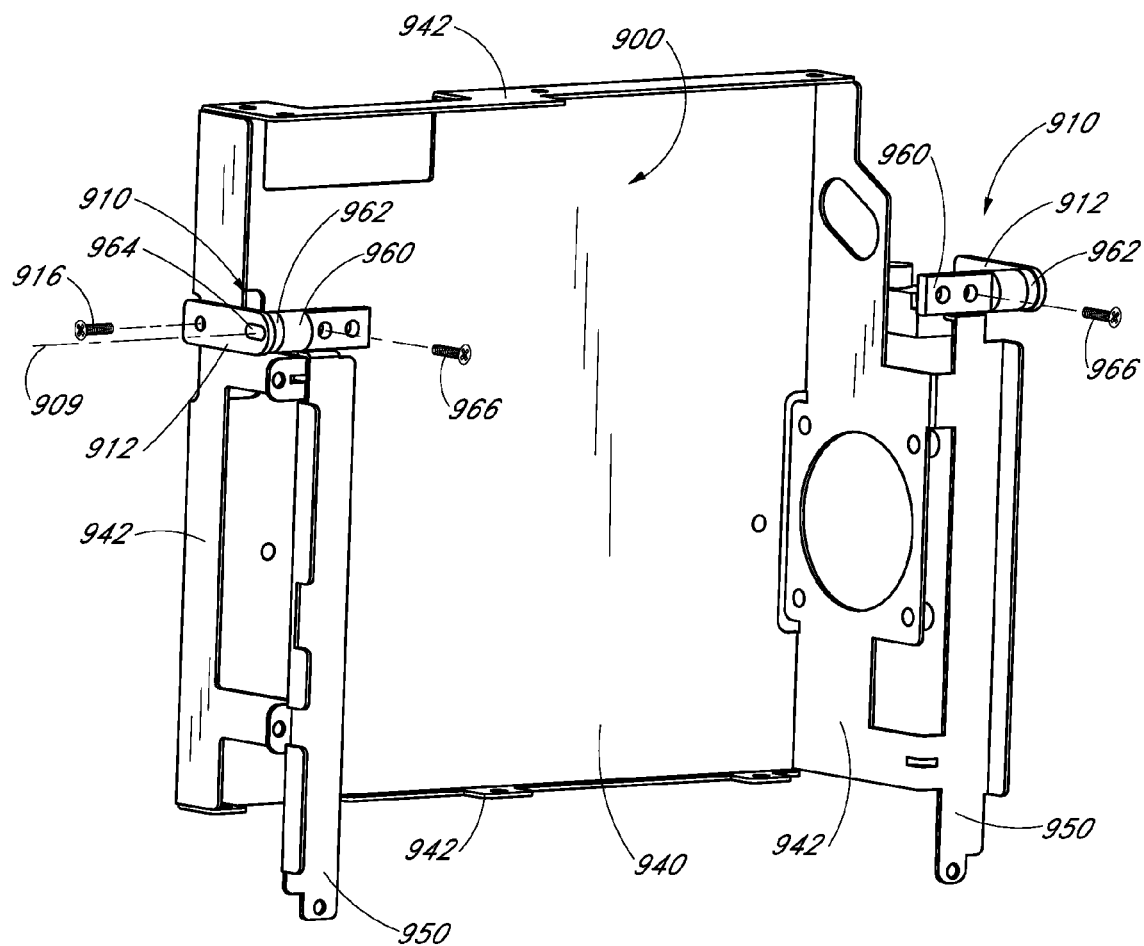
FIG. 34 is a rear perspective partially exploded view of the frame of FIG. 33 and an embodiment of hinges.

With reference to FIGS. 33 and 34, in certain embodiments, the frame 900 comprises a plurality of substantially planar surfaces. The frame can include one or more relatively thin plates, which may be formed from a unitary piece of material (e.g., sheet metal), in some configurations. In certain embodiments, the frame 900 defines a base wall 940 and one or more sidewalls 942. The sidewalls 942 can extend substantially perpendicular to the base wall 940. In some embodiments, the base wall 940 defines one or more protrusions 944 that define openings 946 for receiving fasteners (e.g., fasteners 924). In some embodiments, the protrusions 944 are tapped. The protrusions 944 thus can be configured to couple the frame 900 with the retaining harness 570. In some embodiments, the protrusions 944 space the frame 900 from the front cover 854, which can aid in maintaining cooling air flow within the casing 850. In some embodiments, one of the sidewalls 942 defines a mounting area 948 for receiving the fan 895.

In some embodiments, the frame 900 defines one or more mounting brackets 950 with which one or more components of the screen assembly 526 can be coupled. In some embodiments, the mounting brackets 950 are integrally formed with the frame 900. In other embodiments, one or more of the mounting brackets 950 comprise pieces separate from the frame 900 that can be securely fastened to the frame 900 via any suitable method, such as via welding or mounting hardware.

With reference to FIG. 33, in some embodiments, many or all components of the screen assembly 526 are secured to the frame 900. In some embodiments, the fan 895 is secured to the mounting area 948 via fasteners 952 or any other suitable method. The viewing screen 820, the media reader 830, and/or a printed circuit board 954 each can be secured to the frame 900. In some embodiments, the viewing screen 820, the media reader, and/or the printed circuit board 954 are secured to the frame 900 such that each set of adjacent components defines an air passageway (see also FIG. 35), which can help to maintain a desirable level of cooling within the outer casing 850 of the screen assembly 526.

In some embodiments, a surface area of the frame 900 is relatively large as compared with that of the other components of the screen assembly 526. For example, in some embodiments, the frame 900 covers a substantial portion of the media reader 830. In various embodiments, an external or outer surface area (i.e., the combined surface areas of one side of the base wall 940 and of one side of each sidewall 942) of the frame 900 is no less than about ⅛, ⅙, ⅕, ⅓, ½, ⅔, or ¾ the size of an outer surface area of the media reader 830. In other embodiments, a maximum cross-sectional area of the frame 900 is no less than about 0.25, 0.33, 0.50, 0.66, 0.75, 1.25, or 1.33 times the size of a viewable surface area of the viewing screen 820 in the assembled screen assembly 526.

With reference to FIG. 34, in certain embodiments, a hinge 910 includes the plate 912 described above. The plate 912 can be coupled with second hinge portion, mount, or projection 960. In some embodiments, the projection 960 and the plate 912 are oriented at approximately 90 degrees relative to each other, although other orientations are also possible. In some embodiments, the plate 912 and the projection 960 are configured to rotate relative to one another. In further embodiments, a disk-shaped element 962 is included between the plate 912 and the projection 960 to facilitate the rotation. The hinge 910 can be self-tensioning, and in some embodiments, comprises a pin 964 configured to substantially maintain a constant distance between the plate 912 and the projection 960. In some embodiments, the pin 964 defines the axis of rotation 909 of the hinge 910. Some or all of the components of the hinge 910 can comprise a high-strength material. In some embodiments, the hinge 910 comprises metal.

The plate 912 of the hinge 910 can be secured to the frame 524 in the manner described above (e.g., via the fastener 916). Similarly, a fastener 966 (e.g., a metal screw) can be advanced through the projection 960 into a mounting bracket 950 of the frame 900 in order to secure the hinge 910 to the screen assembly. In further embodiments, an additional fastener 966 can be advanced through the projection 960 to directly couple the fastener 966 with the rear cover 852 of the casing 850.

In certain advantageous embodiments, coupling metallic hinges 910 with a metal frame 900 via metallic fasteners 964 can effectively provide a substantially solid metallic piece that can act and react as a unified whole, thereby reducing stresses on the contact points among the hinges and the screen assembly 526. For example, in the event of a high-speed collision (such as, for example, a collision in which a first vehicle in which the entertainment system 500 is mounted is at rest and a second vehicle rear-ends the first vehicle), the screen assembly 526, if unrestrained, could rotate out of the headrest 502 due to inertia, and could forcefully collide with a top edge of the housing 524. Such a collision could result in powerful impulse forces on the hinges 910. However, a secure connection among metallic components can result in distribution or transfer of the impulsive forces among the components. In certain circumstances, spreading of impulsive forces in this manner can reduce the likelihood that stress points or weak points will develop (such as at the hinge/frame interface) and result in separation of the screen assembly 526 from the housing 524.

FIG. 35 illustrates an embodiment of the entertainment system 500 in an assembled state. In the depicted embodiment, the shell 522 is coupled with the mounting plate 540 and is substantially fixed relative thereto. The pads 510a, b are arranged about the shell 522. The housing 524 is coupled with the shell 522 and is substantially fixed relative thereto. The housing 524 is substantially within the cavity 600 defined by the shell 522. The screen assembly 526 is coupled with the housing 524 (e.g., via the hinges 910 and receptacles 800, as described above).

In the illustrated embodiment, the screen assembly 526 is in a closed or stowed configuration. In some embodiments, the screen assembly 526 is substantially fixed relative to the housing 524 when in the stowed configuration, as further discussed below. In some embodiments, substantially all of the screen assembly 526 is within the cavity 700 defined by the housing 524 when in the stowed orientation. In further embodiments, all or substantially all of the screen assembly 526 is within the headrest 502. For example, in the illustrated embodiment, all of the screen assembly 526, except for a small portion of the arm 880, is within the headrest 502. In some embodiments, a rear surface of the screen assembly 526 (e.g., a rear face of the rear cover 852) is substantially flush with the rear surface 518 of the headrest 502. In other embodiments, the rear surface of the screen assembly 526 is recessed relative to the rear surface 518 of the headrest. In some embodiments, the viewing screen 820 is recessed relative to the rear surface 518 of the headrest. Accordingly, in various embodiments, the entertainment system 500 can define a low profile. Such a low-profile system can be desirable in the context of the passenger compartment of a vehicle, where the system can provide passengers with a larger and relatively unencumbered space in which to move. Other arrangements are also possible.

In some embodiments, the viewing screen 820 is substantially parallel to the base wall 686 of the housing 524 when the screen assembly 526 is in the stowed configuration. In some embodiments, the base wall 862 of the screen assembly 526 is substantially parallel to the base wall 686 of the housing 524 when the screen assembly 526 is in the stowed configuration.

Figure 35A:
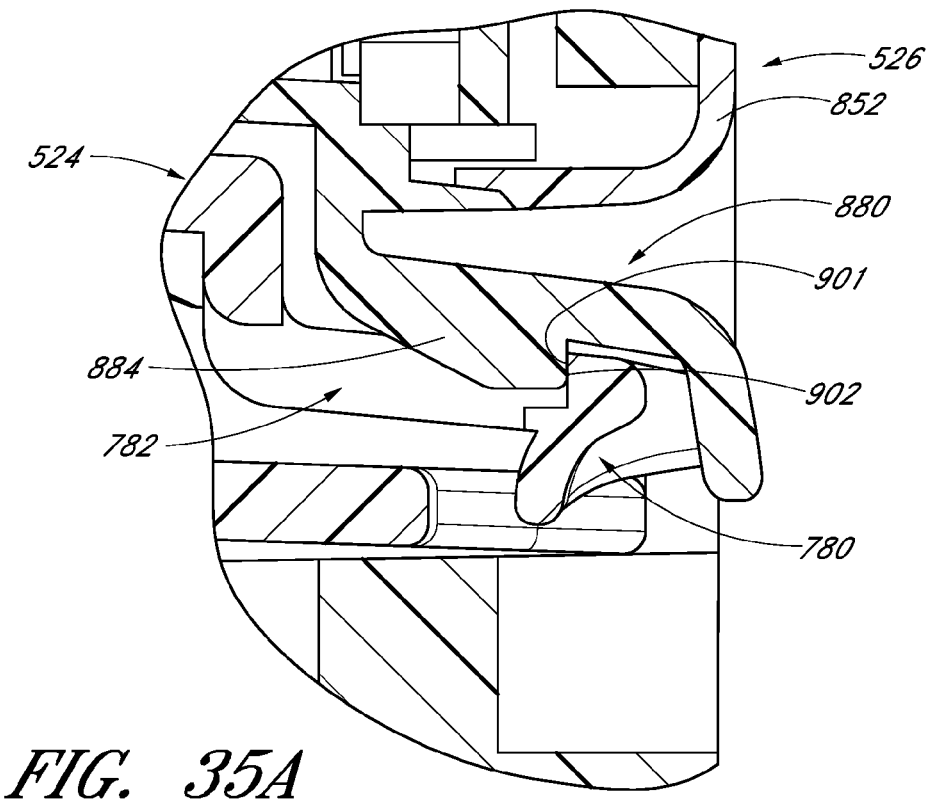
FIG. 35A is an enlarged partial side cross-sectional view of the entertainment system of FIG. 25 taken along the view line 35A-35A in FIG. 35 illustrating an embodiment of a lock portion and an embodiment of an arm.

With reference to FIG. 35A, in certain embodiments, the arm 880 of the screen assembly 526 is in a natural, relaxed, or resting state when the screen assembly 526 is in the stowed configuration. In certain embodiments, the arm 880 extends in a first direction when in the resting state. In the illustrated embodiment, the arm 880 extends downward or away from a bottom surface of the rear cover 852 when in the resting state.

In certain embodiments, the projections 884 of the arm 880 cooperate with the openings 782 of the lock portion 780 to maintain the screen assembly 526 in the stowed orientation when the arm 880 is in the resting state. The projections 884 can be received within the openings 782 to lock the screen assembly 526 relative to the housing 524. In some embodiments, a projection 884 defines a first abutment or interference surface 901 and an opening 782 defines a second abutment or interference surface 902. In some embodiments, the first and second surfaces 901, 902 are substantially planar. In the illustrated embodiment, the first and second surface 901, 902 are each oriented substantially vertically such that contact between the first and second surfaces 901, 902 prevents the first and second surfaces 901, 902 from moving substantially horizontally with respect to each other in a given direction (e.g., in a direction that would move a lower edge of the screen assembly 526 away from the housing 524, in the illustrated embodiment).

In some embodiments, interference between the first and second surfaces 901, 902 prevents the screen assembly 526 from rotating away from the stowed orientation. For example, in some embodiments, interaction between the first and second surface 901, 902 can be sufficiently strong to counteract large forces applied in a direction substantially perpendicular to a surface normal of the first or second surface 901, 902. Such forces can be substantially stronger than those that a user would employ to rotate the screen structure 526 (e.g., forces applied to overcome the weight of the screen structure 526 and/or resistance of the hinges 910). In some embodiments, the first and second surfaces 901, 902 are oriented such that, when the screen assembly is in the stowed configuration 526, the surface normals of the first and second surfaces 901, 902 are substantially parallel to a direction in which torque applied to the screen structure 526 would rotate the screen structure 526 about the axis of rotation 909 defined by the hinges 910. The first and second surfaces 901, 902 thus can be positioned to counteract torsional forces that otherwise would rotate the screen assembly 526 outward from the housing 524.

Accordingly, in some advantageous embodiments, the arm 880 and the lock portion 780 are capable of maintaining the screen structure 526 in the closed orientation in the event of a high-speed collision. Impulsive forces generated in such a collision can act on the screen structure 526 in a variety of directions and at a variety of locations. By cancelling torsional forces that would rotate the screen structure 526 about the axis 909, the arm 880 and the lock portion 780 can prevent the screen structure 526 from opening (e.g., moving from the stowed state to the deployed state) in an undesirable manner.

Figure 35B:
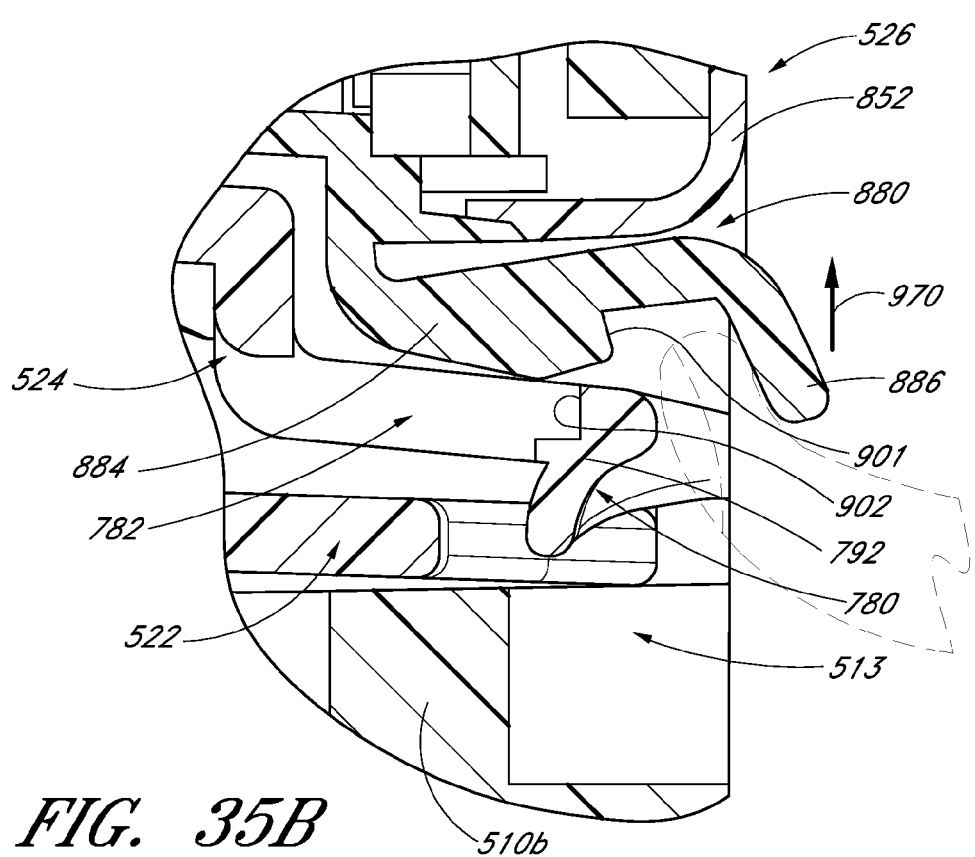
FIG. 35B is a partial side cross-sectional view such as that of FIG. 35A illustrating the arm in a displaced state.

With reference to FIG. 35B, in certain embodiments, the arm 880 can be moved, bent, flexed, or deformed to a displaced state to permit the screen assembly 526 to move from the stowed position to the deployed position. When in the displaced state, the arm 880 can extend in a second direction that is different than the first direction. For example, in the illustrated embodiment, rather than extending away from the bottom surface of the rear cover 852 as it does in the relaxed state, the arm 880 extends toward the bottom surface of the rear cover 852 in the displaced state. Accordingly, in some embodiments, the arm 880 can be rotated from the relaxed state to the displaced state. In some embodiments, the arm 880 can be rotated to the displaced state without rotating the full screen assembly 526 relative to the housing 524. For example, the arm 880 can be placed in the displaced state, which allows movement of the screen assembly 526 relative to the housing 524, without also moving the full screen assembly 526. In other embodiments, the arm 880 can be rotated to the displaced state without rotating the screen assembly 526 outward from the housing 524.

In certain embodiments, when the arm 880 is in the displaced state, the projections 884 of the arm 880 are outside of the openings 782 of the lock portion 780. Accordingly, the first surface 901 is spaced from the second surface 902 such that the first and second surfaces 901, 902 can move past each other. As a result, the screen structure 526 can be rotated to the deployed position.

In some embodiments, in order to actuate the arm 880 (e.g., move the arm 880 from the relaxed to the displaced state), a user places one or more, two or more, or three or more finger tips (shown in phantom) within the cavity 513, which can be at least partially defined at a lower end by the pad 510b and at an upper end by the flange 792 of the housing 524. In some embodiments, the flange 792 is in sufficiently close proximity to the pad 510b to prevent a user from inserting his or her fingertips between the pad 510b and the flange 792 and/or into the space between the housing 524 and the shell 522. Accordingly, the flange 792 can serve as a backstop for a user's fingers.

In further embodiments, the flange 792 can facilitate actuation of the arm 880. For example, in some embodiments, the concave shape flange 792 curves toward a forward-facing surface (e.g., a back surface from a user's perspective) of the finger catch 886. The flange 792 can thus urge a user's finger tips toward the finger catch 886 as the user lifts his or her fingers to actuate the arm 880.

In some embodiments, a user touches, grasps, or otherwise handles the forward-facing surface and/or a bottom surface of the finger catch 886 in order to actuate the arm 880. In some instances, the user may further touch, grasp, or otherwise handle the rear-facing surface of the finger catch 886 with a thumb. In some embodiments, the finger catch 886 is moved in a direction that is substantially parallel to a plane defined by the viewing screen 820. For example, in the illustrated embodiment, the viewing screen 820 (see FIG. 35) is substantially vertical, and thus defines a substantially vertical plane. The finger catch 886 can be lifted by a user in a substantially vertical direction (indicated by the arrow 970) to move the projections 884 out of the opening 782. In the illustrated embodiment, the finger catch 886 is below the viewing screen 820, thus the finger catch 886 is moved toward a center point of the viewing screen 820 to actuate the arm 880. The user thus can pull the finger catch 886 in a substantially horizontal direction to cause the screen assembly 826 to rotate.

Figure 35C:
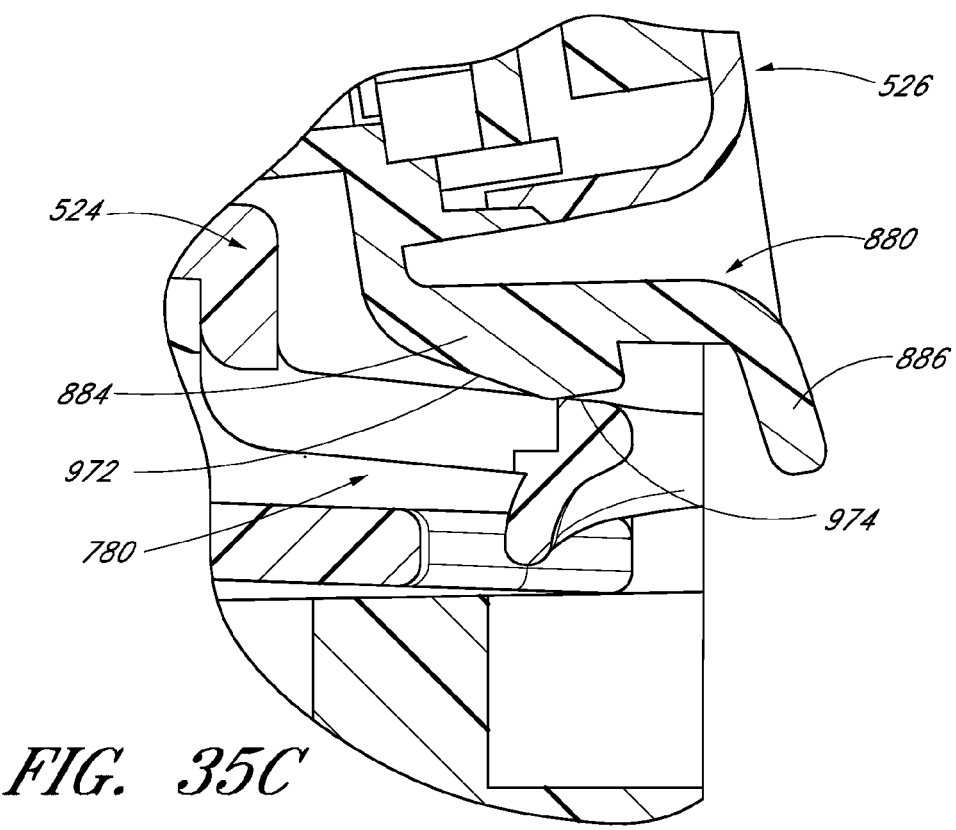
FIG. 35C is a partial side cross-sectional view such as that of FIG. 35A illustrating the arm being returned to the position depicted in FIG. 35A.

With reference to FIG. 35C In some embodiments, the arm 880 is moved to the displaced state when stowing the screen assembly 526, and is returned to the resting state to maintain the screen assembly 526 in the stowed configuration. In the illustrated embodiment, the projection 884 defines a curved or rounded lower surface 972 that can cooperate with an upper surface 974 of the lock portion 780 to transition the arm 880 from the relaxed state to the displaced state. As the screen assembly 526 is rotated into the housing 524, the lower surface 972 can contact the surface 974. As the screen assembly 526 is advanced further into the housing 524, the contact can urge the arm 880 increasingly further from the relaxed state, which can produce an increasingly larger restorative force within the arm 880. Once the screen assembly 526 has been advanced sufficiently far into the housing 524, the arm 880 can spring back to the relaxed state. Accordingly, in certain advantageous embodiments, a user can stow the screen assembly 526 without manipulating the finger catch 886. For example, a user can merely press on a lower face of the rear cover 852 to transition the screen assembly from the deployed orientation to the stowed orientation.

Figure 35D:
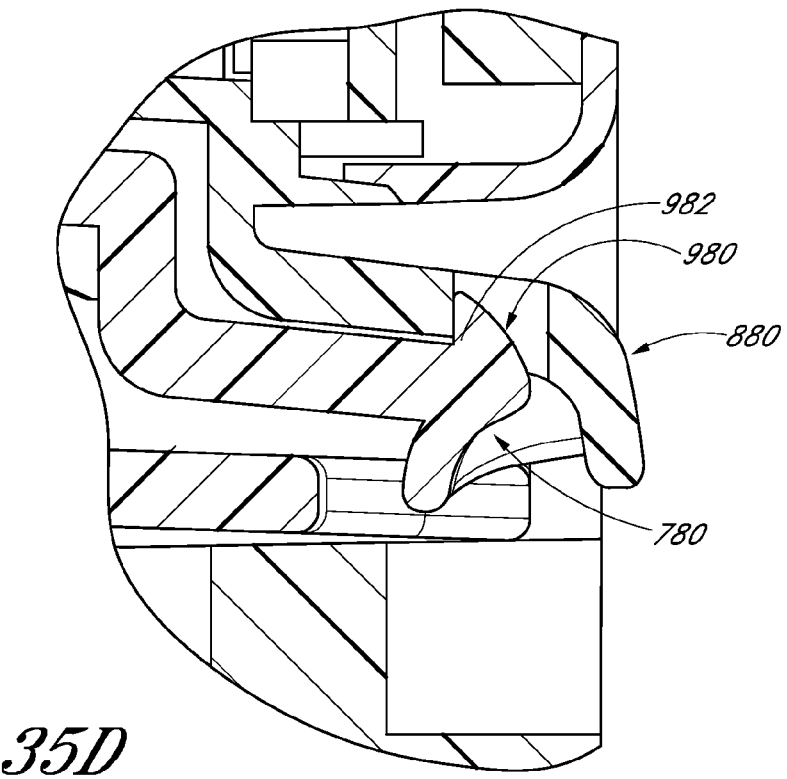
FIG. 35D is a partial side cross-sectional view such as that of FIG. 35A illustrating another embodiment of a lock portion and another embodiment of an arm.

FIG. 35D illustrates another embodiment of the arm 880 and the lock portion 780. In the illustrated embodiment, the arm 880 includes openings 980 rather than the projections 884, and the lock portion 780 includes projections 982 rather than the openings 782. The openings 980 and the projections 982 can function in a manner such as described above with respect to the openings 782 and the projections 884. Other arrangements and configurations of the arm 880 and the lock portion 780 are also possible.

Figure 36:
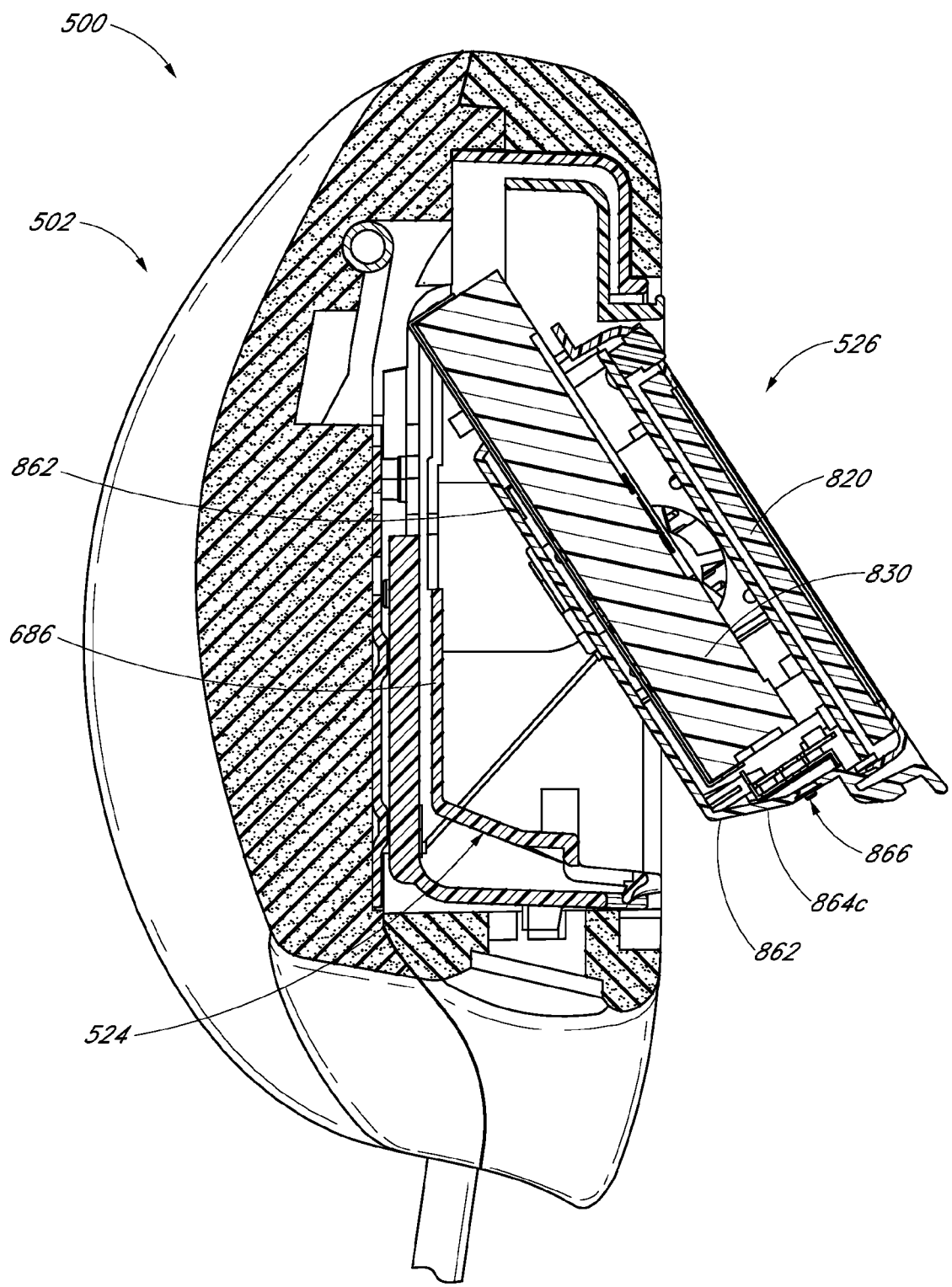
FIG. 36 is a side cross-sectional view of the entertainment system of FIG. 25 shown in a deployed configuration.

FIG. 36 illustrates an embodiment of the entertainment system 500 with the screen assembly 526 in an open or deployed state. In various embodiments, the screen assembly 526 can be rotated to the deployed state independent of movement of the headrest 502. For example, in some embodiments, the seatback 508 (see FIG. 25) with which the headrest 502 may be mounted can be configured to move to a reclined position. In some embodiments, the screen assembly 526 can be rotated separately from and independent of movement of the seatback 508 to or from the reclined position.

In some embodiments, the screen assembly 526 can be rotated by a sufficient amount to provide access to the opening 866 in the lower sidewall 864c of the front cover 862. Such an arrangement can allow for simple charging and discharging of the media reader 830. In addition, such an arrangement can advantageously maintain the opening 866 in a shielded or enclosed state when the screen assembly 526 is stowed, thereby preventing dust, debris, or other unwanted materials from collecting at or proceeding through the opening 866.

In some embodiments, the base wall 862 and/or the viewing screen 820 of the screen assembly 526 are angled with respect to the base wall 686 of the housing 524 when the screen assembly 526 is in the deployed state. As discussed above, the hinges 910 can be self-tensioning, which can permit the screen assembly 526 to be positioned at any angle within a limited range of motion. Thus, in some embodiments, a user can select a desired angle for the viewing screen 820.

Figure 37:
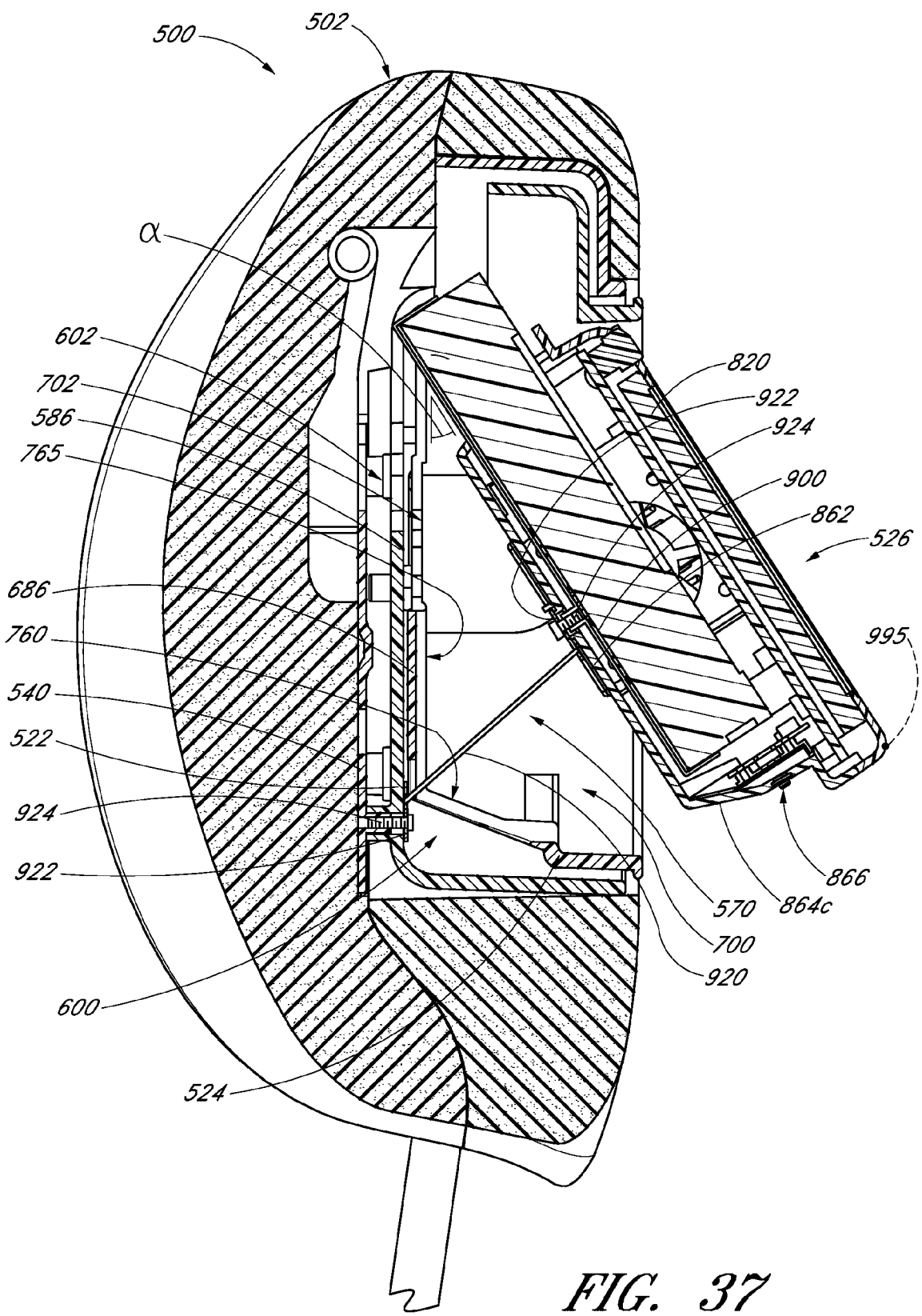
FIG. 37 is a side cross-sectional view such as that of FIG. 36 taken through a different plane.

With reference to FIG. 37, in certain embodiments, the retaining harness 570 limits a range of angles through which the screen assembly 526 can rotate. For example, in the illustrated embodiment, the retaining harness 570 limits rotation of the screen assembly 526 to a maximum angle α. In some embodiments, the maximum angle α is the angle between a plane defined by the base wall 686 of the housing 524 and a plane defined by the base wall 862 (or, in some embodiments, a plane defined by the viewing screen 820) of the screen assembly 526. As previously mentioned, in some embodiments, the screen assembly 526 can be positioned at any angle between about 0 degrees and the angle α due to self-tensioning hinges 910.

In some desirable embodiments, the angle α is sufficiently large to provide access to the opening 866 in the lower sidewall 864c and/or allow a user a variety of viewing angles. Additionally, in some embodiments, the angle α is sufficiently large to allow insertion of a tool (such as a screwdriver), or a portion thereof, into the cavity 700 and through the passageway 760 to aid in inserting or removing the fastener 924 to couple or decouple the shell 522 and the mounting plate 540. In further embodiments, the angle α is sufficiently small to prevent or deter a user from removing the retaining harness 570. The angle α can also be sufficiently small to prevent an upper portion of the screen assembly 526 from contacting the shell 522 or the mounting plate 540. The angle α can be selected to maintain a relatively low profile of the entertainment system 500. In various embodiments, the maximum angle α is between about 10 degrees and about 60 degrees, between about 10 degrees and about 50 degrees, between about 15 degrees and about 45 degrees, between about 20 degrees and about 40 degrees, or between about 25 degrees and about 35 degrees. In some embodiments, the angle is no more than about 50, about 40, about 35, about 30, about 25, about 20, or about 15 degrees. In some embodiments, the angle is about 33 degrees. Other values of the angle α are also possible.

In some embodiments, a length of the cord 920 and/or the points at which the cord 920 is connected to the mounting plate 540 and the screen assembly 526 can at least partially determine the maximum angle α. In various embodiments, the length of the cord 920 (between the center points of the eyelets 922) is between about 20 and about 80 millimeters, between about 25 and about 70 millimeters, between about 30 and about 60 millimeters, between about 40 and about 50 millimeters, or between about 42 and 48 millimeters. In some embodiments, the length is no more than about 60, about 50, about 40, about 30, or about 20 millimeters. Other values of the length are also possible.

In certain embodiments, the retaining harness 570 limits the distance by which the screen assembly 526 can be separated from the headrest 502 or the mounting plate 540. For example, in the unlikely event that screen assembly 526 were in the deployed orientation at the time of a collision and the screen assembly 526 were to separate from the hinges 910, motion of the screen assembly 526 would be constrained by the retaining harness 570. For example, in the illustrated embodiment, the retaining harness 570 would prevent the screen assembly 526 from entirely exiting the cavity 700. However, an upper portion of the screen assembly 526, no longer being constrained by the hinges, would be free to rotate such that the upper portion could extend through the windows 602, 702 defined by the shell 522 and eventually contact the shell 522, at which point the screen assembly (or, more particularly, a portion of the screen assembly 526) would be at a maximum distance from the mounting plate. Thus, in the illustrated embodiment, the maximum distance would constitute the distance between the mounting plate 540 and the point 995 along a line normal to the mounting plate 540. In some advantageous embodiments, the dimensions and orientation of the retaining harness 570 are selected to provide for a relatively small maximum separation distance. In some embodiments, the retaining harness 570 could prevent separation of the screen assembly 526 from the headrest 502 or mounting plate 540 despite forces experienced, for example, during a collision. One of skill in the art can appreciate that crash tests are often performed with a vehicle travelling 35 miles per hour and perpendicularly colliding with a concrete collision barrier. In some embodiments, the retaining harness 570 can remain coupled to the screen assembly 526 and the headrest 502 or mounting plate 540 under such test conditions, or, alternatively, under other presently existing crash test standards. In some embodiments, the retaining harness 570 will remain coupled to the screen assembly 526 and the headrest 502 or mounting plate 540 when the vehicle or screen assembly 526 is subjected to less than about 60 G's, less than about 50 G's, less than about 40 G's, less than about 30 G's, less than about 25 G's, less than about 20 G's, or less than about 15 G's of acceleration (including deceleration). In some embodiments, any force less than about 2000 pounds on the screen assembly would be insufficient to separate the screen assembly 526 from the headrest 502 or mounting plate 540. In some embodiments, the maximum tension of the cords 920 of the retaining harness 570 that could be achieved without breaking the retaining harness 570 or its connections to the screen assembly 526 or headrest 502 or mounting plate 540 could be less than about 2000 pounds, less than about 1500 pounds, less than about 1000 pounds, less than about 500 pounds, less than about 400 pounds, less than about 300 pounds, less than about 200 pounds, less than about 100 pounds, or less than about 50 pounds.

In some embodiments, the retaining harness 570 does not interfere with rotation of the screen assembly 526 from the open configuration to the closed configuration. As noted above, in some embodiments, the channels 765 defined by the housing 524 are configured to receive a portion of the cords 920. In some embodiments, the cords 920 are substantially outside of the channels 765 when the screen assembly 526 is in the deployed configuration. The channels 765 can provide sufficient clearance between the base wall 862 of the screen assembly 526 and the base wall 686 of the housing 524 such that the cords 920 are received within the channels 765 as the screen assembly 526 is advanced into the cavity 700. In some embodiments, the cords 920 are relatively long, and thus are not taut when the screen assembly 526 is in the closed configuration. Accordingly, in some embodiments, a portion of the cavity 600 beneath the lower sidewall 688c is sufficiently large to accept excess length of the cords 920. In some embodiments, portions of the cords 920 thus can gather within the cavity 600.

In further embodiments, the passageways 760 are relatively long and are oriented substantially perpendicular to the base wall 686 of the housing 524, which can facilitate passage of the cords 920 through the passageways 760. As mentioned above, the size, shape, and orientation of the passageways 760 can also facilitate insertion of a tool therethrough for attachment or detachment of the fastener 924.

As described above, in some embodiments, the harness provides a secure connection between the mounting plate 540 and the screen assembly 526. For example, in some embodiments, a metal fastener 924 is advanced through a first metal eyelet 922, through the base wall 862 of the screen assembly 526, and is secured to the metal frame 900. Another metal fastener 924 can be advanced through a second metal eyelet 922, through the shell 522, and into the mounting plate 540. As described above, in some embodiments, the metal-to-metal connections can reduce stress points and provide secure connections capable of withstanding large impulse forces.

Figure 38:
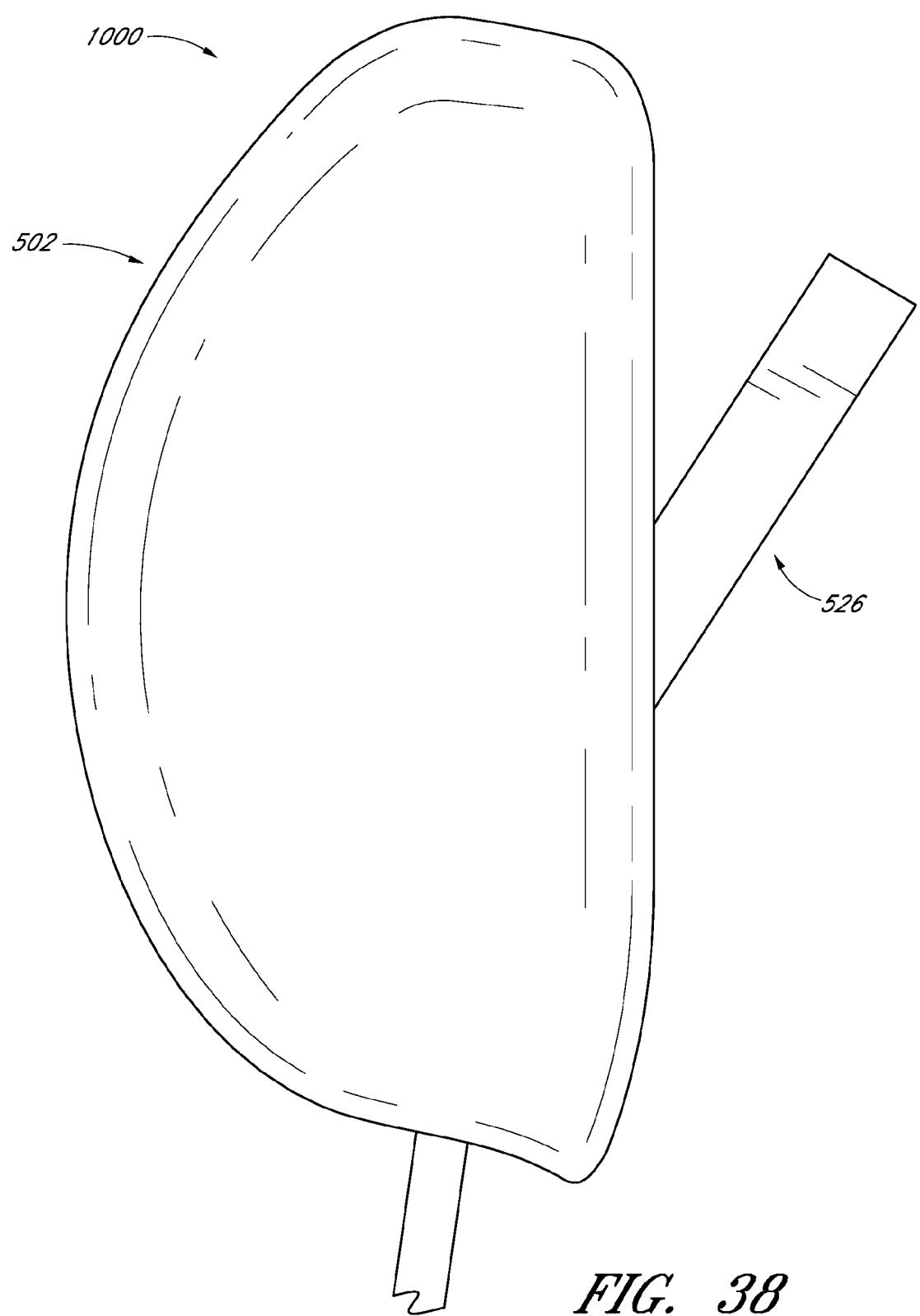
FIG. 38 is a schematic illustration of a side plan view of an embodiment of an entertainment system in a deployed configuration.

FIG. 38 illustrates an entertainment system 1000 such as the entertainment system 500. The entertainment system 1000 can resemble the entertainment system 500 in many respects, thus like features are identified (although, in some instances, not shown) with like numerals. However, the entertainment system 1000 can differ in other respects.

In some embodiments, the entertainment system 1000 is configured to open from the top down rather than from the bottom up. That is, an upper edge, rather than a lower edge, of the screen assembly 526 is configured to rotate outside of the headrest 502 when the screen assembly 526 is in the deployed configuration. In some embodiments, the entertainment system 1000 can be formed by rotating the shell 522, the housing 524, and the screen assembly 526 by approximately 180 degrees about an axis normal to the mounting plate 540 prior to connection of these components with the mounting plate 540. Appropriate adjustments to, for example, the protrusions 560 of the mounting plate 540 and/or the pads 510 could permit such an arrangement.

Accordingly, in certain embodiments, the receptacles 800 and the hinges 910 are at a bottom edge of the screen assembly 526. As a result, in some embodiments, the axis of rotation 909 of the screen assembly 526 can be below the viewing screen 820. Other orientations and configurations of the entertainment system 1000 are also possible.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment. This disclosure includes all permutations of the independent claims with their dependent claims.

What is claimed is:

1. An entertainment system for a vehicle headrest having a front and a rear, the entertainment system comprising:
   a screen assembly comprising a display, a signal generating device, and a casing having a rear portion and a front portion, wherein the display is at least partially within the rear portion of the casing and the signal generating device is at least partially within the front portion of the casing;
   a housing comprising a lower portion, an upper portion, and a housing cavity defined by the lower and upper portion of the housing, the housing cavity being sized and shaped to receive the screen assembly, the screen assembly being pivotally coupled to the housing such that the screen assembly can rotate relative to the housing, the lower portion comprising an opening that is sized and shaped to allow at least a portion of the screen assembly to rotate through the opening;

a shell substantially fixed to a headrest in a vehicle, the shell comprising a lower portion, an upper portion, and a shell cavity defined by the upper and lower portions of the shell, the shell cavity being sized and shaped to receive the housing, the upper portion of the shell being sized and shaped to receive at least a portion of the upper portion of the housing, the lower portion of the shell being sized and shaped to receive substantially the lower portion of the housing, the shell being coupled with the housing and substantially fixed to the housing.

2. The entertainment system of claim 1, wherein the upper portion of the housing is sized and shaped to receive at least a portion of the signal generating device.

3. The entertainment system of claim 2, wherein an upper edge of the display is below the upper portion of the housing.

4. The entertainment system of claim 1, wherein the upper portion of the housing is substantially shaped as a parallelepiped.

5. The entertainment system of claim 1, wherein the lower portion of the housing is substantially shaped as a parallelepiped.

6. The entertainment system of claim 1, wherein the screen assembly comprises first and second venting structures.

7. The entertainment system of claim 1, wherein a back wall of the housing defines a series of openings configured to receive extensions of the shell.

8. The entertainment system of claim 1, wherein the housing further comprises one or more projections, at least a portion of one or more of the projections being sized and shaped to fit snugly within one or more recesses defined by the shell.

9. The entertainment system of claim 1, wherein the housing further comprises a rim that extends about a periphery of sidewalls of the housing.

10. The entertainment system of claim 1, further comprising one or more pads and a covering over the one or more pads, wherein a portion of the covering is configured to be positioned between the shell and the housing such that the covering substantially hides the shell from view in an assembled entertainment system.

11. The entertainment system of claim 10, wherein a front cover of the screen assembly is shaped substantially as a parallelepiped.

12. The entertainment system of claim 10, wherein the lower portion of the shell is shaped substantially as a parallelepiped.

13. The entertainment system of claim 1, wherein the shell further comprises one or more extensions for mounting upholstery.

* * * * *